(12) United States Patent
Al-Duais et al.

(10) Patent No.: US 12,448,333 B2
(45) Date of Patent: Oct. 21, 2025

(54) ALKALI-ACTIVATED CEMENT COMPOSITION

(71) Applicant: KING FAHD UNIVERSITY OF PETROLEUM AND MINERALS, Dhahran (SA)

(72) Inventors: Ibrahim Nabil Ali Al-Duais, Dhahran (SA); Shamsad Ahmad, Dhahran (SA); Mohammad Al-Osta, Dhahran (SA); Mohammed Maslehuddin, Dhahran (SA); Salah Uthman Al-Dulaijan, Dhahran (SA); Tawfik Abdo Saleh, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 336 days.

(21) Appl. No.: 18/363,398

(22) Filed: Aug. 1, 2023

(65) Prior Publication Data

US 2025/0042816 A1    Feb. 6, 2025

(51) Int. Cl.
*C04B 28/04* (2006.01)
*C04B 14/04* (2006.01)
(Continued)

(52) U.S. Cl.
CPC ............ *C04B 28/04* (2013.01); *C04B 14/045* (2013.01); *C04B 14/14* (2013.01); *C04B 14/28* (2013.01);
(Continued)

(58) Field of Classification Search
CPC ....... C04B 28/04; C04B 14/045; C04B 14/14; C04B 14/28; C04B 18/0409; C04B 18/149; C04B 22/062
See application file for complete search history.

(56) References Cited

U.S. PATENT DOCUMENTS

| 10,843,969 B2 | 11/2020 | Ibrahim et al. |
| 2017/0174572 A1 | 6/2017 | Buchwald et al. |

(Continued)

FOREIGN PATENT DOCUMENTS

| CN | 105859228 B | 5/2018 |
| EP | 4 118 050 A1 | 1/2023 |
| KR | 10-2218836 B1 | 2/2021 |

OTHER PUBLICATIONS

Dhruv Sood, et al., "Optimizing Precursors and Reagents for the Development of Alkali-Activated Binders in Ambient Curing Conditions", Journal of Composites Science, vol. 5, Issue 2, Feb. 20, 2021, pp. 1-19.

(Continued)

*Primary Examiner* — Crystal J Lee
(74) *Attorney, Agent, or Firm* — Oblon, McClelland, Maier &Neustadt, L.L.P.

(57) ABSTRACT

A cement composition includes a curable component in an amount of 10 to 25 wt. %; a fine aggregate (FA) in an amount of 20 to 40 wt. %; a coarse aggregate (CA) in an amount of 40 to 50 wt. %; and an alkaline component in an amount of 5 to 15 wt. %, each wt. % based on the total weight of the cement composition. The curable component includes a cementitious material having an average particle size ($D_{50}$) of 10 to 17 micrometers (μm), a limestone powder (LSP) material having a $D_{50}$ of 13 to 19 μm, a red mud (RM) material having a $D_{50}$ of 30 to 36 μm, a silicomanganese fume (SMF) material having a $D_{50}$ of 28 to 34 μm, and a natural pozzolan (NP) material having a $D_{50}$ of 13 to 19 μm.

20 Claims, 65 Drawing Sheets

```
Mix the cement composition with water to form a mortar composition        — 52

Cast the mortar composition in a mold to form a molded composition       — 54

Curing the molded composition for 12-48 hours, thereby forming the
cured specimen                                                            — 56
```

(51) Int. Cl.
  *C04B 14/14*   (2006.01)
  *C04B 14/28*   (2006.01)
  *C04B 18/04*   (2006.01)
  *C04B 18/14*   (2006.01)
  *C04B 22/06*   (2006.01)
  *C04B 111/23*   (2006.01)
  *C04B 111/34*   (2006.01)

(52) U.S. Cl.
  CPC ........ *C04B 18/0409* (2013.01); *C04B 18/149* (2013.01); *C04B 22/062* (2013.01); *C04B 2111/23* (2013.01); *C04B 2111/34* (2013.01); *C04B 2201/50* (2013.01)

(56) References Cited

U.S. PATENT DOCUMENTS

2020/0277230 A1* 9/2020 Ibrahim ................ C04B 28/26
2021/0238094 A1* 8/2021 Frouin ................ C04B 22/147

OTHER PUBLICATIONS

Balamurali Kanagaraj, et al., "Investigation of physical, chemical, mechanical, and microstructural properties of cement-less concrete—state-of-the-art review", Construction and Building Materials, vol. 365, 2023, pp. 1-27.

\* cited by examiner

OPC

LSP

NP

SMF

RM

Type 3
Columnar vertical cracking through both ends, no well-formed cones

ALKALI-ACTIVATED CEMENT COMPOSITION

STATEMENT REGARDING PRIOR DISCLOSURE BY THE INVENTORS

Aspects of this technology are described in "Optimization of alkali-activated binders using natural minerals and industrial waste materials as precursor materials" published in Journal of Building Engineering, Volume 69, 106230, March 2023, which is incorporated herein by reference in its entirety.

STATEMENT OF ACKNOWLEDGEMENT

This research was supported by the Department of Civil & Environmental Engineering and Research Institute at King Fahd University of Petroleum & Minerals, Dhahran, Saudi Arabia.

BACKGROUND

Technical Field

The present disclosure is directed to a cement composition, particularly, to a cement composition including various alkali-activated precursor materials, namely, limestone powder (LSP), red mud (RM), silicomanganese fume (SMF), and natural pozzolana (NP).

DESCRIPTION OF THE RELATED PRIOR ART

The description of the related prior art provided herein is for the purpose of generally presenting the context of the disclosure. Work of the presently named inventors, to the extent described in this background section, as well as aspects of the description which may not otherwise qualify as prior art at the time of filing, are neither expressly nor impliedly admitted as prior art against the present invention.

Concrete is one of the most widely used construction materials in the world. According to the United States Geological Survey, approximately 4.2 billion tons of Ordinary Portland Cement (OPC) were produced globally in 2021. This figure is expected to rise to 4.4 billion tons by the end of 2022. With the projected growth in the world's population and the subsequent surge in demand for affordable housing, cement production is anticipated to increase significantly. The abundant raw materials used to produce cement, the relatively low skill-ceiling required for most concrete applications, and the relatively robust performance of concrete made with OPC have made concrete one of the most widely used construction materials. However, there are numerous disadvantages that are associated with the use of OPC. Firstly, concrete incorporating OPC exhibits relative weakness when exposed to extreme environments. Research shows that major structural failures have been observed within a span of 15 years for structures exposed to harsh conditions. Challenges such as reinforcement corrosion, chemical leaching of OPC constituents in marine environments, susceptibility to degradation in acidic environments, and vulnerability to sulfate attack are some drawbacks that necessitate the exploration of more resilient and durable binders for concrete production. Another disadvantage of OPC lies in its environmental impact which has been the subject of studies. OPC production involving calcination of calcareous and argillaceous minerals accounts for approximately 5-7% of anthropogenic $CO_2$ emissions, which translates to roughly 1.5 billion metric tons per year. Additionally, OPC factories release highly alkaline dust that poses hazards to the surrounding flora and fauna. Moreover, the production of OPC, coupled with the extraction of its constituent ingredients, contributes to the consumption of approximately one-third of the global power output annually.

The aforementioned drawbacks associated with OPC production have prompted researchers to explore the possibility of adopting greener binders that would result in a lower carbon footprint while demonstrating similar or even superior performance compared to OPC binders. This endeavor is accompanied by the investigation of various mineral additives and industrial byproducts for the development of green binders. One such example is alkali-activated binders (AABs) or geopolymers, which are created by activating a precursor, consisting of one or a combination of different natural and manmade minerals, using alkaline materials. AABs represent a subset of non-carbonate/low-carbon binders that are formed when precursors, typically industrial byproducts such as red mud (RM), silicomanganese fume or manganese furnace dust (SMF), or natural minerals such as natural pozzolana (NP), and limestone powder (LSP), are combined with alkaline activators. These precursors contain relatively high amounts of lime (CaO), alumina ($Al_2O_3$), silica ($SiO_2$), and/or manganese oxide (MnO).

Limestone powder (LSP) is a white powder obtained as a byproduct of limestone quarrying. It mainly consists of calcium carbonate with traces of silica in the form of quartz ($SiO_2$), as well as traces of magnesium carbonate. LSP does not possess pozzolanic reactivity but has been reported to enhance the microstructure of concrete when used as a filler. Moreover, due to its high alkalinity, LSP can act as a partial activator in AABs.

Natural pozzolana (NP), formed through volcanic activities, primarily contains alumina and silica. NP does not exhibit hydraulic activity on its own but reacts in the presence of alkaline materials, leading to the formation of alumina polymerization products, such as calcium-aluminate-silicate-hydrate (CASH), sodium-aluminate-silicate-hydrate (NASH) and intermediate calcium/sodium aluminate-silicate-hydrate (N(C)ASH and C(N)ASH).

Red mud (RM) is a byproduct of aluminum mining and consists mainly of alumina and iron oxide, which gives it its distinctive red color. It also contains traces of other metals and silica. According to the Aluminum Institute, each ton of aluminum yields 1 to 1.5 tons of red mud, posing an environmental hazard due to its high alkalinity.

Silicomanganese fume or manganese furnace dust (SMF) is a dark brown powder formed from the production of ferromanganese alloys. The exhaust rises to the top during the melting process and is precipitated by venturi collectors or baghouses, then collected and moved for landfilling. Over 60% of the produced SMF contains spherical particles smaller than 100 nm. SMF consists mainly of silica and manganese with traces of other metals. SMF does not possess hydraulic or pozzolanic activity on its own, but some research has been conducted to explore its application as a binding material.

Other industrial and agricultural byproducts, such as fly ash (FA), palm-oil fuel ash (POFA), rice husk ash (RHA), tile industry waste, ground granulated blast-furnace slag (GGBFS), as well as naturally-occurring minerals like kaolinitic clays and volcanic tuff, have also been used as precursors to in the development of AABs. The precursors are chemically activated using one or more liquid or solid activators such as sodium hydroxide (NaOH), potassium hydroxide (KOH), sodium silicate ($Na_2SiO_3$), ordinary Portland cement (OPC), and/or lime. In some cases, the activation is accompanied by thermal treatment, such as oven curing, steam curing, and/or heated water curing.

The performance of an AAB is influenced by multiple factors that can be categorized into three groups: precursor composition, activation parameters, and the curing regime and duration. The precursor composition includes factors such as the activator-to-precursor ratio (A/P), the composition of the activator (expressed as the ratio of sodium silicate to sodium or potassium hydroxide NS/NH), the concentration of the activator (expressed in the form of molarity), and the water-to-precursor ratio (W/P) (expressed in the form of total liquid to solid ratio L/S). Emdadi et al. [Z. Emdadi et al., "Development of green geopolymer using agricultural and industrial waste materials with high water absorbency," Appl. Sci., vol. 7, no. 5, 2017] studied the effects of sodium hydroxide (NH) molarity, NS/NH ratio, and W/P ratio on the strength development of an AAB containing rice husk, rice husk ash, metakaolin, palm oil fuel ash, and slag as precursor materials. Kaze et al. [J. L. Provis, A. Palomo, and C. Shi, "Advances in understanding alkali-activated materials," Cem. Concr. Res., vol. 78, pp. 110-125, December 2015] studied the influence of varying silica modulus on the properties of AABs made with laterite soil as precursor. Others have also explored the use of different precursor materials in the development of AABS, including metakaolin, volcanic ash, municipal waste incinerator ash, lead smelter slag, fluidized bed combustion fly ash, ceramic waste, and calcined marl.

Although the literature describes the use of precursor materials, the potential benefits of incorporating minor amounts of OPC into the precursor have not been explored. The reaction process and performance of AABs with the aforementioned precursor materials depend on the mix characteristics, which have been the subject of numerous studies in recent years. However, the durability of such binders in harsh chloride-laden environments remains unexplored, despite the increasing use of these proposed binders as construction materials instead of OPC. This issue is further exacerbated by the unique nature of AABs, which exhibit varying microstructures, physical properties, and durability characteristics depending on the precursors, activators and mix characteristics employed. To ensure the full integration and adoption of AABs in the construction industry, it is crucial to enhance their durability, especially in chloride-laden environments where the corrosion of steel reinforcement in concrete is a major concern. Accordingly, one objective of the present disclosure is to develop a cement composition using AABs that incorporates LSP, NP, RM, SMF, and OPC as precursor materials. By utilizing different weight percentages of these components, the performance of a cured cement composition is enhanced, including its physical and mechanical properties, drying shrinkage, and durability characteristics, especially in chloride rich environments. This approach effectively addresses the limitations identified in previous research. Moreover, a second objective of the present disclosure is to describe a method of producing a cured specimen from the cement composition containing LSP, NP, RM, SMF, and OPC.

SUMMARY

Aspects of the present invention relate to a cement composition including a curable component in an amount of 10 to 25 wt. % based on a total weight of the cement composition. In some embodiments, the curable component contains a cementitious material, a limestone powder (LSP) material, a red mud (RM) material, a silicomanganese fume (SMF) material, and a natural pozzolan (NP) material. The cement composition further includes a fine aggregate (FA) in an amount of 20 to 40 wt. % based on the total weight of the cement composition; a coarse aggregate (CA) in an amount of 40 to 50 wt. % based on the total weight of the cement composition; an alkaline component in an amount of 5 to 15 wt. %, based on the total weight of the cement composition. In some embodiments, the alkaline component contains an alkali metal hydroxide and an alkali silicate. In some embodiments, the cementitious material has an average particle size ($D_{50}$) of 10 to 17 micrometers (μm). In some embodiments, the LSP material has a $D_{50}$ of 13 to 19 μm. In some embodiments, the RM material has a $D_{50}$ of 30 to 36 μm. In some embodiments, the SMF material has a $D_{50}$ of 28 to 34 μm. In some embodiments, the NP material has a $D_{50}$ of 13 to 19 μm. In some embodiments, particles of the cementitious material, the LSP material, and the NP material have angular, irregular, and flake-like shapes. In some embodiments, particles of the RM material, and the SMF material have smooth surfaces and spherical shapes.

In some embodiments, the cementitious material is present in the curable component at a concentration of 5 to 35 wt. %; the LSP material is present in the curable component at a concentration of 5 to 15 wt. %; the RM material is present in the curable component at a concentration of 5 to 25 wt. %; the SMF material is present in the curable component at a concentration of 5 to 25 wt. %; and the NP material is present in the curable component at a concentration of 25 to 55 wt. %, each wt. % based on a total weight of the cementitious material.

In some embodiments, the cementitious material includes at least one selected from the group consisting of portland cement, pozzolan cement, gypsum cement, aluminous cement, silica cement, and alkaline cement.

In some embodiments, the cementitious material is type I ordinary portland cement (OPC).

In some embodiments, the cementitious material includes 81 to 88 wt. % CaO, 3 to 9 wt. % $SiO_2$, 0.5 to 2 wt. % $Al_2O_3$, 2.5 to 9 wt. % FeO, 0.1 to 0.3 wt. % $K_2O$, 0.2 to 0.8 wt. % MgO, each wt. % based on a total weight of the cementitious material.

In some embodiments, the LSP material includes 80 to 86 wt. % CaO, 8 to 15 wt. % $SiO_2$, 1 to 4 wt. % $Al_2O_3$, 0.5 to 2.5 wt. % FeO, each wt. % based on a total weight of the LSP material.

In some embodiments, the NP material includes 10 to 17 wt. % CaO, 33 to 40 wt. % $SiO_2$, 7 to 13 wt. % $Al_2O_3$, 25 to 33 wt. % FeO, 0.5 to 1.5 wt. % $K_2O$, 2 to 7 wt. % MgO, 1 to 3 wt. % $TiO_2$, each wt. % based on a total weight of the NP material.

In some embodiments, the RM materials includes 2 to 7 wt. % CaO, 7 to 13 wt. % $SiO_2$, 11 to 17 wt. % $Al_2O_3$, 50 to 58 wt. % FeO, 8 to 16 wt. % $Na_2O$, 2 to 10 wt. % MgO, 1 to 7 wt. % $TiO_2$, each wt. % based on a total weight of the RM material.

In some embodiments, the SMF materials includes 1 to 5 wt. % CaO, 10 to 18 wt. % $SiO_2$, 70 to 80 wt. % MnO, 1 to 7 wt. % FeO, 0.05 to 0.2 wt. % $K_2O$, 1 to 5 wt. % MgO, each wt. % based on a total weight of the SMF material.

In some embodiments, the FA includes sand having a specific gravity of 2.6 to 2.7. In some embodiments, the CA includes limestone having a specific gravity of 2.5 to 2.6.

In some embodiments, the alkali metal hydroxide is sodium hydroxide (NaOH), and the alkali silicate is sodium silicate ($Na_2SiO_3$). In some embodiments, a weight ratio of the NaOH to the $Na_2SiO_3$ is in a range of 1:1 to 1:4.

Aspects of the present invention relate to a method of producing a cured specimen. The method includes mixing the cement composition with water to form a mortar composition; casting the mortar composition in a mold to form a molded composition; and curing the molded composition for 12 to 48 hours thereby forming the cured specimen; wherein the curing is conducted under an ambient air condition or a steam condition.

In some embodiments, the cured specimen has a compressive strength of 10 to 50 MPa as determined by ASTM C39.

In some embodiments, the cured specimen has a modulus of elasticity of 5 to 20 GPa as determined by ASTM C469.

In some embodiments, the cured specimen has a split tensile strength of 1 to 4 MPa as determined by ASTM C496.

In some embodiments, the cured specimen has a drying shrinkage of 90 to 650 microstrains as determined by ASTM C596.

In some embodiments, the cured specimen has a residual strength of 10 to 35 MPa after an acid attack as determined by ASTM C1898.

In some embodiments, the cured specimen has a residual strength of 5 to 40 MPa after a sulfate attack as determined by ASTM C1012.

In some embodiments, the cured specimen has a non-steady state chloride migration coefficient ($D_{nssm}$) in a range of 17.5 to 29.6×10$^{-12}$ m$^2$/s as determined by ASTM C1202.

In some embodiments, the cured specimen has a chloride diffusion coefficient ($D_a$) in a range of 53×10$^{-12}$ to 27.6×10$^{-12}$ m$^2$/s for the free chloride and from 35.1×10$^{-12}$ to 7.8×10$^{-12}$ m$^2$/s for the total chloride as determined by ASTM C1152 and C1156.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
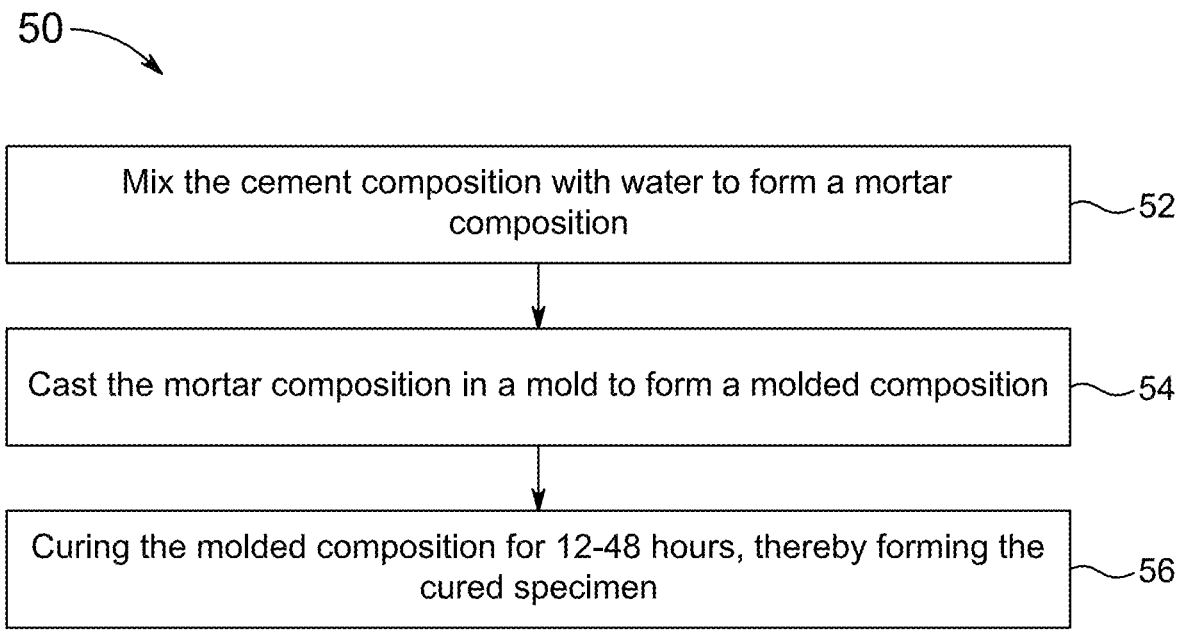
FIG. 1 is a flowchart depicting a method of making a cured specimen, according to certain embodiments.
Figure 2A:
FIG. 2A depicts the physical appearance of raw ordinary portland cement (OPC), according to certain embodiments.
Figure 2B:
FIG. 2B depicts the physical appearance of limestone powder (LSP) material, according to certain embodiments.
Figure 2C:
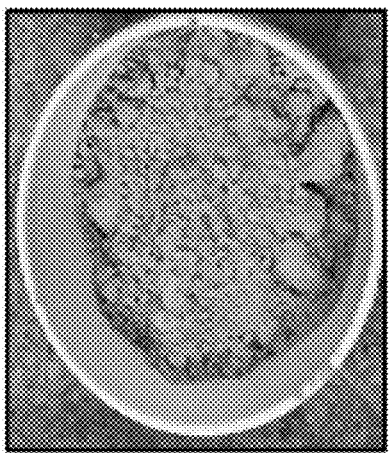
FIG. 2C depicts the physical appearance of natural pozzolan (NP), according to certain embodiments.
Figure 2D:
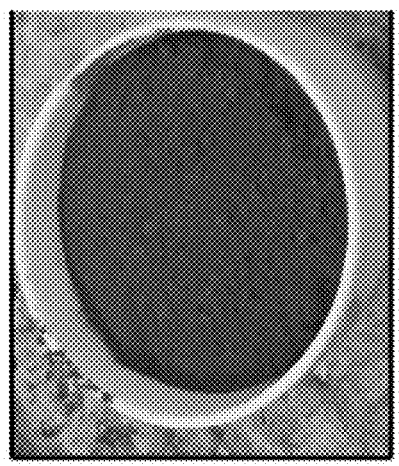
FIG. 2D depicts the physical appearance of a silicomanganese fume (SMF) material, according to certain embodiments.
Figure 2E:
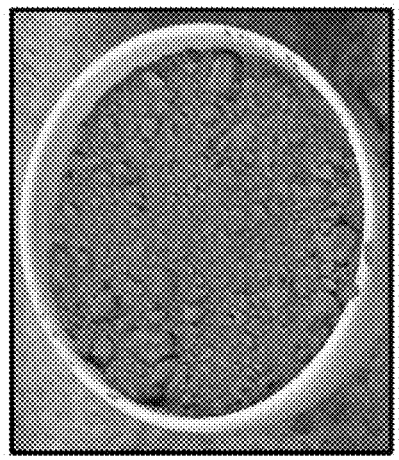
FIG. 2E depicts the physical appearance of red mud (RM) material, according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all embodiments of the disclosure are shown.

In the drawings, like reference numerals designate identical or corresponding parts throughout the several views. Further, as used herein, the words "a," "an" and the like generally carry a meaning of "one or more," unless stated otherwise.

Furthermore, the terms "approximately", "approximate", "about," and similar terms generally refer to ranges that include the identified value within a margin of 20%, 10%, or preferably 5%, and any values therebetween.

The use of the terms "include," "includes", "including," "have," "has," or "having" should be generally understood as open-ended and non-limiting unless specifically stated otherwise.

The terms "elements" and "components" include a single unit as well as more than a single unit unless specified otherwise.

As used herein, the term "cement" generally refers to a composition or substance with one or more constituents that is capable of binding materials together. The term includes reference to a dry, pre-set composition unless the context clearly dictates otherwise.

The phrase "cementitious material", "cementitious binder material" or "binder" generally refers to materials or mixtures of materials that are "cements" or materials that are capable of forming cement or capable of forming materials with cement-like binding properties. In the present disclosure, cementitious materials set and harden by reacting chemically with water, known as hydration. During hydration, water reacts with the cement particles, causing them to form a paste-like substance that hardens over time, and binds the aggregate particles together.

The terms "plasticizer" and "super-plasticizer" include a compound that is inert towards the binder, and such as serves as a medium such that the binder may be suspended or otherwise dispersed. The "plasticizer" or "super-plasticizer" is usually non-volatile at standard room temperature and pressure.

Aspects of the present disclosure are directed to a cement/concrete composition developed from alkali-activated binders (AABs). The physical and mechanical properties, drying shrinkage, and durability characteristics of alkali-activated concrete (AAC) mixtures prepared using the AABs that incorporate natural pozzolan (NP), limestone powder, red mud (RM), and silicomanganese fume (SMF) and ordinary portland cement (OPC) as precursor materials are disclosed. The chemical, mineral, and microstructural properties of the binders were examined using X-ray diffraction (XRD) spectroscopy, scanning electron microscopy with energy dispersive spectroscopy (SEM-EDS), and X-ray fluorescence (XRF) spectroscopy. The AAC mixtures were cured under different conditions, and the performances of the cured mixtures were tested for density ($\rho$), void ratio ($v$), water absorption ($\omega$) compressive strength (f'c), modulus of elasticity ($E_c$), split tensile strength ($T_c$), and durability characteristics related to chloride permeability, chloride migration, chloride diffusion, and chloride-induced reinforcement corrosion. The durability performance of the cured AAC mixtures was tested in terms of the resistance to degradation against exposure to 3% sulfuric acid and 20% magnesium and sodium sulfate solutions for 90 and 180 days, respectively.

A cement composition is described. The cement composition includes a curable component in an amount of 10 to 25 wt. % based on a total weight of the cement composition. The curable component includes a cementitious material. In an embodiment, the cementitious material is at least one selected from the group consisting of ordinary portland cement (OPC), pozzolan cement, gypsum cement, aluminous cement, silica cement, and alkaline cement. In some embodiments, the cementitious material is OPC. The OPC is selected from the group consisting of type I, type II, type III, type, IV, type V, type Ia, IIa, IIIa, or a combination of any two or more types of OPC. In a specific embodiment, the cementitious material is the type I ordinary Portland cement (OPC), and the OPC has a standard specification of ASTM C150 [Standard Specification for Portland Cement, ASTM C150, which is incorporated herein by reference in its entirety].

As used herein, the term "ordinary portland cement" generally refers to the most common type of cement in general use developed from types of hydraulic lime and usually originating from limestone. It is a fine powder produced by heating materials in a kiln to form what is called clinker, grinding the clinker, and adding small amounts of other materials. The Portland cement is made by heating limestone (calcium carbonate) with other materials (such as clay) to >1400° C. This process in a kiln is also known as calcination, whereby a molecule of carbon dioxide is liberated from the calcium carbonate to form calcium oxide, or quicklime, which is then blended with the other materials that have been included in the mix to from calcium silicates and other cementitious compounds. The resulting hard substance, called "clinker" is then ground with a small amount of gypsum into a powder to make ordinary Portland cement (OPC). Several types of Portland cement are available with the most common being called ordinary Portland cement (OPC) which is grey in color.

Suitable examples of cementitious materials include hydraulic cements, Saudi Class G hydraulic cement, non-hydraulic cements, Portland fly ash cement, Portland Pozzolan cement, Portland silica fume cement, masonry cement, EMC cement, stuccos, plastic cement, expansive cement, white blended cement, Pozzolan-lime cement, slag-lime cement, supersulfated cement, calcium aluminate cement, calcium sulfoaluminate cement, geopolymer cement, Rosendale cement, polymer cement mortar, lime mortar, and/or pozzolana mortar. In some embodiments, silica ($SiO_2$) may be present in the cement. In one embodiment, the cement comprises a cement blend of two or more types of cement, for example, a blend comprising Portland cement and non-Portland hydraulic cement. In a further embodiment, the cement is in the dry form. The cement may include $SiO_2$-containing materials including, but not limited to, belite ($2CaO \cdot SiO_2$), alite ($3CaO \cdot SiO_2$), celite ($3CaO \cdot Al_2O_3$), or brownmillerite ($4CaO \cdot Al_2O_3 \cdot Fe_2O_3$).

Figure 3A:
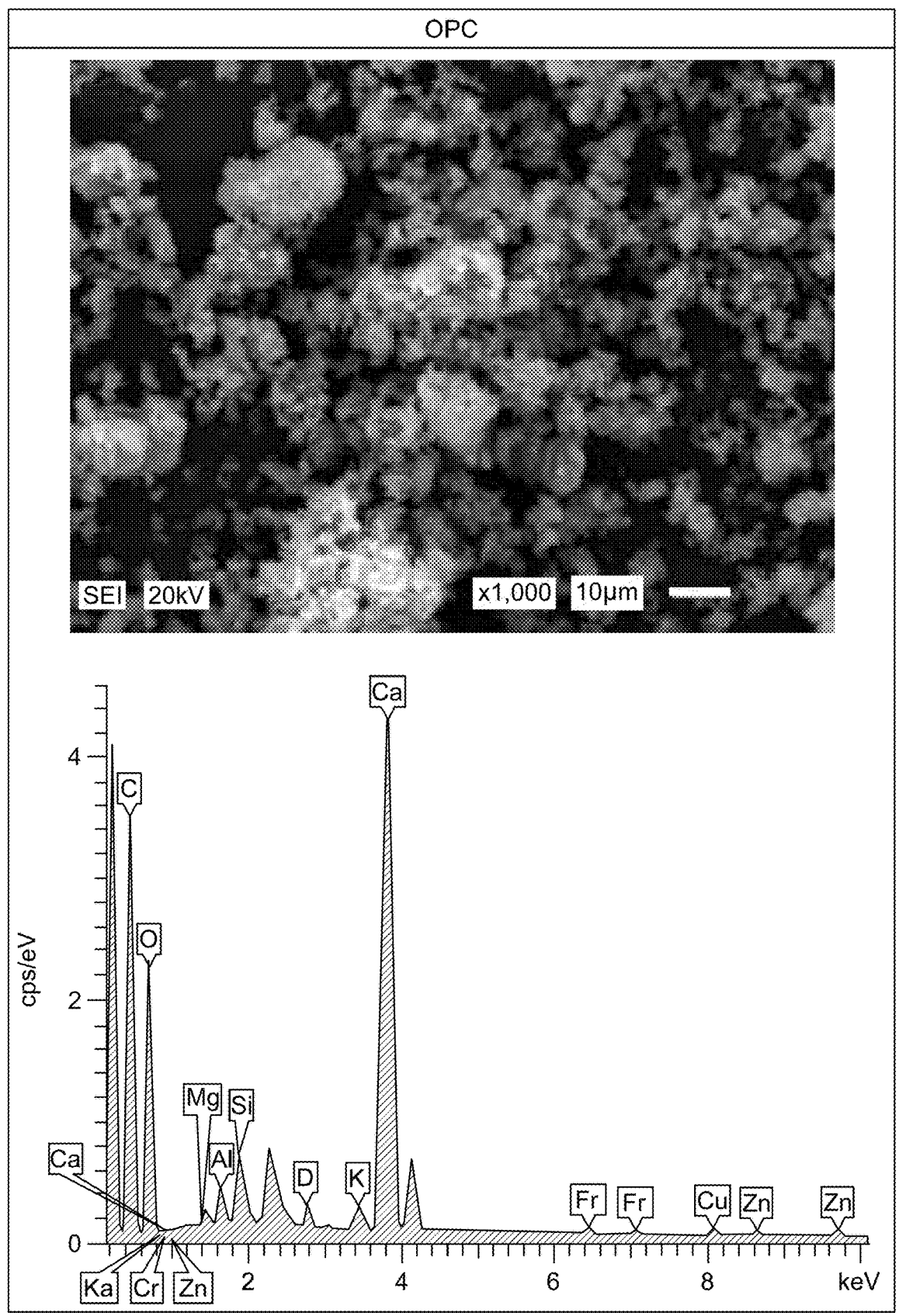
FIG. 3A-3E shows scanning electron microscope (SEM) energy dispersive X-ray (EDX) spectroscopic analysis images of raw OPC, LSP, NP, SMF, and RM materials respectively, according to certain embodiments.

In an embodiment, the cementitious material includes 81 to 88 wt. %, preferably 82 to 86 wt. %, or even more preferably 84 to 85 wt. % CaO; 3 to 9 wt. %, preferably 4 to 8 wt. %, or even more preferably 5 to 7 wt. % $SiO_2$; 0.5 to 2 wt. %, preferably 1 to 2 wt. %, or even more preferably 1.2 to 1.4 wt. % $Al_2O_3$; 2.5 to 9 wt. %, preferably 3 to 8 wt. %, preferably 4 to 7 wt. %, or even more preferably 5 to 6 wt. % FeO; 0.1 to 0.3 wt. %, or even more preferably 0.2 wt. % $K_2O$; 0.2 to 0.8 wt. %, preferably 0.3 to 0.6 wt. %, or even more preferably 0.4 to 0.5 wt. % MgO, each wt. % based on the total weight of the cementitious material, as determined by X-ray fluorescence (XRF) spectroscopy and depicted in FIG. 3A. The cementitious material has an average particle size ($D_{50}$) of 10 to 17 micrometers (μm), preferably 11 to 16 μm, preferably 12 to 15 μm, or even more preferably 13 to 14 μm, as depicted in FIG. 3A. Other ranges are also possible. In certain embodiments, the cementitious material have angular, irregular, and flake-like particle, as depicted in FIG. 3A.

As used herein, the term "flake," "flake-like," or "flake-like particle" generally refers to the shape or morphology of an object or substance that resembles flakes, similar to the shape of a flat, thin piece of the fragments or structures. In the present disclosure, the term flake-like refers to a particle that has a thin and elongated shape similar to a flake that has an aspect ratio in a range of 20:1 to 1:20, preferably 15:1 to 1:5, preferably 10:1 to 1, preferably 8:1 to 2:1, or even more preferably 6:1 to 4:1. Other ranges are also possible.

Figure 3B:
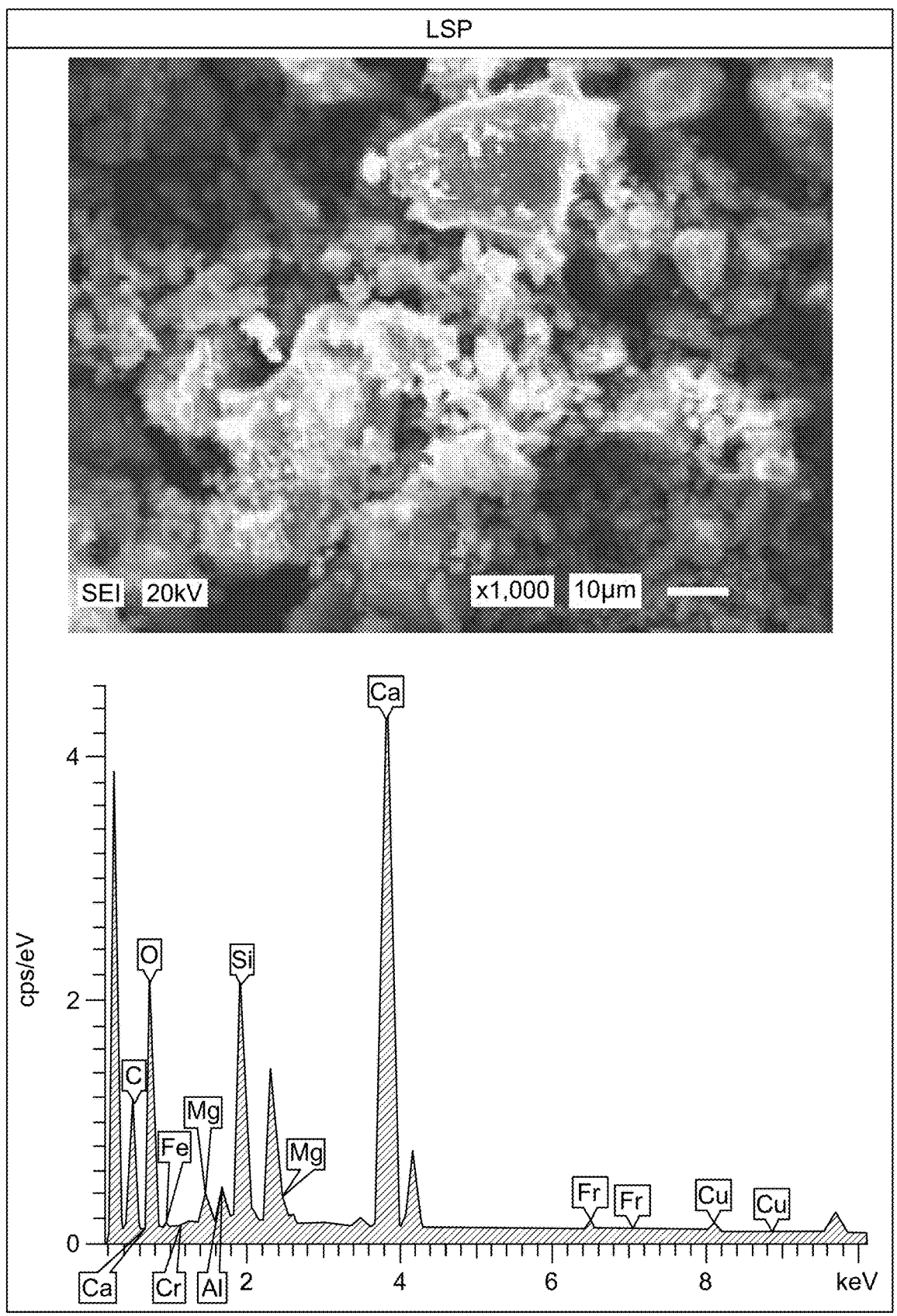
Figure 3C:
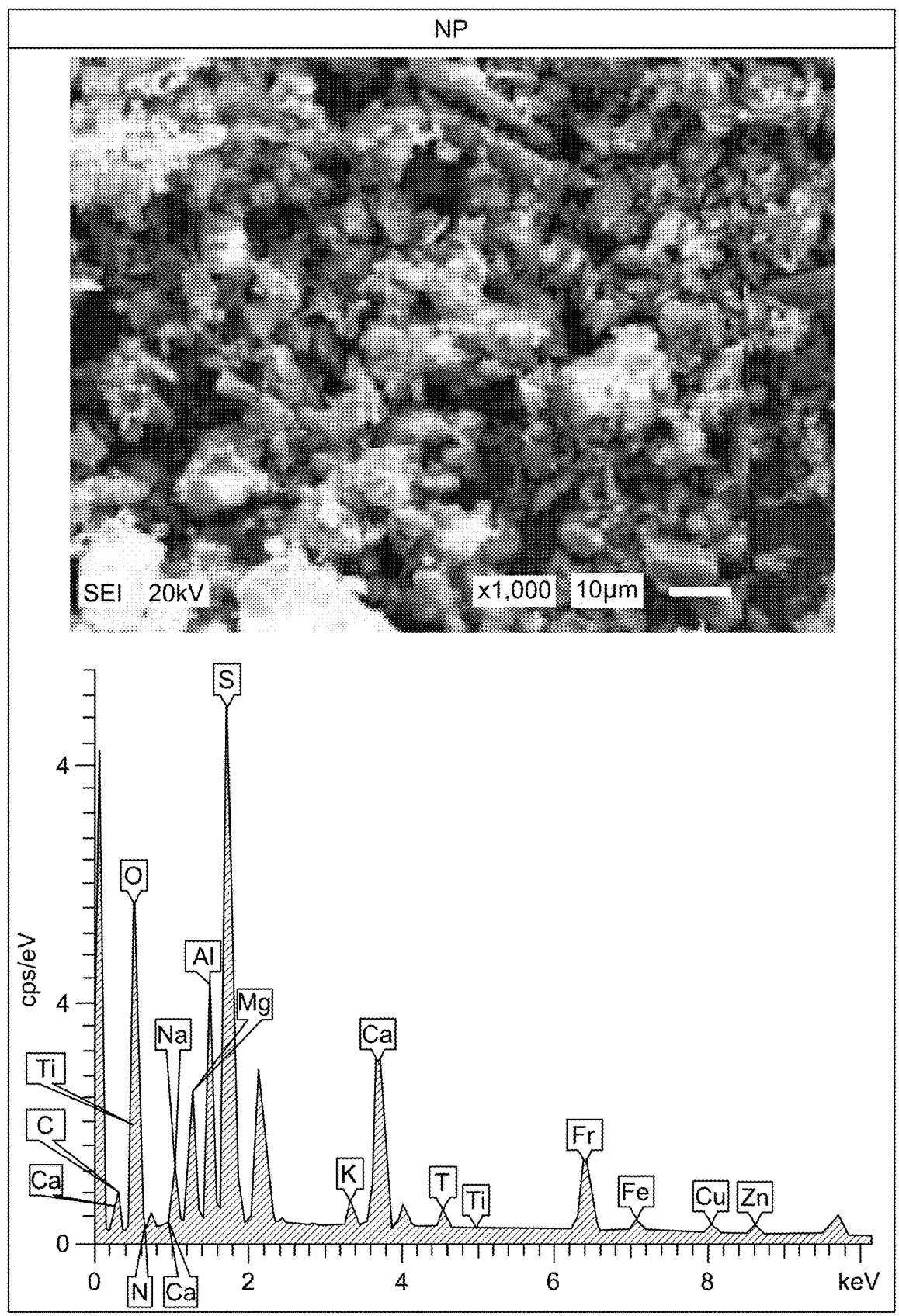
Figure 3D:
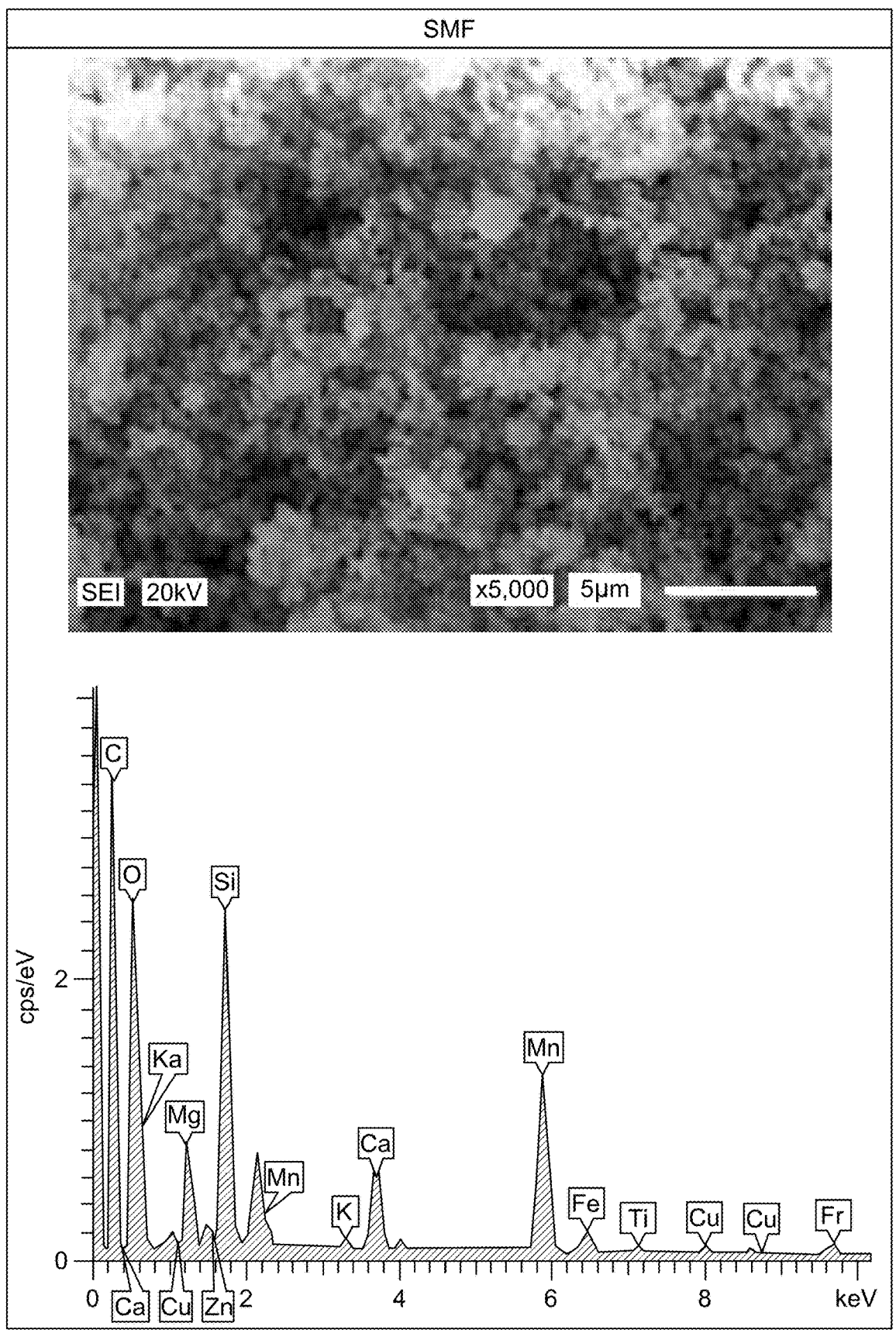
Figure 3E:
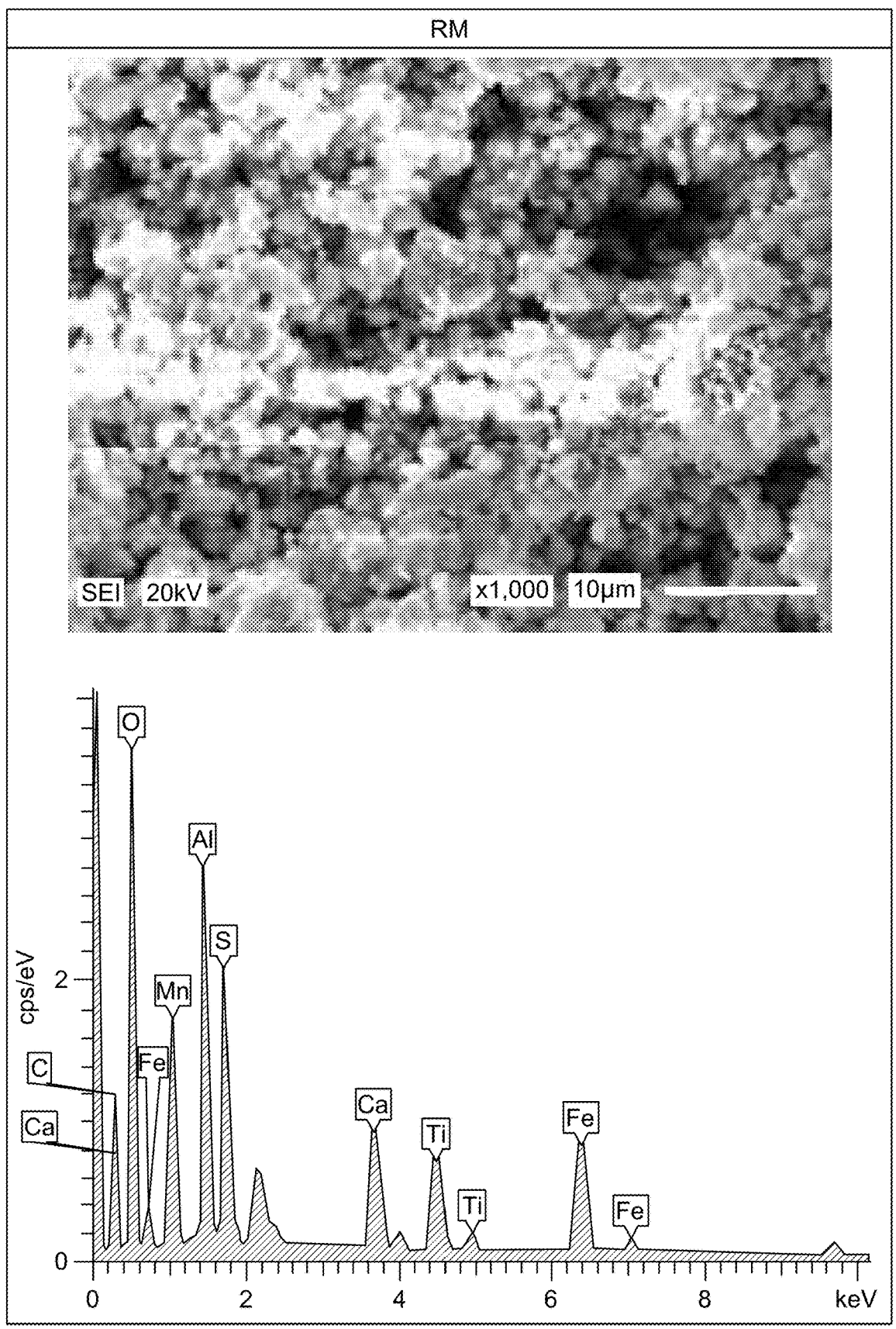

The curable component further includes a limestone powder (LSP) material, a red mud (RM) material, a silicomanganese fume (SMF) material, and a natural pozzolan (NP) material. The LSP material has a $D_{50}$ of 13 to 19 µm, preferably 14 to 17 µm, or even more preferably 15 to 16.5 µm, as depicted in FIG. 3B; the RM material has a $D_{50}$ of 30 to 36 µm, preferably 32 to 34 µm, or more even more preferably 33 to 34 µm, as depicted in FIG. 3E; the SMF material has a $D_{50}$ of 28 to 34 µm, preferably 29-32 µm, or even more preferably 30-31 µm, as depicted in FIG. 3D; and the NP material has a $D_{50}$ of 13 to 19 µm, preferably 13 to 18 µm, or even more preferably 14-16 µm, as depicted in FIG. 3C. In some preferred embodiments, the particles of the LSP material, and the NP material have angular, irregular, and flake-like shapes. In some more preferred embodiments, particles of the RM material, and the SMF material have smooth surfaces and spherical shapes.

In an embodiment, the cementitious material is present in the curable component at a concentration of 5 to 35 wt. %, preferably 10 to 30 wt. %, preferably 15 to 25 wt. %, or even more preferably about 20 wt. % based on a total weight of the curable component. In an embodiment, the LSP material is present in the curable component at a concentration of 5 to 15 wt. %, preferably 6 to 12 wt. %, preferably 8 to 11 wt. %, preferably 10 wt. % based on the total weight of the curable component. In an embodiment, the RM material is present in the curable component at a concentration of 5 to 25 wt. %, preferably 7 to 20 wt. %, preferably 10 to 20 wt. %, preferably 15 to 20 wt. %, or even more preferably about 20 wt. % based on the total weight of the curable component. In an embodiment, the SMF material is present in the curable component at a concentration of 5 to 25 wt. %, preferably 7 to 20 wt. %, preferably 10 to 20 wt. %, or even more preferably about 10 wt. % based on the total weight of the curable component. In an embodiment, the NP material is present in the curable component at a concentration of 25 to 55 wt. %, preferably 30 to 50 wt. %, preferably 35 to 45 wt. %, or even more preferably about 40 wt. % based on the total weight of the cementitious material. Other ranges are also possible.

The LSP material comprises 80 to 86 wt. %, preferably 81 to 85 wt. %, preferably 82 to 84 wt. %, preferably 82.5 to 83.5 wt. % CaO; 8 to 15 wt. %, preferably 9 to 14 wt. %, preferably 10 to 13 wt. %, preferably 11 to 12 wt. % $SiO_2$; 1 to 4 wt. %, preferably 2 to 3 wt. %, preferably about 2.5 wt. % $Al_2O_3$; 0.5 to 2.5 wt. %, preferably 1 to 2 wt. %, preferably 1.5 to 2 wt. % FeO, each wt. % based on the total weight of the LSP material, as determined by XRF spectroscopy and depicted in FIG. 3B.

The NP material comprises 10 to 17 wt. %, preferably 11 to 16 wt. %, preferably 12 to 15 wt. %, preferably 13 to 14 wt. %, or even more preferably about 13.5 wt. % CaO; 33 to 40 wt. %, preferably 34 to 39 wt. %, preferably 35 to 38 wt. %, preferably 36 to 37.5 wt. %, or even more preferably 37 to 37.5 wt. % $SiO_2$; 7 to 13 wt. %, preferably 8 to 12 wt. %, preferably 9 to 11 wt. %, or even more preferably 10 wt. % $Al_2O_3$; 25 to 33 wt. %, preferably 26 to 32 wt. %, preferably 27 to 31 wt. %, or even more preferably 28 to 29 wt. % FeO; 0.5 to 1.5 wt. %, preferably 0.6 to 1.4 wt. %, preferably 0.7 to 1.3 wt. %, 0.8 to 1.0 wt. %, or even more preferably about 0.9 wt. % $K_2O$; 2 to 7 wt. %, preferably 3-5 wt. %, preferably 4 to 5 wt. %, or even more preferably 4.5 to 5 wt. % MgO; 1 to 3 wt. %, preferably 1 to 2 wt. %, or even more preferably 1.5 to 2 wt. % $TiO_2$, each wt. % based on the total weight of the NP material, as determined by XRF spectroscopy and depicted in FIG. 3C.

The RM material includes 2 to 7 wt. %, preferably 3 to 6 wt. %, preferably 4 to 5.5 wt. %, or even more preferably 4.5 to 5 wt. % CaO; 7 to 13 wt. %, preferably 8 to 12 wt. %, preferably 9 to 11 wt. %, preferably 9.5 to 10.5 wt. %, or even more preferably 10 to 10.5 wt. % $SiO_2$; 11 to 17 wt. %, preferably 12 to 16 wt. %, preferably 13 to 15 wt. %, or even more preferably 14 to 14.5 wt. % $Al_2O_3$; 50 to 58 wt. %, preferably 51 to 57 wt. %, preferably 52 to 56 wt. %, preferably 53 to 55 wt. %, or even more preferably 53.5 to 54 wt. % FeO; 8 to 16 wt. %, preferably 9 to 15 wt. %, preferably 10 to 14 wt. %, preferably 11 to 13 wt. %, or even more preferably 11.4 to 12 wt. % $Na_2O$; 2 to 10 wt. %, preferably 3 to 9 wt. %, preferably 4 to 8 wt. %, or even more preferably 5 to 7 wt. % MgO; and 1 to 7 wt. %, preferably 2 to 6 wt. %, preferably 3 to 5 wt. %, or even more preferably 4 wt. % $TiO_2$, each wt. % based on the total weight of the RM material, as determined by XRF spectroscopy and depicted in FIG. 3E.

The SMF material includes 1 to 5 wt. %, preferably 2 to 4 wt. %, preferably 2.5 to 3.5 wt. %, or even more preferably 2.6 to 3 wt. % CaO; 10 to 18 wt. %, preferably 11 to 17 wt. %, preferably 12 to 16 wt. %, preferably 13 to 15 wt. %, or even more preferably 13.5 to 14 wt. % $SiO_2$; 70 to 80 wt. %, preferably 71 to 79 wt. %, preferably 72 to 78 wt. %, preferably 73 to 77 wt. %, preferably 74 to 76 wt. %, or even more preferably 75 to 76 wt. % MnO; 1 to 7 wt. %, preferably 2 to 6 wt. %, preferably 3 to 5 wt. %, or even more preferably 4 to 4.5 wt. % FeO; 0.05 to 0.2 wt. %, or even more preferably 0.1 to 0.2 wt. % $K_2O$; and 1 to 5 wt. %, preferably 2 to 4 wt. %, or even more preferably 2.5 to 3.5 wt. %, MgO, each wt. % based on the total weight of the SMF material, as determined by XRF spectroscopy and depicted in FIG. 3D.

As used herein, "aggregate" refers to a broad category of particulate material used in construction. Aggregates are a component of composite materials such as concrete; the aggregates serve as reinforcement to add strength to the overall composite material. Aggregates, from different sources, or produced by different methods, may differ considerably in particle shape, size and texture. Shape of the aggregates of the present disclosure may be cubical and reasonably regular, essentially rounded, angular, or irregular. Surface texture may range from relatively smooth with small exposed pores to irregular with small to large exposed pores. Particle shape and surface texture of both fine and coarse aggregates may influence proportioning of mixtures in such factors as workability, pumpability, fine-to-coarse aggregate ratio, and water requirement.

The cement composition may also include one or more fine aggregate (FA). The fine aggregate may include, but is not limited to, sand (e.g., dune sand), crushed stone, crushed rock, crushed shells, or other crushed/pulverized/ground material, for example, crushed/pulverized/ground forms of concrete, gravel, rocks, natural soil, quarried crushed mineral aggregates from igneous (granite, syenite, diorite, gabbro peridotite pegmatite, volcanic glass, felsite, basalt), metamorphic (marble, metaquartzite, slate, phyllite, schist, amphibolite, hornfels, gneiss, serpentite) or sedimentary rocks (conglomerate, sandstone, claystone, siltstone, argillite, shale, limestone, dolomite, marl, chalk, chert), including unused and waste aggregates from quarry operations, dredged aggregates, china clay stent, china clay wastes, natural stone, recycled bituminous pavements, recycled concrete pavements, reclaimed road base and subbase materials, crushed bricks, construction and demolition wastes, crushed glass, slate waste, waste plastics, egg shells, sea shells, barite, limonite, magnetite, ilmenite, hematite, iron, steel, including recycled or scrap steel, and mixtures thereof. In preferred embodiments, the fine aggregate employed in the mortar compositions is dune sand. In an embodiment, the FA is present in an amount of 20 to 40 wt. % based on the total weight of the cement composition. In some embodiments, the FA has a specific gravity of 2.2 to 2.8, and a standard specification of ASTM C128 [Standard Test Method for Relative Density (Specific Gravity) and Absorption of Fine Aggregate, ASTM C128, which is incorporated herein by reference in its entirety].

In a preferred embodiment, the fine aggregate is sand, more preferably dune sand. As used herein, "sand" refers to a naturally occurring granular material composed of finely divided rock and mineral particles. It is defined by size in being finer than gravel and coarser than silt. The composition of sand varies, depending on the local rock sources and conditions, but the most common constituent of sand is silica (silicon dioxide, or $SiO_2$), usually in the form of quartz. In terms of particle size, sand particles range in diameter from 0.0625 mm to 2 mm. An individual particle in this range is termed a sand grain. By definition sand grains are between gravel (particles ranging from 2 mm to 64 mm) and silt (particles ranging from 0.004 mm to 0.0625 mm). In a specific embodiment, the fine aggregate has a specific gravity of preferably 2.2, preferably 2.3, preferably 2.4, and preferably 2.5, preferably 2.64. Other ranges are also possible.

The fine aggregate may have an average particle size of 0.3 to 1 mm, preferably 0.4 to 0.8 mm, preferably 0.5 to 0.6 mm, although fine aggregates with average particle sizes slightly above or below these values may also function as intended. The grading of fine aggregate employed herein preferably conforms to the standard ASTM C 33/C33M-18.

The cement composition further includes a coarse aggregate (CA) in an amount of 40 to 50 wt. % based on the total weight of the cement composition, preferably 42 to 48 wt. %, or even more preferably 44 to 46 wt. % based on the total weight of the cement composition. In a preferred embodiment, the course aggregate present in the cement composition is crushed limestone. As used herein, limestone refers to a sedimentary rock composed largely of the minerals calcite and aragonite, which are different crystal forms of calcium carbonate ($CaCO_3$). Limestone is naturally occurring and can be found in skeletal fragments of marine organisms such as coral, forams, and molluscs. Crushed limestone is generated during the crushing and grinding of limestone rocks. The crushed limestone used herein may have an average particle size greater than 1 mm. In one embodiment, the crushed limestone has an average particle size of 1.5-32 mm, preferably 2-30 mm, preferably 4-28 mm, preferably 6-24 mm, preferably 8-20 mm, preferably 10-18 mm, preferably 12-16 mm. The crushed limestone may contain materials including, but not limited to, calcium carbonate, silicon dioxide, quartz, feldspar, clay minerals, pyrite, siderite, chert and other minerals. In some embodiments, the coarse aggregate has a specific gravity of 2.2 to 2.8, and a maximum particle size of at most 20 mm, preferably at most 18 mm, or even more preferably at most 16 mm. In a specific embodiment, the coarse aggregate has a specific gravity of preferably 2.2, preferably 2.3, preferably 2.4, preferably 2.5, and a maximum particle size of at most 20 mm, preferably at most 18 mm, or even more preferably at most 16 mm. In a most preferred embodiment, the coarse aggregate of the cement composition is crushed limestone with a specific gravity of 2.1-3.0, preferably 2.2-2.8, more preferably 2.4-2.7, or about 2.56. Other ranges are also possible.

The cement composition further includes an alkaline component in an amount of 5 to 15 wt. %, based on the total weight of the cement composition, preferably 7 to 13 wt. %, or even more preferably 9 to 11 wt. % based on the total weight of the cement composition. Alkali activation generally releases reactive species (e.g., CaO) from the binder, thus increasing the rate of densification and improving the microstructural strength of the binder, which by extension affects the mechanical properties and durability performance of the cured mortar. The alkali activator may be a mixture of an aqueous solution of a metal hydroxide, preferably an alkali metal hydroxide (e.g., sodium hydroxide, potassium hydroxide, etc.), and a metal silicate, preferably an alkali metal silicate (e.g., sodium silicate, potassium silicate, etc.). In some embodiments, the alkali activator may be an aqueous solution of a metal hydroxide, preferably an alkali metal hydroxide. In preferred embodiments, the alkali activator is an aqueous mixture of sodium hydroxide and sodium silicate. Preferably, the alkali activator consists of sodium hydroxide and sodium silicate in water. In some more preferred embodiments, a weight ratio of NaOH to the $Na_2SiO_3$ may generally range from 1:1 to 1:4, preferably 1:1.5 to 1:3.5, preferably 1:2 to 1:3, or even more preferably about 1:2.5. Other ranges are also possible.

The cement composition further includes a plasticizer in an amount of 0.001 to 2 wt. % based on the total weight of the cement composition. The plasticizer includes at least one included from the group consisting of a lignosulfonate plasticizer, a polycarboxylate ether plasticizer, a melamine plasticizer, and a naphthalene plasticizer. In some embodiments, the plasticizer is a combination of two or more plasticizers selected from the above group. In some specific embodiments, the plasticizer is a combination of one or more plasticizers included from the above group with an organic non-volatile compound.

As used herein, a "plasticizer" is an additive that increases the plasticity or fluidity of slurry. Plasticizers increase the workability of "fresh" cement composition, allowing it to be placed more easily, with less consolidating effort. A superplasticizer is a plasticizer with fewer deleterious effects. A "superplasticizer" refers a chemical admixture used herein to provide a well-dispersed particle suspension in the wet cement composition. The superplasticizer may be used to prevent particle segregation and to improve the flow characteristics of the wet cement composition. The superplasticizer may be a polycarboxylate, e.g. a polycarboxylate derivative with polyethylene oxide side chains, a polycarboxylate ether (PCE) superplasticizer, such as the commercially available Glenium 51®. Polycarboxylate ether superplasticizers may allow a significant water reduction at a relatively low dosage, thereby providing good particle dispersion in the wet concrete slurry. Polycarboxylate ether superplasticizers are composed of a methoxy-polyethylene glycol copolymer (side chain) grafted with methacrylic acid copolymer (main chain). Exemplary superplasticizers that may be used in addition to, or in lieu of a polycarboxylate ether superplasticizer include, but are not limited to, alkyl citrates, sulfonated naphthalene, sulfonated alkene, sulfonated melamine, lignosulfonates, calcium lignosulfonate, naphthalene lignosulfonate, polynaphthalenesulfonates, formaldehyde, sulfonated naphthalene formaldehyde condensate, acetone formaldehyde condensate, polymelaminesulfonates, sulfonated melamine formaldehyde condensate, polycarbonate, other polycarboxylates, other polycarboxylate derivatives comprising polyethylene oxide side chains, and the like and mixtures thereof. In a preferred embodiment, the cement composition has a weight percentage of the plasticizer ranging from 0.1-3.0% relative to the total weight of the composition, preferably 0.2-2.5%, preferably 0.5-2.0%, preferably 1.0-1.8%, preferably 1.2-1.6%, or about 1.5% relative to the total weight of the cement composition. Other ranges are also possible.

In an embodiment, the cement composition may further include a surfactant. In a preferred embodiment, the surfactant may be a nonionic surfactant, an anionic surfactant, a cationic surfactant, a viscoelastic surfactant, or a zwitterionic surfactant. The surfactants may include, but are not limited to, ammonium lauryl sulfate, sodium lauryl sulfate (SLS), sodium dodecyl sulfate (SDS), alkyl-ether sulfates sodium laureth sulfate (sodium lauryl ether sulfate (SLES), sodium myreth sulfate, docusate (dioctyl sodium sulfosuccinate), perfluorooctanesulfonate (PFOS), perfluorobutanesulfonate, alkyl-aryl ether phosphates, alkyl ether phosphates, octenidine dihydrochloride; cetrimonium bromide (CTAB), cetylpyridinium chloride (CPC), benzalkonium chloride (BAC), benzethonium chloride (BZT), dimethyldioctadecylammonium chloride, dioctadecyldimethylammonium bromide (DODAB), CHAPS (3-[(3-cholamidopropyl)dimethylammonio]-1-propanesulfonate), cocamidopropyl hydroxysultaine, ocamidopropyl betaine, phospholipids, and sphingomyelins. In a preferred embodiment, the cement composition has a weight percentage of the surfactant ranging from 0.1-3.0% relative to the total weight of the composition, preferably 0.2-2.5%, preferably 0.5-2.0%, preferably 1.0-1.8%, preferably 1.2-1.6%, or about 1.5% relative to the total weight of the cement composition. Other ranges are also possible.

The surfactant may include primary and secondary emulsifiers. Hereinafter, the primary and secondary emulsifiers are collectively referred to as the "emulsifiers" or "surfactants" and individually referred to as the "emulsifier" or "surfactant," unless otherwise specified. The primary emulsifier is a polyaminated fatty acid. The primary emulsifier includes a lower hydrophilic-lyophilic balance (HLB) in comparison to the secondary emulsifier. The primary emulsifier may include, but are not limited to, span 60, span 85, span 65, span 40, and span 20. The primary emulsifier is sorbitan oleate, also referred to as the span 80. The secondary emulsifier may include, but are not limited to triton X-100, Tween™ 80, Tween™ 20, Tween™ 40, Tween™ 60, Tween™ 85, OP4 and OP 7. The secondary emulsifier includes a biosurfactant such as a rhamnolipid surfactant. In an embodiment, the surfactant may be neopelex or stearic acid.

The cement composition may further include a defoaming agent. As used herein, the term "deforming agent" refers to the chemical additive that reduces and hinders foam formation in industrial process liquids. The deforming agent may include, but are not limited to, 2-octanol, oleic acid, paraffinic waxes, amide waxes, sulfonated oils, organic phosphates, silicone oils, mineral oils, and dimethylpolysiloxane. The defoaming agent may be dimethyl silicone polymer or polyoxy propylene glycerin ether. In a preferred embodiment, the cement composition has a weight percentage of the defoaming agent ranging from 0.01-1.0% relative to the total weight of the composition, preferably 0.02-0.8%, preferably 0.03-0.6%, preferably 0.04-0.4%, preferably 0.05-0.2%, or about 0.1% relative to the total weight of the cement composition.

FIG. 1A illustrates a flow chart of a method 50 of producing a cured specimen. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 mixing the cement composition with water to form a mortar composition. The cement composition includes a curable component in an amount of 10 to 25 wt. %, a fine aggregate (FA) in an amount of 20 to 40 wt. %, a coarse aggregate (CA) in an amount of 40 to 50 wt. %, and an alkaline component in an amount of 5 to 15 wt. %, each wt. % based on a total weight of the cement composition.

In some embodiments, the curable component contains 10 to 30 wt. % of a cementitious material, 10 to 20 wt. % of a limestone powder (LSP) material, 10 to 20 wt. % of a red mud (RM) material, 10 to 20 wt. % a silicomanganese fume (SMF) material, and 30 to 50 wt. % a natural pozzolan (NP) material, each wt. % based on a total weight of the cementitious material.

In some embodiments, the water may be tap water, distilled water, bi-distilled water, de-ionized water, de-ionized distilled water, reverse osmosis water, and/or some other water. In one embodiment, the water is bi-distilled to eliminate trace metals. Preferably the water is bi-distilled, de-ionized, deionized di-stilled, or reverse osmosis water and at 25° C. In some embodiments, water in the amount of 40% by weight of the OPC. In some embodiments, a weight ratio of the water to the cementitious material is in a range of 0.2:1 to 1:1, more preferably, 0.3:1 to 0.8:1, or even more preferably about 0.5:1 to 0.6:1. Other ranges are also possible.

At step 54, the method 50 includes casting the mortar composition in a mold to form a molded composition. The casting may be performed by any of the conventional methods known in the art. In an embodiment, the casting may be substituted by an extrusion molding, a blow molding, an injection molding, and a rotational molding. In an embodiment, the mold is a briquette mold. The mold may be made up of a material selected from a group of any alloy or metal such as stainless steel, bronze, and nichrome. The mold may include, but are not limited to shapes such as spherical, cylindrical, cubical, cuboidal, pentagonal, hexagonal, and rhombic. In some embodiments, the mortar composition may be transferred to 25 mm×25 mm×250 mm cubic brass molds, specified by ASTM C192/C192M [Standard Practice for Making and Curing Concrete Test Specimens in the Laboratory, ASTM C192/C192M, which is incorporated herein by reference in its entirety].

At step 56, the method 50 includes curing the molded composition for 0.5-120 days, thereby forming the cured specimen. In some preferred embodiments, the molded composition is cured for preferably 5, preferably 10, preferably 15, preferably 20, preferably 25, preferably 30, preferably 35, preferably 40, preferably 45, preferably 50, preferably 55, preferably 60, preferably 65, preferably 70, preferably 75, preferably 80, preferably 85, or preferably for about 90 days. In some specific embodiments, the molded composition is cured for 28 days thereby forming the cured specimen. In some other embodiments, the molded composition is cured for 90 days.

The curing is performed under ambient conditions or steam conditions. As used herein, the term " "ambient conditions" or "ambient-air curing" generally refers to a process that involves wrapping a specimen with plastic cling film, keeping the wrapped specimen inside a plastic bag, and sealing it under room temperature conditions (e.g., 23±5°

C.) with approximately 60% relative humidity until testing. As used herein, the term "steam conditions" or "steam-cured" generally refers to a curing process where the specimens are exposed to a controlled environment of elevated temperature and high humidity. This is typically achieved by placing the specimens in a curing chamber or using a steam curing system. In the present disclosure, the specimens were placed after demolding and cleaning inside a chamber that was provided with a resistance-heating element. The specimens were suspended inside the chamber using a screen, and the chamber was half-filled with potable water. The heating element was set to boil the water, and the chamber was covered with a lid to allow condensation. Steaming was carried out for, e.g., 24 hours, and then the specimens were allowed to cooldown to room temperature inside the chamber until testing.

The crystalline structures of the cured specimens under different curing methods may be characterized by X-ray diffraction (XRD). In some embodiments, the XRD patterns are collected in a Rikagu Miniflex II diffractometer equipped with a Cu-Kα radiation source ($\lambda$=0.15406 nm) for a 2θ range extending between 5 and 80°, preferably 15 and 70°, further preferably 30 and 60° at an angular rate of 0.005 to $0.04°s^{-1}$, preferably 0.01 to $0.03°s^{-1}$, or even preferably $0.02°s^{-1}$.

Figure 26A:
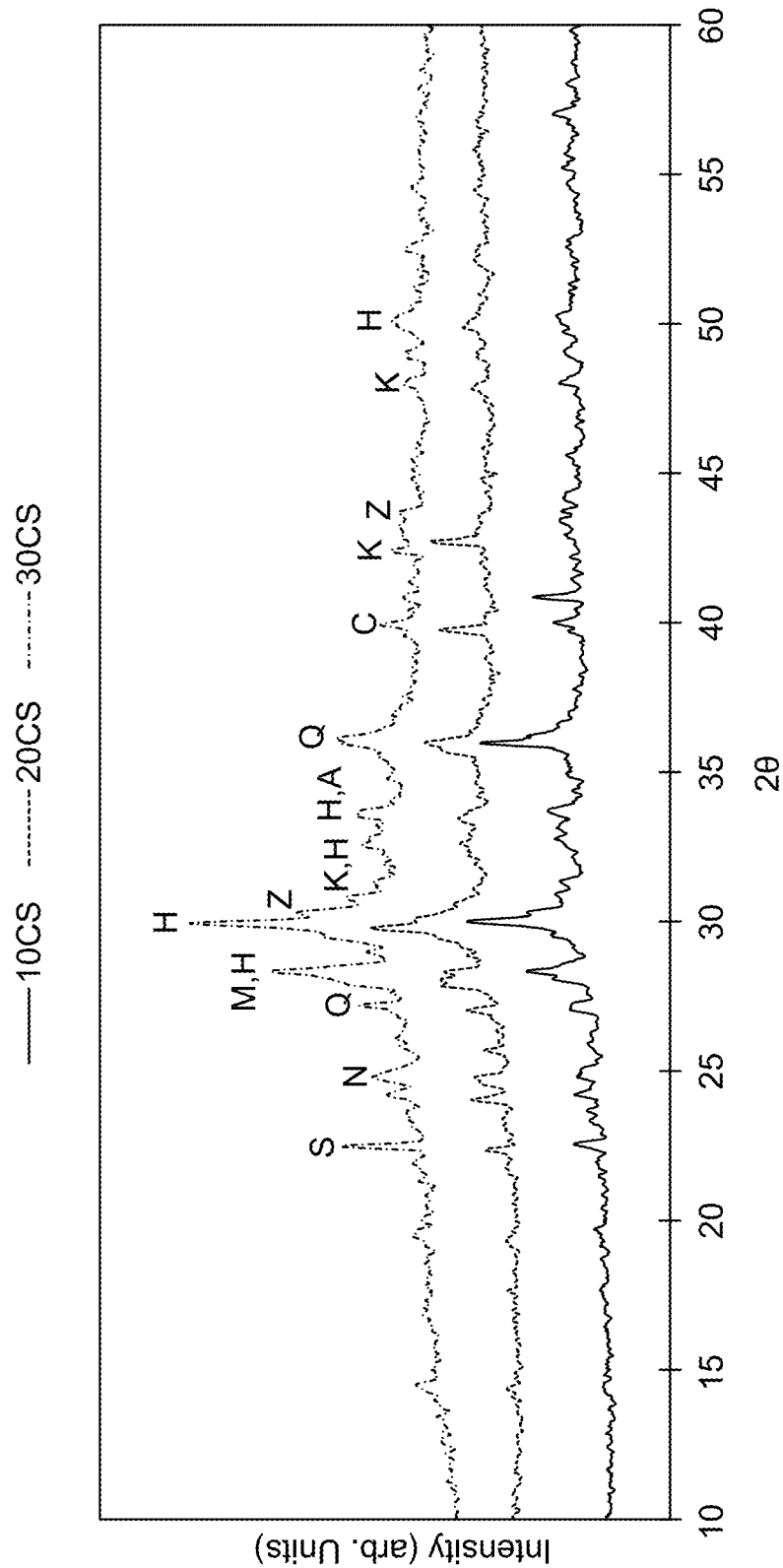
FIG. 26A is an X-ray diffraction (XRD) diffractogram showing the influence of OPC content on calcite (C), stralingite (S), nchwaningite (N), quartz (Q), manganese-calcium-hydrate (M), CSH (H), feldpar (K), anorthite (A), hydrotalcite (D), portlandite (CH), NASH (Z), according to certain embodiments.
Figure 26B:
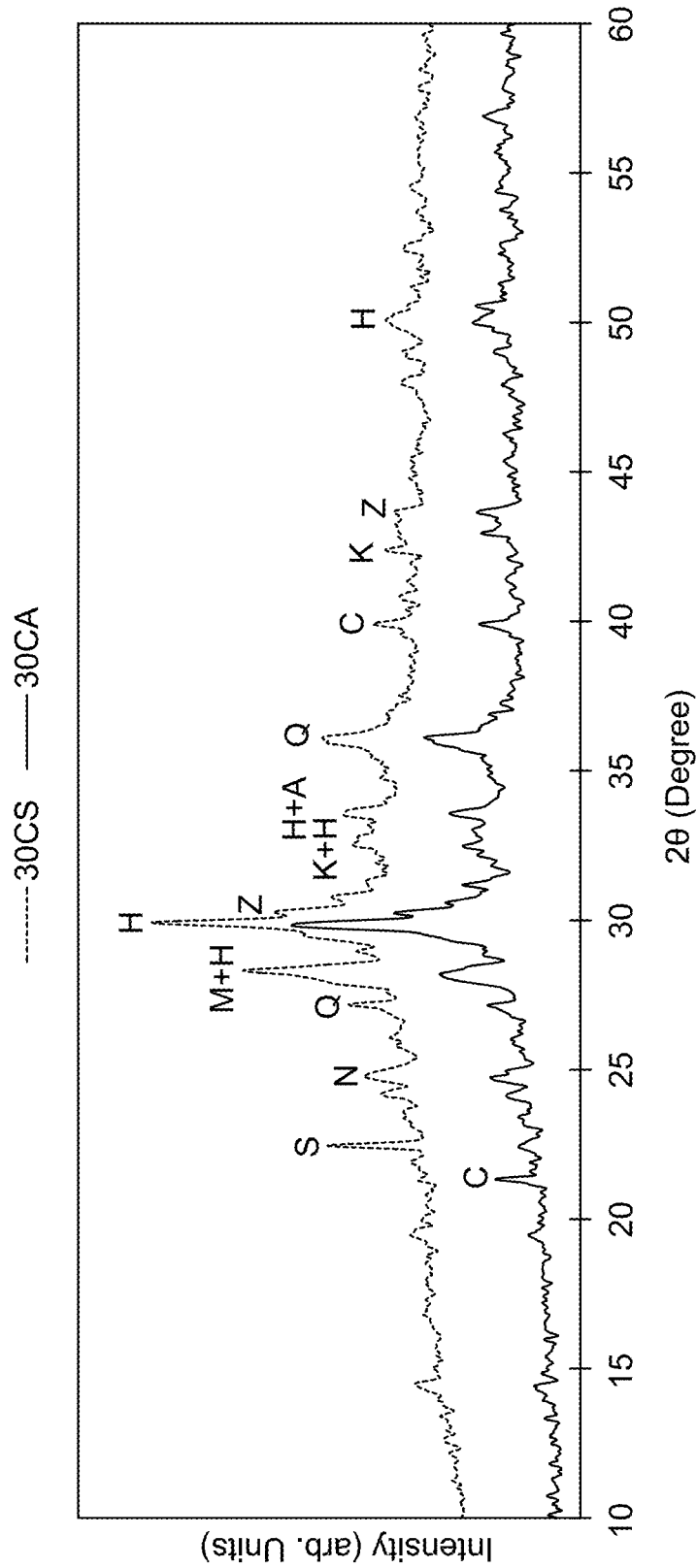
FIG. 26B is an XRD diffractogram showing the influence of curing method on calcite (C), stralingite(S), nchwaningite (N), quartz (Q), manganese-calcium-hydrate (M), CSH (H), feldpar (K), anorthite (A), hydrotalcite (D), portlandite (CH), NASH (Z), according to certain embodiments.

In some embodiments, the ambient-air cured specimen has at least a first intense peak with a 2 theta (θ) value in a range of 20 to 25°, preferably about 21.8°, in an X-ray diffraction (XRD) spectrum, as depicted in FIGS. 26A and 26B. In some embodiments, the ambient-air cured specimen has at least a second intense peak with a 2θ value in a range of 26 to 33°, preferably about 28 to 30° in the XRD spectrum. In some embodiments, the ambient-air cured specimen has at least a third intense peak with a 2θ value in a range of 30 to 35°, preferably about 34° in the XRD spectrum. In some embodiments, the ambient-air cured specimen has at least a fourth intense peak with a 2θ value in a range of 35 to 38°, preferably about 35.8° in the XRD spectrum. In some embodiments, the ambient-air cured specimen has at least a fifth intense peak with a 2θ value in a range of 38 to 42°, preferably about 40° in the XRD spectrum. Other ranges are also possible.

In some embodiments, the steam cured specimen has at least a first intense peak with a 2 theta (θ) value in a range of 20 to 25°, preferably about 22.7°, in an X-ray diffraction (XRD) spectrum, as depicted in FIGS. 26A and 26B. In some embodiments, the steam cured specimen has at least a second intense peak with a 2θ value in a range of 25 to 32°, preferably about 28 to 29° in the XRD spectrum. In some embodiments, the steam cured specimen has at least a third intense peak with a 2θ value in a range of 32 to 35°, preferably about 33.5° in the XRD spectrum. In some embodiments, the steam cured specimen has at least a fourth intense peak with a 2θ value in a range of 35 to 38°, preferably about 35.5° in the XRD spectrum. In some embodiments, the steam cured specimen has at least a fifth intense peak with a 2θ value in a range of 38 to 42°, preferably about 40° in the XRD spectrum. Other ranges are also possible.

Referring to FIGS. 28A to 28F, the steam cured specimen has fewer cracks compared to the ambient-air cured specimen. Further, the steam-cured specimen has fewer unhydrated particles, a denser microstructure with fewer voids, and a more homogenous microstructure where the voids and cracks are filled with a network of polymerization/hydration products.

The cured specimen has a compressive strength of 10 to 50 MPa as determined by ASTM C39 [Standard Test Method for Compressive Strength of Cylindrical Concrete Specimens, ASTM C39, which is incorporated herein by reference in its entirety]. In some embodiments, referring to FIG. 13C, the compressive strength of the cured specimen is preferably 20, preferably 30, preferably 40, preferably 50, to preferably about 60 MPa. Other ranges are also possible.

The cured specimen has a modulus of elasticity of 5 to 20 GPa as determined by ASTM C469 [Standard Test Method for Static Modulus of Elasticity and Poisson's Ratio of Concrete in Compression, ASTM C469, which is incorporated herein by reference in its entirety]. In some embodiments, referring to FIG. 16, the modulus of elasticity of the cured specimen is preferably 4, preferably 10, preferably 15, preferably 20, to preferably about 40 MPa. Other ranges are also possible.

The cured specimen has a split tensile strength of 1 to 4 MPa as determined by ASTM C496 [Standard Test Method for Splitting Tensile Strength of Cylindrical Concrete Specimens, ASTM C496, which is incorporated herein by reference in its entirety]. In some embodiments, referring to FIG. 14, the split tensile strength of the cured specimen is preferably 0.5, preferably 1.5, preferably 2.5, preferably 3.5, to preferably about 5 MPa. Other ranges are also possible.

The cured specimen has a drying shrinkage of 90 to 650 microstrains as determined by ASTM C596 [Standard Test Method for Drying Shrinkage of Mortar Containing Hydraulic Cement, ASTM C596, which is incorporated herein by reference in its entirety]. In some embodiments, referring to FIGS. 18 and 19, the drying shrinkage of the cured specimen is preferably 50, preferably 150, preferably 250, preferably 350, preferably 450, preferably 550, preferably 650, to preferably about 750 microstrains. Other ranges are also possible.

Figure 27:
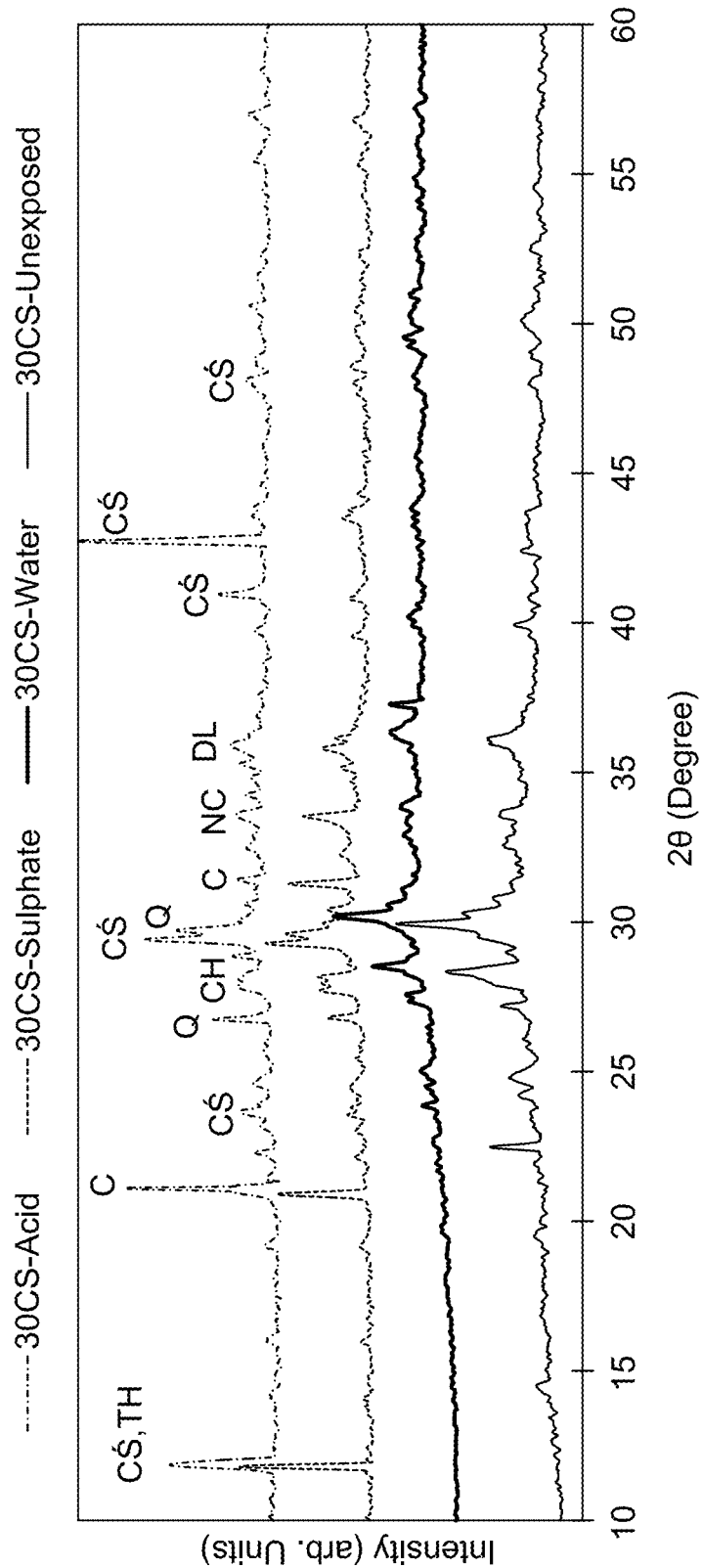
FIG. 27 is an XRD diffractogram showing the effect of acid and sulphate exposure on calcite (C), quartz (Q), portlandite (CH), calcium sulphate dihydrate (CS), natrite (NS), dolomite (DL), thaumasite (TL), according to certain embodiments.

The cured specimen has a residual strength of 10 to 35 MPa after an acid attack as determined by ASTM C1898 [Standard Test Methods for Determining the Chemical Resistance of Concrete Products to Acid Attack, ASTM C1898, which is incorporated herein by reference in its entirety]. In some embodiments, referring to FIG. 22, the residual strength of the cured specimen after an acid attack is preferably 5, preferably 15, preferably 25, preferably 35, to preferably about 45 MPa. Other ranges are also possible. Referring to FIGS. 30A to 30F, the cured specimen after an acid attack has uneven surfaces with cracks, pits, and loose materials. The cracks, pits, and loose materials on the uneven surfaces of the cured specimen after an acid attack comprises portlandite in the form of platelets, calcite in the form of flakes, thaumasite in the form of radial needles, and calcium sulfate dihydrate in the form of flake like crystals. In some preferred embodiments, calcite, dolomite and natrite were observed and determined by XRD spectrum, as depicted in FIG. 27.

Figure 25:
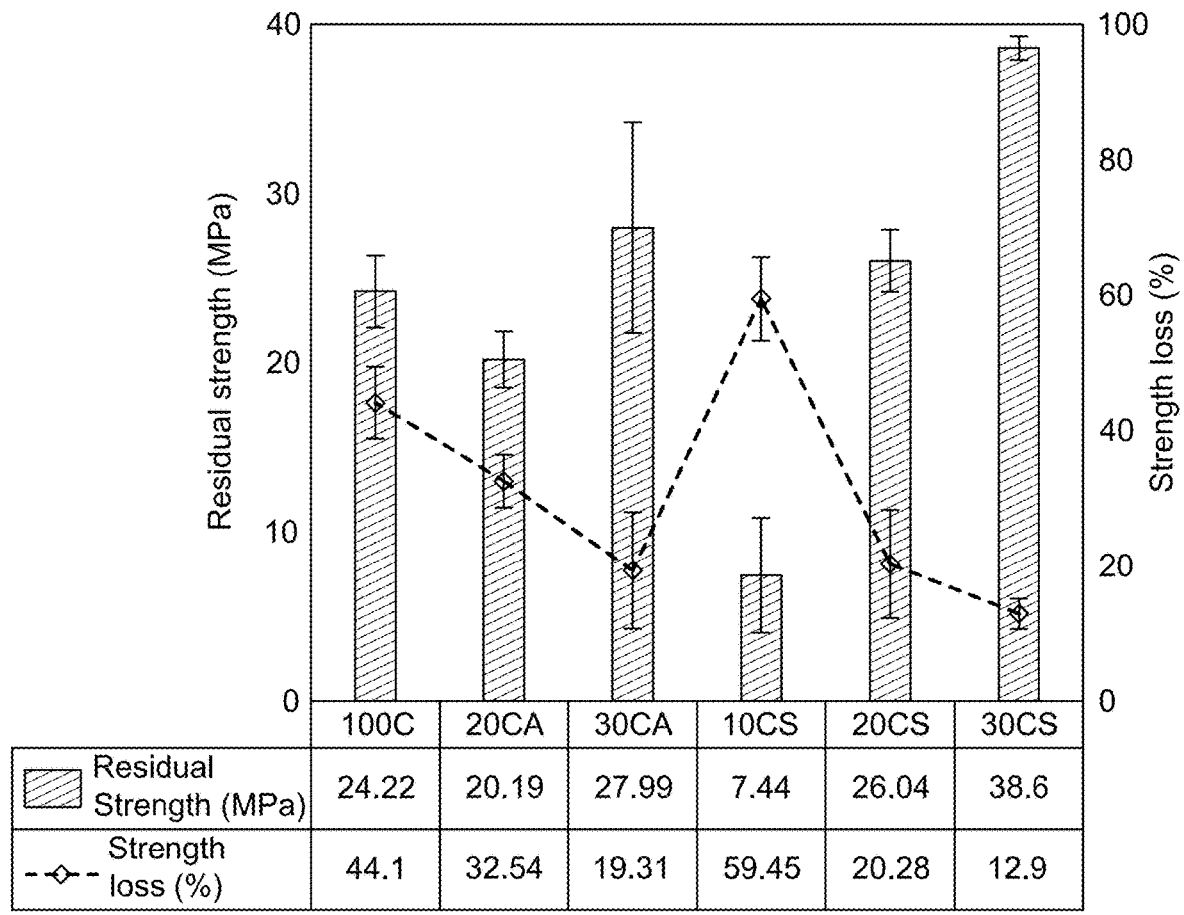
FIG. 25 shows strength loss and residual strength of control OPC and the AAB paste specimens after 180 days of exposure to 20% sulfate salts, according to certain embodiments.

The cured specimen has a residual strength of 5 to 40 MPa after a sulfate attack as determined by ASTM C1012 [Standard Test Method for Length Change of Hydraulic-Cement Mortars Exposed to a Sulfate Solution, ASTM C1012, which is incorporated herein by reference in its entirety]. In some embodiments, referring to FIG. 25, the residual strength of the cured specimen after a sulfate attack is preferably 5, preferably 20, preferably 30, preferably 40, to preferably about 50 MPa. Other ranges are also possible. Referring to FIGS. 31A to 31F, the cured specimen after a sulfate attack has uneven surfaces with cracks, pits, and loose materials. The cracks, pits, and loose materials on the uneven surfaces of the cured specimen after a sulfate attack comprises portlandite in the form of platelets, calcite in the form of flakes, thaumasite in the form of radial needles, ettringite in the form of rod-like crystals. and calcium sulfate dihydrate in the form of flake like crystals.

The cured specimen has a non-steady state chloride migration coefficient ($D_{nssm}$) in a range of 17.5 to 29.6×10$^{-12}$ m$^2$/s as determined by ASTM C1202 [Standard Test Method for Electrical Indication of Concrete's Ability to Resist Chloride Ion Penetration, ASTM C1202, which is incorporated herein by reference in its entirety]. In some embodiments, referring to FIG. 35, the $D_{nssm}$ of the cured specimen is preferably 5×10$^{-12}$, preferably 10×10$^{-12}$, preferably 20×10$^{-12}$, preferably 30×10$^{-12}$, to preferably about 40×10$^{-12}$ m$^2$/s. Other ranges are also possible.

The cured specimen has a chloride diffusion coefficient ($D_a$) in a range of 53×10$^{-12}$ to 17.6×10$^{-12}$ m$^2$/s for the free chloride and from 35.1×10$^{-12}$ to 7.8×10$^{-12}$ m$^2$/s for the total chloride as determined by ASTM C1152 and C1156 [Standard Test Method for Acid-Soluble Chloride in Mortar and Concrete, ASTM C1152; and Standard Guide for Establishing Calibration for a Measurement Method Used to Analyze Nuclear Fuel Cycle Materials, ASTM C1156, each of which is incorporated herein by reference in their entireties]. In some embodiments, referring to FIGS. 37A, 37B, 38, and 39, the $D_a$ of the cured specimen is 60×10$^{-12}$ preferably 50×10$^{-12}$, preferably 40×10$^{-12}$, preferably 30×10$^{-12}$, preferably 20×10$^{-12}$, preferably 10×10$^{-12}$, to preferably about 5×10$^{-12}$ m$^2$/s for the free chloride. In some further embodiments, the $D_a$ of the cured specimen is 50×10$^{-12}$ preferably 40×10$^{-12}$, preferably 30×10$^{-12}$, preferably 20×10$^{-12}$, preferably 10×10$^{-12}$, preferably 5×10$^{-12}$, to preferably about 1×10$^{-12}$ m$^2$/s for the total chloride. Other ranges are also possible.

The cured specimen has a surface chloride diffusion concentration ($C_s$) in a range of 0.104 to 0.371 wt. % based on a total weight of the cured specimen for the free chloride and from 0.118 to 0.460 wt. % based on the total weight of the cured specimen for the total chloride, as determined by ASTM C1152 and C1156 [Standard Test Method for Acid-Soluble Chloride in Mortar and Concrete, ASTM C1152; and Standard Guide for Establishing Calibration for a Measurement Method Used to Analyze Nuclear Fuel Cycle Materials, ASTM C1156, each of which is incorporated herein by reference in their entireties]. In some embodiments, referring to FIGS. 37A, 37B, 38, and 39, the $C_s$ of the cured specimen is preferably 0.05 wt. %, preferably 0.1 wt. %, preferably 0.2 wt. %, preferably 0.3 wt. %, 0.4 wt. %, to preferably about 0.5 wt. %, based on the total weight of the cured specimen for the free chloride. In some embodiments, referring to FIGS. 37A, 37B, 38, and 39, the $C_s$ of the cured specimen is preferably 0.1 wt. %, preferably 0.2 wt. %, preferably 0.3 wt. %, preferably 0.4 wt. %, 0.5 wt. %, to preferably about 0.6 wt. %, based on the total weight of the cured specimen for the total chloride. Other ranges are also possible.

Figure 8:
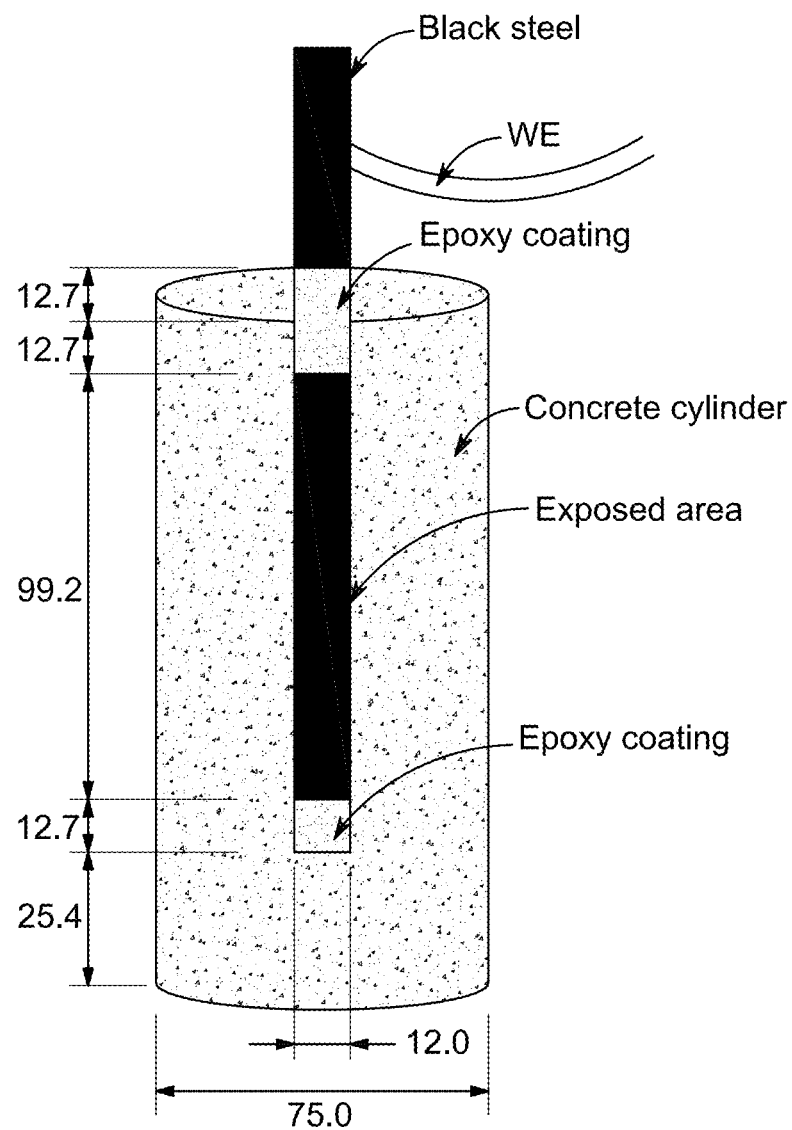
FIG. 8 is a schematic illustration depicting configuration of reinforced concrete specimen for electrochemical tests, according to certain embodiments.
Figure 9:
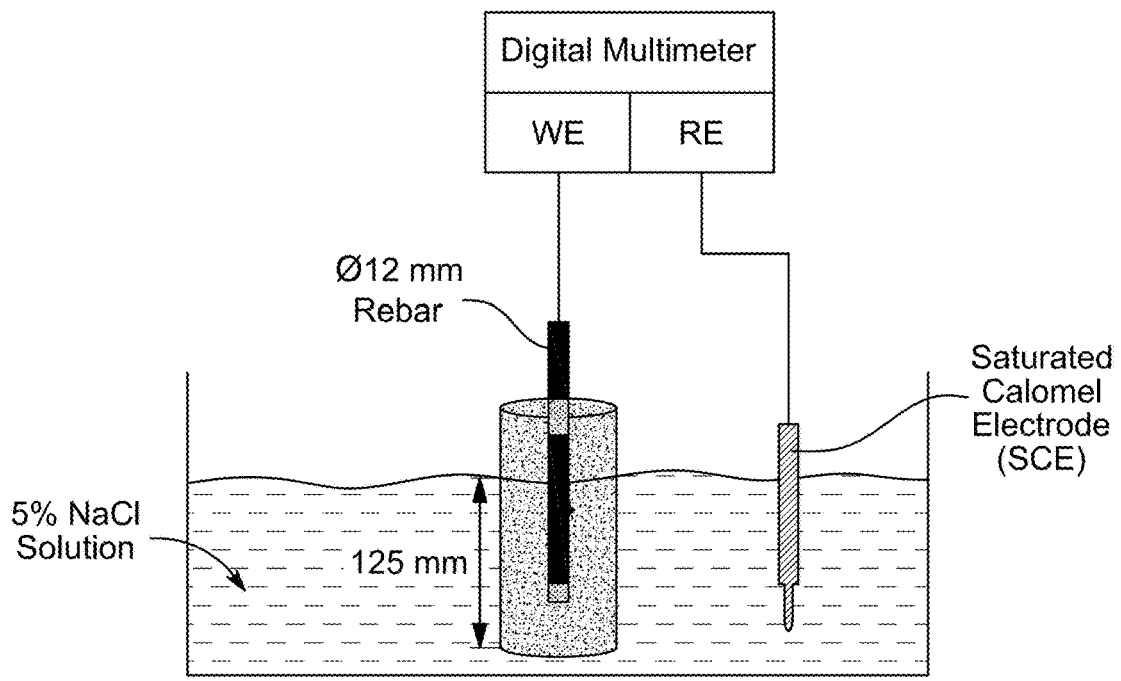
FIG. 9 is a schematic illustration depicting a setup for monitoring half-cell potential, according to certain embodiments.
Figure 10:
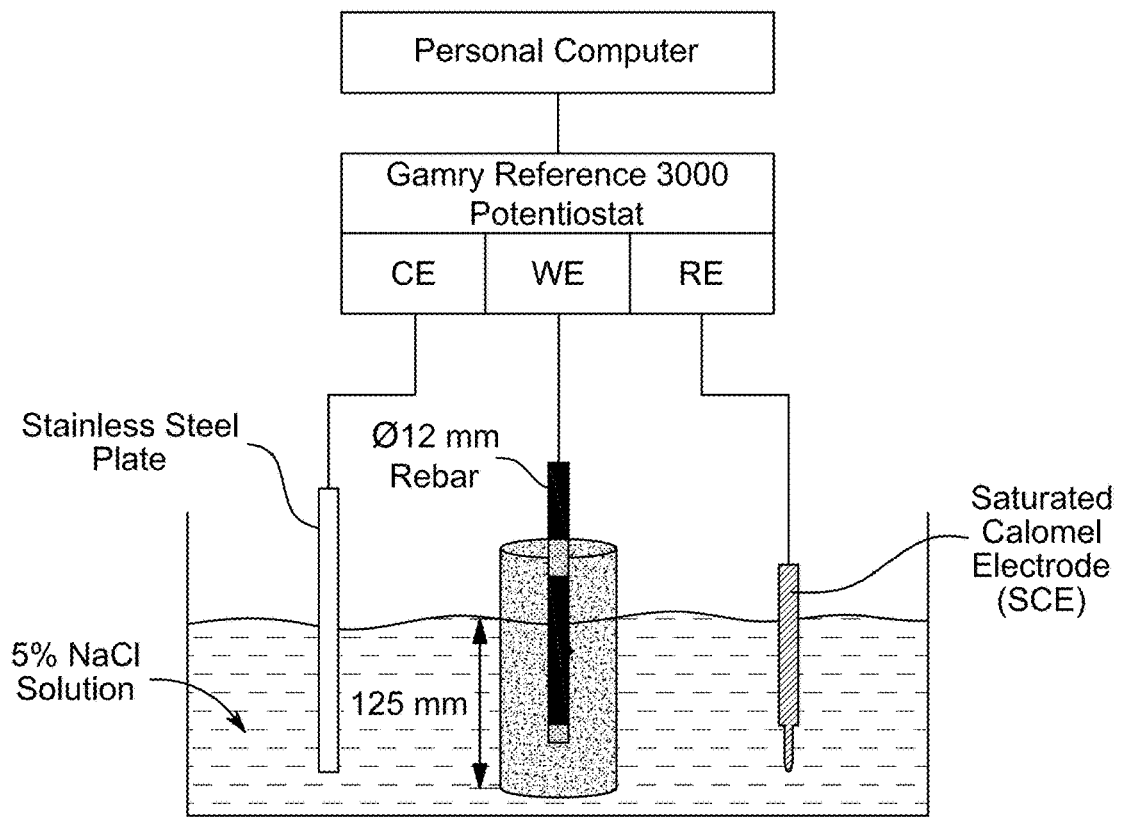
FIG. 10 is a schematic illustration depicting a setup for monitoring reinforcement corrosion current density, according to certain embodiments.

The half-cell potential, e.g., corrosion potential $E_{corr}$, and corrosion current density ($I_{corr}$) are tested during chloride exposure of the cured specimen, as determined by ASTM C876 [Standard Test Method for Corrosion Potentials of Uncoated Reinforcing Steel in Concrete, ASTM C876, which is incorporated herein by reference in its entirety], and depicted in FIGS. 8 to 10. In some embodiments, referring to FIG. 40, the cured specimen has a $E_{corr}$ value in a range of −900 to −250 mV, preferably −850 to −300 mV, preferably −800 to −350 mV, preferably −750 to −400 mV, preferably −700 to −450 mV, preferably −650 to −500 mV, or even more preferably −600 to −550 mV, each mV as measured against a saturated calomel electrode (SCE). Other ranges are also possible. In some further embodiments, referring to FIG. 41, the cured specimen has an $I_{corr}$ value in a range of 0.05 to 2 μA/cm$^2$, preferably 0.1 to 1.8 μA/cm$^2$, preferably 0.2 to 1.6 μA/cm$^2$, preferably 0.4 to 1.6 μA/cm$^2$, preferably 0.6 to 1.4 μA/cm$^2$, preferably 0.8 to 1.2 μA/cm$^2$, or even more preferably about 1 μA/cm$^2$. Other ranges are also possible.

The alkali-activated concrete (AAC) mixtures of the present disclosure show enhanced strength and durability characteristics. The inclusion of OPC in alkali-activated precursors in an amount of 10 to 30 wt. % by weight of the AAC mixture shows higher strength and durability characteristics than traditional OPC concrete, thus saving energy and reducing environmental pollution leading to a cleaner production of concrete.

EXAMPLES

The following examples demonstrate an alkali-activated cement composition as described herein. The examples are provided solely for illustration and are not to be construed as limitations of the present disclosure, as many variations thereof are possible without departing from the spirit and scope of the present disclosure.

Example 1: Precursor Materials (PMs)

Ordinary Portland cement (OPC) was obtained from the Eastern Province Cement Company (Kharasaniyah, Eastern Province, Saudi Arabia), while limestone powder (LSP) was obtained from Shibh Al Jazeera Contracting Company (Khurais, Riyadh Province, Saudi Arabia). Natural pozzolans (NP), silicomanganese fume or manganese furnace dust (SMF), and red mud (RM) were obtained from AlKifah Readymixture and Blocks (Second Industrial City, Eastern Province, Saudi Arabia), Gulf Ferro Alloys Company (Jubail, Eastern Province, Saudi Arabia), and Ma'aden (Al-Baaethah, Al-Qassim Province, Saudi Arabia), respectively. The PMs were used in their received condition, except the RM, which was pulverized by a commercial spice grinder with stainless steel grinding bowl and blades to pass an ASTM E11 Standard No. 100 sieve.

The physical properties including specific gravities of the PMs were determined using the Le Chatelier flask test conforming to ASTM C188 [Standard Test Method for Density of Hydraulic Cement, ASTM C188, which is incorporated herein by reference in its entirety], while the moisture content and loss-on-ignition (LOI) were determined using the two-step method described in ASTM D7348 [Standard Test Methods for Loss on Ignition (LOI) of Solid Combustion Residues, ASTM D7348, which is incorporated herein by reference in its entirety]. The color of the PMs, namely OPC, LSP, NP, SMF, and RM was identified by visual inspection, as shown in FIG. 2A-2E, respectively. The morphology was evaluated by scanning electron microscopy (SEM) using a JEOL JM-6610-LV microscope (manufactured by JEOL, 3-chōme-1-2 Musashino, Akishima, Tokyo 196-0021, Japan) at a current of 20 mA under high vacuum conditions. A Malvern™ Panalytical Mastersizer 3000 was used to find the average particle size ($D_{50}$) of the raw PMs. The physical properties of the raw PMs are summarized in Table 1.

TABLE 1

Physical properties of the raw PMs

| | Precursor material | | | | |
|---|---|---|---|---|---|
| Property | OPC | LSP | NP | SMF | RM |
| Color | Gray | White | Light grey | Dark brown | Reddish brown |
| Morphology | Irregular | Angular | Angular | Round | Round |
| $D_{50}(\mu m)$ | 13.83 | 16.21 | 15.74 | 30.45 | 33.25 |
| Specific gravity | 3.11 | 2.62 | 3.05 | 2.88 | 2.96 |
| LOI (%) | 3.88 | 7.96 | 1.23 | 8.61 | 7.5 |
| Moisture (%) | — | 1 | 1.23 | 0.96 | 2.08 |

SEM imaging of the raw precursor materials, as shown in FIGS. 3A-3E shows two types of textures. OPC (FIG. 3A), LSP (FIG. 3B), and NP particles (FIG. 3C) were observed to be angular, irregular, and/or flake-like, while SMF (FIG. 3D) and RM (FIG. 3E) are smooth and spherical, with the earlier texture leading to better interlocking among the hydrated particles while the latter improving consistency and flow due to the ball-bearing effect. Elemental analysis by energy dispersive spectroscopy (EDS) and X-ray fluorescence (XRF) agreed with the detected major elements, as shown in Table 2. OPC and LSP were mainly composed of calcium and silicon with traces of aluminum (FIG. 3A and FIG. 3B), while NP was high in silicon (>30%) and iron (>30%) (FIG. 3C). RM was composed mainly of aluminum, iron, and sodium (>80%) with traces of calcium (FIG. 3D). Finally, SMF was mainly composed of silicon and manganese (>75%) with minor traces of calcium and magnesium (FIG. 3E).

TABLE 2

Elemental composition of the raw PMs (without O and C)

| | | Element (% by wt.) | | | | | | | | | |
|---|---|---|---|---|---|---|---|---|---|---|---|
| PM | | Ca | Si | Al | Mn | Fe | K | Na | Mg | Ti | Cl | Cu |
| OPC | XRF | 84.8 | 6 | 3 | — | 4.5 | 0.5 | — | 0.9 | — | 0.1 | — |
| | SEM | 78.9 | 3.9 | 2.1 | — | 1.8 | 2.7 | — | 1.1 | — | 1.4 | 5.3 |
| LSP | XRF | 81.6 | 12.7 | 2.9 | — | 1.8 | — | — | 1 | — | — | — |
| | SEM | 74.8 | 15.6 | 1.9 | — | 1.7 | — | — | 1.8 | — | — | 4.1 |
| NP | XRF | 15.9 | 30.8 | 8.8 | — | 34.1 | 1.2 | 2.7 | 4.6 | 1.8 | — | — |
| | SEM | 16.2 | 33.5 | 12.4 | — | 16.7 | 1.9 | 3.8 | 6 | 2 | — | 3.2 |
| RM | XRF | 4.7 | 6.9 | 10.9 | — | 60.7 | — | 12.4 | — | 3.5 | — | — |
| | SEM | 9.8 | 13.5 | 20.8 | — | 27 | — | 18.3 | — | 10.6 | — | — |
| SMF | XRF | 3.4 | 15.5 | — | 71.6 | 4.1 | 0.7 | — | 4.2 | — | — | — |
| | SEM | 10 | 24.7 | — | 50.2 | 3 | 0.9 | — | 7 | — | — | 3.6 |

The major oxides are presented in Table 3, which were determined by X-ray fluorescence (XRF) spectroscopy using a Malvern Panalytical Epsilon 3XL spectrometer. The CaO content in NP, RM, and SMF was less than 13.5%, while it was the major oxide in OPC and LSP. However, CaO in the LSP might be in the form of a carbonate phase. According to ASTM C618 [Standard Specification for Coal Fly Ash and Raw or Calcined Natural Pozzolan for Use in Concrete, ASTM C618, which is incorporated herein by reference in its entirety], RM, and NP can be classified as pozzolans (Type N, F, or C) since they satisfy the criteria for combined silica, alumina, and iron oxide content in addition to LOI and moisture content. Furthermore, the basicity coefficient of NP and SMF is less than 1, which would indicate that they can be classified as acidic in nature, while the remaining raw PMs can be classified as basic.

TABLE 3

Major oxide composition of the raw PMs

| | Oxide (% by wt.) | | | | | | | | | |
|---|---|---|---|---|---|---|---|---|---|---|
| PM | CaO | $SiO_2$ | $Al_2O_3$ | MnO | FeO | $K_2O$ | $Na_2O$ | MgO | $TiO_2$ | Basicity Coeff. | ASTM C618 ($SiO_2 + Al_2O_3 + FeO$) |
| OPC | 84.4 | 6.3 | 1.3 | — | 5.7 | 0.2 | — | 0.5 | — | 9.7 | — |
| LSP | 83.1 | 11.4 | 2.5 | — | 1.7 | — | — | — | — | 7.1 | 4 |
| NP | 13.5 | 37.1 | 10 | — | 28.8 | 0.9 | — | 4.6 | 1.8 | 0.8 | 76 |
| RM | 4.6 | 10.2 | 14.2 | — | 53.9 | — | 11.5 | 5.6 | 4 | 1.4 | 78 |
| SMF | 2.8 | 13.8 | — | 75.4 | 4.3 | 0.1 | — | 2.5 | — | 0.5 | 18 |

Example 2: Alkaline Activators

A mixture of sodium hydroxide (NH) and sodium silicate (NS) was used as the activator. NH pellets of commercial quality (95% purity) that were procured from Basic Chemicals Industries (Dammam, KSA) were dissolved in distilled water at a concentration of 10 mol/liters (10 M). Since the molecular weight of NaOH is 40 g/mol, 421 grams (to account for the purity) was dissolved in 500 ml of distilled water initially and then stirred while covered until the pellets were totally dissolved. After that, the solution was transferred to a 1-liter volumetric flask, and distilled water was added until the volume reached to one liter. The solution's concentration was calibrated by titration against hydrochloric acid and stirred while covered until the solids had totally dissolved. The mixture was allowed to cool down and then calibrated by titration against hydrochloric acid.

Commercial water glass (sodium silicate [$Na_2SiO_3$]) with a silica modulus ($SiO_2/Na_2O$ ratio) of 3.3 and a specific gravity of 1.385 (63% $H_2O$, 28.5% $SiO_2$, and 8.5% $Na_2O$) was obtained from Fouz Chemical Company (Dammam, KSA). It was added to the previously mentioned NH solution at varying NS/NH ratios and stirred until homogenous mixtures were obtained. They were then allowed to cool down for at least 24 hours before using to ensure homogeneity and avoid any temperature variance influence on the mixture properties. The activator solution was stored in an air-tight opaque polyethylene container until use.

Example 3: Coarse and Fine Aggregates

Figure 4:
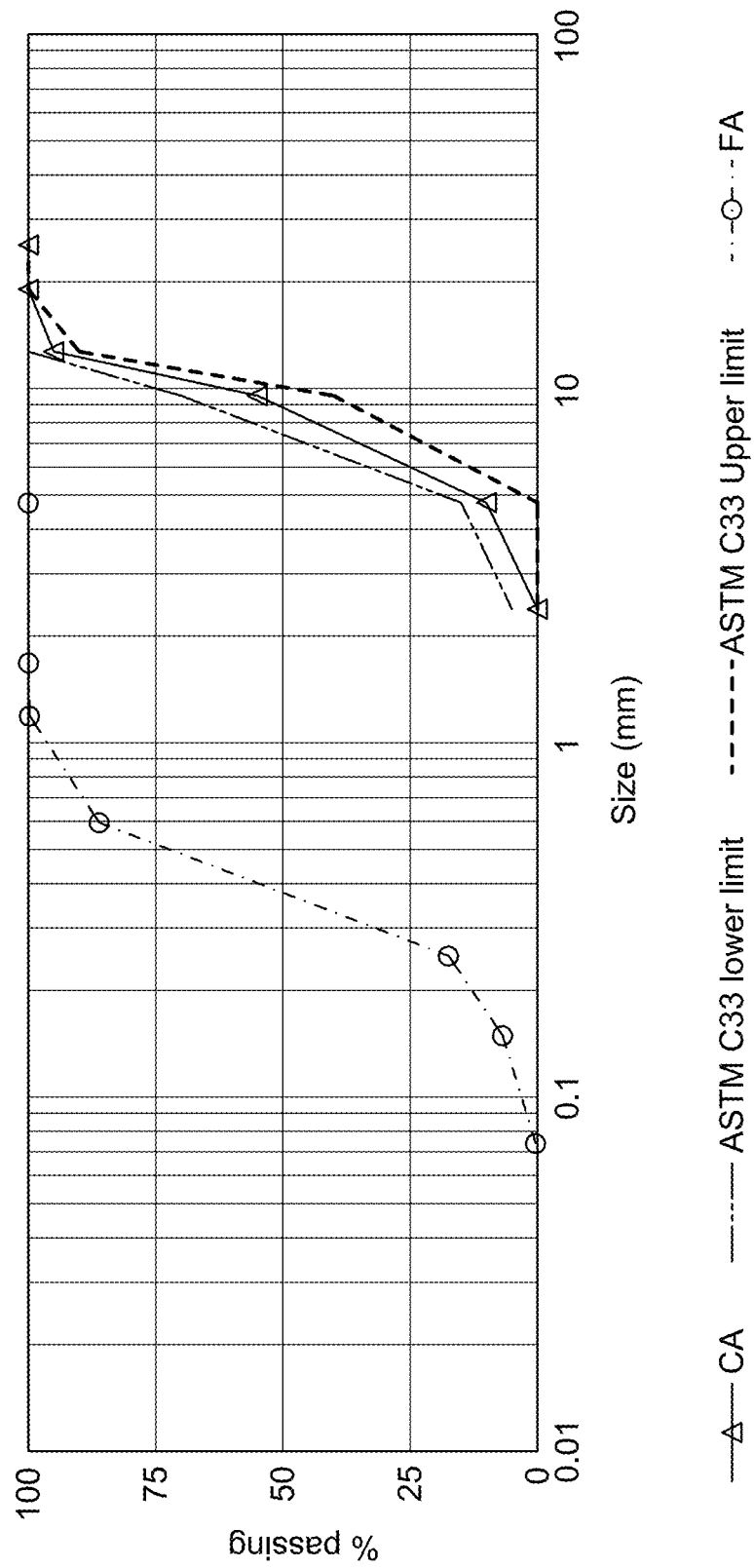
FIG. 4 is a graph depicting gradation of the fine aggregate (FA) and coarse aggregate (CA), according to certain embodiments.

Dune sand from the Eastern Province of Saudi Arabia conforming to ASTM (was chosen with a maximum aggregate size of 12.5 mm (½ inch)) with a specific gravity, fineness modulus, moisture content, and water absorption of 2.64, 2.9, 0.12%, and 0.58%, respectively, was used as the fine aggregate (FA). The sand was stored in the sealed drum to maintain the same moisture content. Calcareous limestone aggregates from the Riyadh Province of Saudi Arabia that has a specific gravity of 2.55, absorption of 1.6%, and moisture content of 0.98% were used as a coarse aggregate. The coarse aggregate had a maximum size of 12.5 mm and consisted of the particle size distribution, as follows: 5, 40, 45, and 10% particles retained on 12.5, 9.5, 4.75-, and 2.36-mm sieves, respectively. The gradation of the fine aggregate (FA) and coarse aggregate (CA) were shown in FIG. 4.

Example 4: Mixture Preparation

Unlike a conventional OPC binder, there are multiple factors that influence the properties of the developed AABs. Generally, these factors can be divided into three main categories: (a) precursor composition, (b) activator characteristics that include the activator to precursor (A/P) ratio, the sodium silicate to sodium hydroxide (NS/NH) ratio, the sodium hydroxide (NH) concentration, and water to precursor (W/P) ratio, (c) curing regime. Firstly, the precursor composition (i.e., proportioning of PMs) was obtained based on the results of the flow, setting times and compressive strength tests on trial mortar mixtures. Three precursor compositions were tested (with varying weight percentages of i.e., NP, LSP, SMF, RM, and OPC) and then the levels of the activation parameters were determined through experiments described in the present disclosure.

Firstly, NP was considered as a sole precursor and then the other raw PMs were added in stages while maintaining the same activation parameters (A/P=0.5, NS/NH=1, NH concentration=14 mol/L, W/P=0.35) to observe the influence of the precursor composition alone. In total, ten different trial combinations of PMs were tested, and mortar specimens were prepared. The compressive strength (f'c) of all ten mortar mixtures was determined at the age of 28 days. As shown in Table 4A, three precursor compositions 10C, 20C, and 30C (i.e., containing 10, 20, and 30% OPC) were selected based on the acceptable values of f'c (i.e., ≥20 MPa).

TABLE 4A

Proportioning of precursors

| ID | Proportion of PMs (% by wt.) | | | | | 28-day | |
|---|---|---|---|---|---|---|---|
| | OPC | NP | LSP | SMF | RM | $f_c$ (MPa) | σ (MPa) |
| 10C | 10 | 50 | 10 | 10 | 20 | 25.99 | 0.9 |
| 20C | 20 | 40 | 10 | 10 | 20 | 41.06 | 0.5 |
| 30C | 30 | 30 | 10 | 10 | 20 | 56.14 | 1.4 |

Secondly, before testing the AAC mixtures for durability, the activation parameters in addition to the curing regimes were determined following a systematic approach where one activation parameter was varied at each step. The activation parameters were found to be as follows: A/P=0.5, NS/NH=2, NH concentration=10 mol/liter, W/P=0.4. As shown in Table 4B, in total, 6 AAC mixtures were tested (3 precursor compositions×2-curing regimes×1-designed set of activation parameters) for evaluation of their physical, mechanical, shrinkage and durability characteristics, as shown in Table 4B. In addition to these six AACs, a conventional concrete mixture prepared using OPC alone as binder and wet-cured was considered as a control.

TABLE 4B

Proportioning of mixtures

| ID* | Curing regime | Proportion of PMs (% by wt.) | | | | |
|---|---|---|---|---|---|---|
| | | OPC | NP | LSP | SMF | RM |
| 10CA | Ambient air curing | 10 | 50 | 10 | 10 | 20 |
| 20CA | | 20 | 40 | 10 | 10 | 20 |
| 30CA | | 30 | 30 | 10 | 10 | 20 |
| 10CS | Steam curing for 24 hours | 10 | 50 | 10 | 10 | 20 |
| 20CS | | 20 | 40 | 10 | 10 | 20 |
| 30CS | | 30 | 30 | 10 | 10 | 20 |

*Naming followed the formula ($a_1$)C($a_2$), where $a_1$ represents the OPC content expressed as a percentage of the precursor and $a_2$ represents the curing regime where "S" is used for steam curing for 24 hours and "A" is used for ambient air curing. For example, 10CS is the label of the mixture with 10% OPC in its precursor that was steam cured for 24 hours.

The proportioning of all six AAC mixtures, as shown in Table 4B, was carried out using a modified version of the ACI's mixture design method. The absolute volume equation, used for determining the quantities of the AAC's ingredients, is as follows:

$$V_C = V_P + V_{NS} + V_{NH} + V_{CA} + V_{FA} + V_{Wa} + V_{air} \quad \text{Equation 1}$$

Where $V_C$, $V_P$, $V_{NS}$, $V_{NH}$, $V_{CA}$, $V_{FA}$, $V_{Wa}$, $V_{air}$, are the absolute volumes of concrete, precursor, NS, NH, CA, FA, additional water, and air, respectively. Considering the volume of the concrete as 1 m³, the absolute volume of each ingredient can be converted to their respective weights (W) in kg divided by their absolute densities (ρ=unit weight of water×specific gravity) in kg/m³, as follows:

$$1 = \frac{W_P}{\rho_P} + \frac{W_{NS}}{\rho_{NS}} + \frac{W_{NH}}{\rho_{NH}} + \frac{W_{CA}}{\rho_{CA}} + \frac{W_{FA}}{\rho_{FA}} + \frac{W_W}{\rho_W} + V_{air} \quad \text{Equation 2}$$

The absolute density of the precursor (containing five different PMs) can be calculated as follows:

$$\rho_P = W_P \left( \frac{W_{OPC}}{\rho_{OPC}} + \frac{W_{LSP}}{\rho_{LSP}} + \frac{W_{NP}}{\rho_{NP}} + \frac{W_{RM}}{\rho_{RM}} + \frac{W_{SMF}}{\rho_{SMF}} \right)^{-1} \quad \text{Equation 3}$$

The precursor's content per cubic meter of concrete ($W_P$) and the coarse aggregate ratio to total aggregate (CA/TA) were chosen to be 400 kg/m³ and 0.6 (by weight), respectively. The air content was assumed to be 3% based on the nominal maximum aggregate size. The six AAC mixtures (10CS, 20CS, 30CS, 10CA, 20CA, and 30CA) and a control OPC mixture labeled "100C" (since the binder was composed of OPC alone as a binder in order to compare the performance of AACs to traditional OPC mixtures) were conducted for casting and testing. The proportions of all seven mixtures, as obtained from the calculations using the absolute volume method described above, are presented in Table 5.

Example 5: Specimen Testing

Six AACs were tested in addition to a control OPC mixture. The naming follows the formula x1Cx2 where x1 stand for the OPC content as percentage of the precursor and x2 stands for the curing method such that A is for the ambient air curing method and S is for the steam curing method. For example, the mix labeled as 30CS has the precursors containing 30% OPC and is steam cured. On the other hand, the control is given the name 100C since it contains 100% OPC as a binder.

Example 6: Casting and Curing

The molds were assembled and coated with oil using a soft brush, and any excess oil was allowed to drain. Then, the coarse aggregate, fine aggregate, and dry precursor materials were mixed thoroughly in the basin of a wheelbarrow until a homogenous dry mixture was achieved. The activator solution and additional water were then added in thirds and mixed for 2 minutes between each addition of the liquids. When the final third was added, the concrete was mixed for an additional 4 minutes and then was cast in the prepared molds in three layers while being vibrated for 20 seconds between each pour. The top surface was then leveled using a trowel, and the specimens were covered with plastic sheets until setting to prevent moisture loss. The specimens were demolded after 24 hours of casting and cleaned with a soft vinyl paintbrush to remove any loose debris and excess oil on the surface. The same mixing and demolding procedures were followed for mortar and paste specimens (mortar used for drying shrinkage monitoring and paste used for sulfate and acid attacks evaluation, and for microstructural analysis) except for adding the coarse and fine aggregate, respectively.

Ambient-air curing specimens (i.e., mixtures 10CA, 20CA, and 30CA) were wrapped in plastic cling-film, kept inside polyethylene bags, and sealed under room temperature conditions (23±5° C. and 60% relative humidity) until testing. As for the steam-cured mixtures (i.e., 10CS, 20CS, and 30CS), the specimens were placed after 'demolding and cleaning inside a chamber that was provided with a resistance-heating element. The specimens were suspended inside the chamber using a screen, and the chamber was half-filled with potable water. The heating element was set to boil the water, and the chamber was covered with a lid to allow condensation. Steaming was carried out for 24 hours, and then the specimens were allowed to cool down to room temperature inside the chamber. They were then wiped with a microfiber cloth and sealed inside bags under the same conditions as the ambient-air specimens until testing. Finally, the control mixture specimens (i.e., 100C) were de-molded and cured by submersion in potable water for 28 days at room temperature, after which the specimens were allowed to air-dry and then sealed inside bags to minimize carbonation until testing.

TABLE 5

Mixture proportioning

| Mixture Group | Mixture ID | Proportion (kg/m³ concrete) | | | | | | | | | | |
|---|---|---|---|---|---|---|---|---|---|---|---|---|
| | | OPC | LSP | NP | RM | SMF | NS | NH | Water | FA | CA | W/P | Curing |
| Steam group | 10CS | 40 | 40 | 200 | 40 | 80 | 133 | 67 | 33 | 677 | 1016 | — | Steam |
| | 20CS | 80 | 40 | 160 | 40 | 80 | 133 | 67 | 33 | 678 | 1017 | — | for |
| | 30CS | 120 | 40 | 120 | 40 | 80 | 133 | 67 | 33 | 679 | 1018 | — | 24 hours |
| Ambient air group | 10CA | 40 | 40 | 200 | 40 | 80 | 133 | 67 | 33 | 677 | 1016 | — | Ambient |
| | 20CA | 80 | 40 | 160 | 40 | 80 | 133 | 67 | 33 | 678 | 1017 | — | air |
| | 30CA | 120 | 40 | 120 | 40 | 80 | 133 | 67 | 33 | 679 | 1018 | 0.4 | |
| Control | 100C | 400 | — | — | — | — | — | — | 161 | 705 | 1058 | — | Standard |

TABLE 6

Summary of tests conducted on the AAC, mortar, and paste specimens.

| | Test | Standard | Specimen type | Specimen size | Number of samples | Age at test | Duration |
|---|---|---|---|---|---|---|---|
| Physical properties | Density, Void and Absorption | ASTM C642 | Concrete | 75 mm dia. cylinder | 3 | 28 days | — |
| Mechanical properties | Compressive strength | ASTM C39 | Concrete | 75 mm dia. cylinder | 3 | 28 days | — |
| | Modulus of elasticity | ASTM C469 | Concrete | 75 mm dia. cylinder | 3 | 28 days | — |
| | Split tensile strength | ASTM C496 | Concrete | 75 mm dia. cylinder | 3 | 28 days | — |
| Shrinkage | Drying Shrinkage | ASTM C596 | Mortar | 25 mm × 25 mm × 250 mm prism | 3 | 28 days | 180 days |
| Acid and sulphate Attack | Acid attack | ASTM C1898 | Paste | 25 mm cube | 3 | 28 days | 90 days |
| | Sulphate attack | ASTM C1012 | Paste | 25 mm cube | 3 | 28 days | 180 days |
| Micro-structure | XRD | — | Paste | 25 mm cube | 1 | 28, 118, 208 days | — |
| | SEM-EDS | — | Paste | 25 mm cube | 1 | 28, 118, 208 days | — |

Specimen size and type varied based on the test to be conducted. Acid and sulfate attack, mineralogical and morphological tests were conducted on paste samples, while the remaining tests were conducted on concrete specimens except for the drying shrinkage, which was conducted on mortar samples, as mentioned previously. Table 6 summarizes the specimen size, the number of samples, the standard followed, and the type of specimen for each test.

Example 7: Density, Void Ratio, and Water Absorption Test

Three 75 mm-diameter cylindrical concrete specimens were used to determine the density, void ratio, and water absorption by conducting a test on the specimens of AAC mixtures in accordance with the ASTM C642 standard [Standard Test Method for Density, Absorption, and Voids in Hardened Concrete, ASTM C642, which is incorporated herein by reference in its entirety]. This test shows the density, surface-connected and permeable voids (expressed as a percentage of the total volume), and water absorption capacity (expressed as a percentage by mass of concrete) by measuring the weight of specimens at different moisture and buoyancy conditions. The specimens were first oven-dried at a temperature of 110° C. for 48 hours, and their dry weights ($W_D$) were recorded. Then the specimens were submerged in boiling water for 6 hours, after which they were allowed to cool down while submerged in the water for a further 18-hour period, and their weights were monitored until no change in the weight was observed so as to ensure saturation. The final weight recorded during saturation was taken as the saturated-surface dry weight ($W_S$). After that, the specimens were suspended in water, and their suspended weights ($W_U$) were recorded. Finally, the dry density ($\rho_D$), saturated-surface dry density ($\rho_S$), apparent density ($\rho_A$), void ratio (v), and water absorption (ω) were calculated using the following equations (Equations 4 through 8):

$$\rho_D = [W_D/(W_S - W_U)] \times \rho_W \quad \text{Equation 4}$$

$$\rho_S = [W_S/(W_S - W_U)] \times \rho_W \quad \text{Equation 5}$$

$$\rho_A = [W_D/(W_D - W_U)] \times \rho_W \quad \text{Equation 6}$$

$$v = [(W_S - W_D)/W_D] \times 100 \quad \text{Equation 7}$$

$$\omega = [(W_S - W_D)/(W_S - W_U)] \times 100 \quad \text{Equation 8}$$

Where, $\rho_W$ is the density of water (i.e., 1000 kg/m³).

The values of density, void ratio, and water absorption for all concrete mixtures were measured conforming to ASTM C642, as shown in Table 7.

TABLE 7

The properties of AACs and control mixture

| | Control | Ambient air curing group | | | Steam curing group | | |
|---|---|---|---|---|---|---|---|
| Property | 100C | 10CA | 20CA | 30CA | 10CS | 20CS | 30CS |
| Density (kg/m³) | 2339 | 2378 | 2423 | 2421 | 2339 | 2423 | 2388 |
| Void ratio (%) | 14 | 14 | 13 | 12 | 14 | 15 | 13 |
| Absorption (%) | 5.7 | 5.9 | 5.6 | 5 | 6.6 | 6.4 | 5.5 |

Example 8: Compressive Strength (f'c)

Figure 5A:
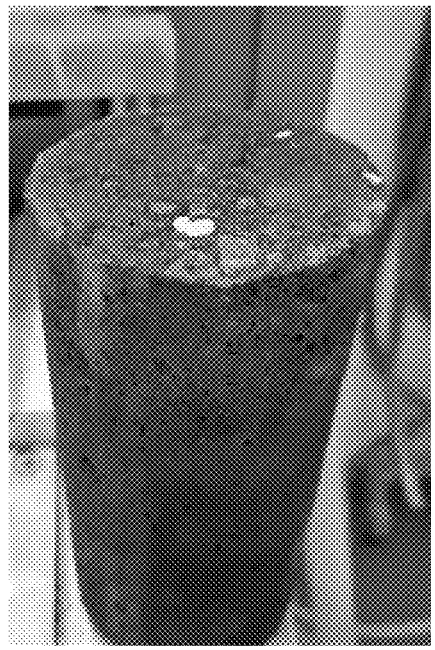
FIG. 5A is a pictorial image of a sample to be tested for evaluating its compressive strength, before surfacing, according to certain embodiments.
Figure 5B:
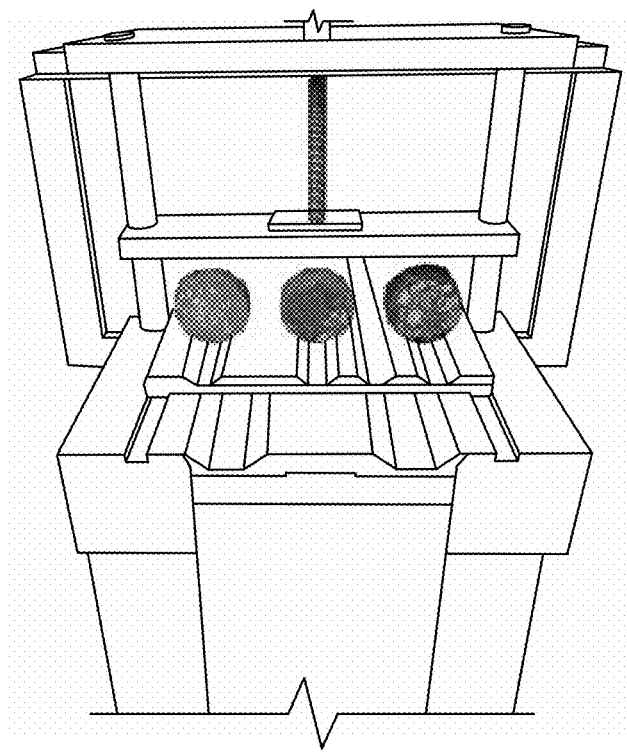
FIG. 5B is a pictorial image depicting surfacing setup of the sample to the tested, according to certain embodiments.
Figure 5C:
FIG. 5C is a pictorial image of the sample after surfacing, according to certain embodiments.

Following the ASTM C39 standard, three concrete cylindrical specimens having 75 mm in diameter and 150 mm in length were tested at 3, 7, and 28 days to determine the compressive strength and show evolution of strength of the AACs and control mixture with age. The specimens were tested using a Matest C088-11N Servo-plus Progress compression testing machine at a loading rate of 0.25±0.05 MPa (≈1.1±0.2 kN) until failure. For the control mixture, the specimens were extracted from the curing tank 12 hours before testing. Instead of capping the specimens, parallel and uniform loading surfaces were achieved by wet-grinding the ends of the specimens using a Utest UTC-1040 automatic surfacing machine (FIG. 5A-5C). The specimens were taken out from the curing basin 12 hours before testing for the OPC control mixture. The maximum load before failure was recorded and used to calculate the compressive strength (f'$_c$) following Equation 9. The fracture pattern was also recorded following the standard. The average and standard deviation of the three specimens were calculated.

$$f'c = 4P/\pi D^2 \quad \text{Equation 9}$$

Where P is the maximum applied load and D is the diameter of the specimen.

Example 9: Split-Tensile Strength

Figure 6:
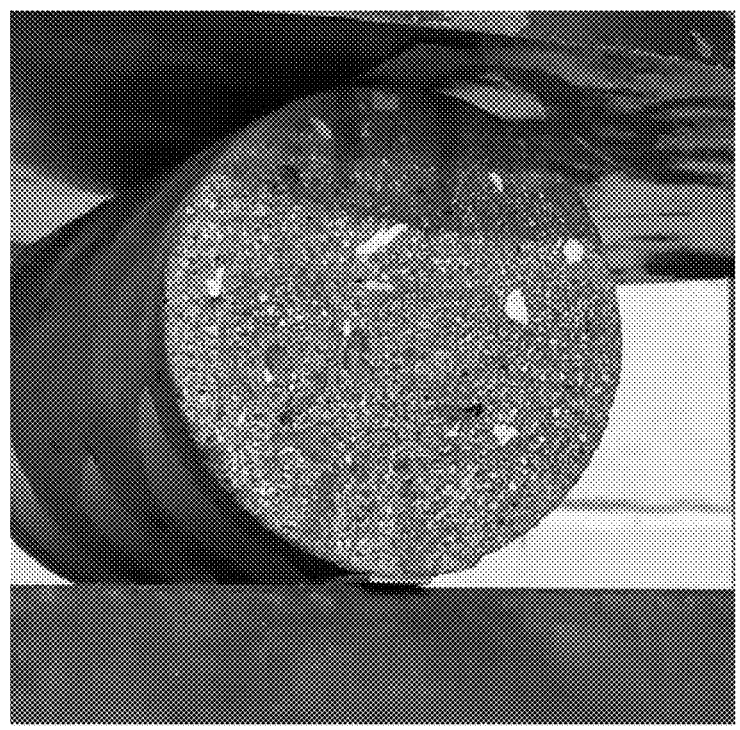
FIG. 6 is a pictorial image depicting a setup for observing split tensile strength, according to certain embodiments.

Unlike the direct tensile strength test, where concrete is subjected to a uniaxial tensile load, the split-tensile strength test consists of applying tensile stress on the concrete along one plane while applying considerable compressive stresses around that plane. The split-tensile strength is lower than the modulus of rupture (flexural strength of concrete) and higher than the direct tensile strength. Three 75 mm in diameter and 150 mm in length cylindrical specimens were tested for the split-tensile strength in accordance with the ASTM C496 standard. The specimens were tied to 25 mm wide stainless-steel strips at the top and bottom faces, subjected to loading via paper tape, and then subjected to compression (FIG. 6). The specimens were stressed until failure at a loading rate of 0.1 kN/sec.

The maximum load (P) before failure was recorded, and the split tensile strength (T) was calculated using the following equation:

$$T = 2P/\pi ld \quad \text{Equation 10}$$

Where l and d are the length and diameter of the specimen, respectively.

Example 10: Modulus of Elasticity (E$_c$)

Figure 7:
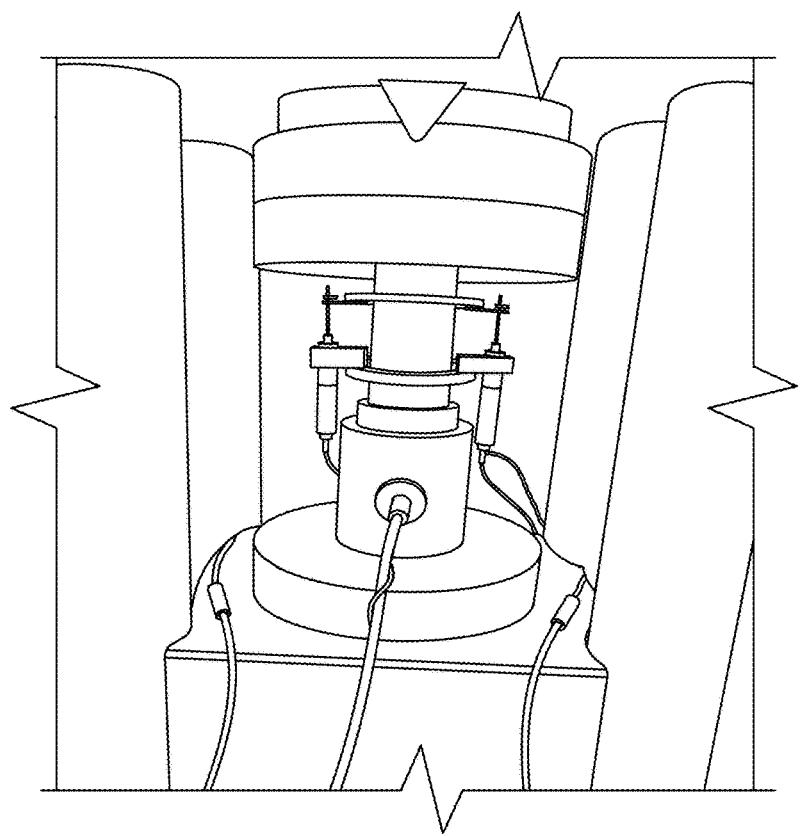
FIG. 7 is a pictorial image depicting a setup for observing modulus of elasticity showing LVDTs and load cell, according to certain embodiments.

The modulus of elasticity was determined after 28-day for each AAC mixture. The specimen, used for the compressive strength test, was attached to two linear variable displacement transducers (LVDTs) parallel to the loading direction of the specimen to record the deformation during compression loading. The LVDTs were fixed to the specimen by a steel ring mechanism (FIG. 7). The LVDTs were connected to a data logger, and a calibrated load-sensing cell that was placed under the specimen. The data logger recorded the load versus displacement data at 1-second intervals until failure. The normal strain was then calculated from the displacement, while the normal stress was calculated from the load values. A stress-strain curve was plotted, and the static modulus of elasticity was calculated based on the ASTM C469 chord method (Equation 11).

$$E_c = 1000 \times (\sigma_{40\%} - \sigma_{450})/(\varepsilon_{40\%} - 50) \quad \text{Equation 11}$$

Where E$_c$ is the static chord modulus of elasticity (in GPa), $\sigma_{40\%}$ and $\varepsilon_{40\%}$ are stress (in MPa) and strain (in microstrain) at 40% of f'$_c$, respectively, and $\sigma_{50}$ is the stress (in MPa) at a strain of 50 microstrains.

Example 11: Drying Shrinkage

Three prism specimens with dimensions: 25 mm×25 mm×250 mm, cast using mortar having a sand-to-precursor (S/P) ratio of 2 following the casting and curing procedures illustrated previously, were used for monitoring the drying shrinkage. At the age of 28 days, the specimens were removed from storage, and the initial length was measured by a length comparator using an LVDT connected to a data logger following the ASTM C596 standard. The specimens were then allowed to dry in air, and the change in length was frequently recorded for 180 days to determine the drying shrinkage. Length readings were taken daily for the first 14 days, every two days until 30 days, weekly until 60 days, and monthly until 180 days.

Example 12: Acid and Sulfate Attacks

Nine cubical paste specimens 25 mm in size were cast for each mixture. Specimens were first conditioned in water for 48 hours before exposure to acid and sulfate solutions. Three specimens were submerged in water as control. Another three specimens were placed in a container filled with 3% sulfuric acid solution (pH=1.23) for evaluating the effect of the acid attack for a duration of 90 days. Last three specimens, used for evaluating the effect of sulfate attack, were placed in a container filled with a solution of sodium sulfate and magnesium sulfate at a combined concentration of 20% (10% MgSO$_4$+10% Na$_2$SO$_4$) for an exposure duration of 180 days. The specimens exposed to acid and sulfate solution were weighed before exposure. The pH of the acid exposure solution was measured bimonthly, and extra sulfuric acid was added to maintain the pH around the targeted value of 1.23. The specimens were washed after each exposure with tap water, and loose material, if any, was removed from the surface using a soft nylon brush. The specimens were visually inspected, weighed, and the residual compressive strength was determined. By comparison to other specimens that were kept in water for the same exposure period, the strength and weight losses were calculated using the following equations:

$$\Delta f'c = (f'c_w - f'c_E)/f'c_w \times 100 \quad \text{Equation 12}$$

$$\Delta m = (W_w - W_E)/W_W \times 100 \quad \text{Equation 13}$$

Where $\Delta f'c$, $\Delta m$ are strength loss (%) and weight loss (%), respectively while f'c$_w$, W$_w$, f'C$_E$, and W$_E$ are the compressive strength and mass for specimens placed in water and acid/sulfate solution, respectively.

Example 13: Mineral Composition

The mineral composition of the steam-cured binders was studied by extracting a portion from the center of paste specimens that were pulverized and analyzed by XRD using a Rikagu Miniflex II diffractometer (manufactured by Rigaku, 3 Chome-9-12 Matsubaracho, Akishima, Tokyo 196-8666, Japan). After an exposure of 180 days in sulfate solution and 90 days in acid solution, portions of paste from the peripheries of the specimens were also pulverized and studied using XRD.

Example 14: Morphology

The effects of the OPC content of the precursor, curing regime, acid exposure, and sulfate exposure were studied by SEM imaging using a JEOL microscope (manufactured by JEOL, 3-1-2 Musashino, Akishima, Tokyo 196-8558) at a 20-mA current and high vacuum conditions. Samples were extracted from the core of the paste specimens to highlight the influence of the OPC content and curing regime, while samples extracted from the peripheries of the paste specimens exposed to sulfuric acid and sulfate salts were used to study the influence of the exposures on the morphology. The samples were held by a double-sided copper tape during testing, and a sputter gun sprayed a 20-nm layer of gold on the surface of the samples.

Example 15: Chloride Transport Properties

Chloride is responsible for reinforcement corrosion, mostly pitting type that is more catastrophic than the uniform type, in the majority of reinforced concrete structures subjected to the chloride-laden exposures. The durability characteristics of a concrete exposed to chloride is evaluated in terms of chloride migration and diffusion properties. In the present work, rapid chloride permeability test (RCPT), chloride migration test, and chloride bulk diffusion test were conducted on the specimens of AACs and control mixture.

Example 16: RCPT

The RCPT provides a qualitative assessment of the concrete's resistivity against chloride diffusion. Due to the high applied voltage during the test that leads to overheating and subsequent failure, a modified ASTM standard (C1202) is described for the testing of AACs. The modified ASTM standard (C1202) includes subjecting samples to a voltage of 10 V instead of 60 V as described in ASTM C1202 while maintaining the same sample conditioning regime and experiment duration of six hours. A good correlation is observed between the modified test and the test described in ASTM C1202 as well as a good correlation between their test and the chloride diffusion coefficient described in ASTM C1556 thus their modified test was followed in the present study.

After curing and aging for 28 days, the 100×200 mm cylindrical specimens were sliced into 45 mm-thick discs. The discs' curved surfaces were then sealed with a commercial epoxy sealant. Specimens were then conditioned and tested following the modified test conforming to ASTM C1202. The conditioning and testing was described in Fattah et al [A. A. El Fattah, I. Al-Duais, K. Riding, M. Thomas, S. Al-Dulaijan, and M. Al-Zahrani, "Field validation of concrete transport property measurement methods," *Materials (Basel)*, vol. 13, no. 5, pp. 1-19, 2020, which is incorporated herein by reference in its entirety]. A Germann PROOVE'it power supply and multimeter was used to measure the charges passed through the specimens during testing. The total charges passed at the end of the test were used to give a qualitative grade of the concrete's ion permeability using the grading criteria, as shown in Table 8.

TABLE 8

| Modified ASTM C1202 permeability grade | |
|---|---|
| Charges passed (Coulombs) | Permeability |
| <38 | Negligible |
| 38-120 | Very low |
| 120-220 | Low |
| 220-350 | Medium |
| >350 | High |

Example 17: Chloride Migration Test

Chloride migration is defined as the movement of chloride ions under an electrical potential differential. NT Build 409 standard provides a procedure using which the non-steady state chloride diffusion coefficient ($D_{nssm}$) is calculated that provides a quantitative evaluation of the chloride resistance of concrete. A 100 mm-diameter cylindrical specimen for each concrete mixture was cast, cured, aged for 28-days, and then sliced into three discs having 50 mm thickness after discarding the top 20 mm layer of the main cylinder. The curved sides of each disc was coated with a commercial epoxy sealant. The discs were then exposed to a saturated calcium hydroxide [$Ca(OH)_2$] under vacuum for 20 hours. After that, they were installed in a Germann PROOVE'it sample cell that had a cathode and an anode connected to a reservoir at each end of the sample. The catholyte reservoir was filled with 10% NaCl solution and the anolyte reservoir was filled with a 0.3 mol/liter solution of NaOH. The cell was then connected to the power source and a 10 V current was applied for 24 hours. The cell's initial and final temperatures were recorded, and the sample was extracted after the test. The extracted sample was then split in half along its length after which the sawn face was sprayed with a 0.1 mol/liter solution of silver nitrate ($AgNO_3$) which led to the formation of a white precipitate of silver chloride indicating the chloride penetration depth. The representative chloride penetration depth was determined by taking the average of 10 readings of the white precipitate along the diameter of the sawn sample. Finally, the $D_{nssm}$ (in×$10^{-12}$ m²/s) was then calculated using the following Equation 14:

$$D_{nssm} = \frac{0.0239(T+273)l}{(U-2)t}\left(x - 0.0238\sqrt{\frac{(T+273)lx}{U-2}}\right) \quad \text{Equation 14}$$

Where, T is the average of the initial and final temperatures in degrees Celsius, l is the disc's thickness=50 mm, U is the applied voltage=10 V, t is the experiment duration in hours=24 hours, and x is the average chloride penetration depth in mm.

Example 18: Chloride Diffusion

Diffusion is the propagation of dissolved ions under a concentration differential from a higher chemical potential (concentration) towards a lower one. The diffusion of chloride in concrete is assumed to follow Fick's second law of diffusion. At the age of 28 days, the specimens were conditioned following the ASTM C1556 standards and epoxy sealant was applied on all faces except the top finishing surface. The specimens were then exposed to sodium chloride at a concentration of 165 g/l of solution for 180 days after which the specimens were sliced perpendicular to their height at 5 mm intervals. The slices were then pulverized to pass #100 sieve after which a portion was digested in nitric acid to find the acid-soluble chloride content (i.e., total chloride) in accordance with ASTM C1152 and another portion was digested in deionized water to find the water-soluble chloride content (i.e., free chloride) in accordance with ASTM C1556. For each depth, the powder of three samples per concrete mixture was mixed together before digestion to get the average results. The concentration in both cases was analyzed by potentiometric titration against silver nitrate. Chloride concentration and depth were used to model the chloride profile following Equation 15 by the method of least squares.

$$C(x,\ t) = C_s - (C_s - C_i) \cdot \operatorname{erf}\left(\sqrt{x/4tD_a}\right) \quad \text{Equation 15}$$

Where $C(x, t)$ is the chloride concentration as a function of time and depth expressed as a percentage of the concrete's weigh, $C_s$ is the surface chloride concentration, $C_i$ is the initial chloride concentration before exposure, $D_a$ is the chloride apparent diffusion coefficient (m²/s), and erf is the Gauss error function.

Example 19: Reinforcement Corrosion Monitoring

In order to assess the resistance of a concrete mixture against propagation of reinforcement corrosion in post-initiation phase, the half-cell potential (i.e., corrosion potential $E_{corr}$) and corrosion current density ($I_{corr}$) are monitored during chloride exposure. For reinforcement corrosion monitoring, cylindrical reinforced concrete specimens having 75 mm-diameter and 150 mm-height were cast. Each reinforced concrete specimen had a 12 mm-diameter steel bar centrally embedded inside the concrete. The end point of the rebar embedded in the specimen was coated with epoxy as well as the area of the bar at the surface of the specimen in order to avoid crevice reinforcement corrosion, as shown in FIG. 8. After curing and aging for 28 days, the "lollipop" concrete specimens were immersed in a 125 mm-deep 5% NaCl solution.

Example 20: $E_{corr}$ Monitoring $E_{corr}$ was monitored weekly during the first 60 days of exposure and then monthly for the remaining 300 days. This was achieved via a digital multimeter and a saturated calomel reference electrode (SCE) following the procedure given in ASTM C876. The SCE was suspended in the exposure medium and connected to one terminal of the multimeter while the rebar was connected to the other terminal, as shown in FIG. 9.

Example 21: $I_{corr}$ Monitoring $I_{corr}$ was monitored via the linear polarization resistance (LPR) method using a 3-electrode setup (Gamry Reference 3000 Potentiostat), as shown in FIG. 10. The rebar of the specimen was connected to the working electrode terminal while a stainless-steel panel suspended in the exposure medium was connected to the counter electrode terminal. The SCE was connected to the reference electrode terminal. The Potentiostat was connected to a personal computer provided with the Gamry framework software. The software was setup to run the LPR test under a scan rate of 0.2 mV/s within the linear polarization range of +20 mV from the open circuit potential ($E_{oc}=E_{corr}$). Reinforcement corrosion current density was then calculated using the Stern-Geary formula given in Equation 16 and Equation 17. LPR was carried weekly for the first 60 days and then monthly up to 360 days.

$$I_{corr} = \frac{B}{R_p} \quad \text{Equation 16}$$

$$B = \frac{\beta_a \cdot \beta_c}{2.303(\beta_a + \beta_c)} \quad \text{Equation 17}$$

Where, $I_{corr}$ is the reinforcement corrosion current density (µA/cm²), $R_p$ is polarization resistance (kΩ·cm²), B is the Stern-Geary constant, $\beta_a$ and $\beta_c$ are the anodic and cathodic Tafel's slopes (mV), respectively.

Example 22: Gravimetric Weight Loss Test

Weight loss testing was conducted on rebars extracted from the specimens used for reinforcement corrosion monitoring at the end of the exposure period. Two rebars extracted from each concrete mixture were used for the gravimetric test which was conducted following the procedure stated in ASTM G1 [Standard Practice for Preparing, Cleaning, and Evaluating Corrosion Test Specimens, ASTM G1, which is incorporated herein by reference in its entirety].

Example 23: Density, Void Ratio, and Water Absorption

Figure 11:
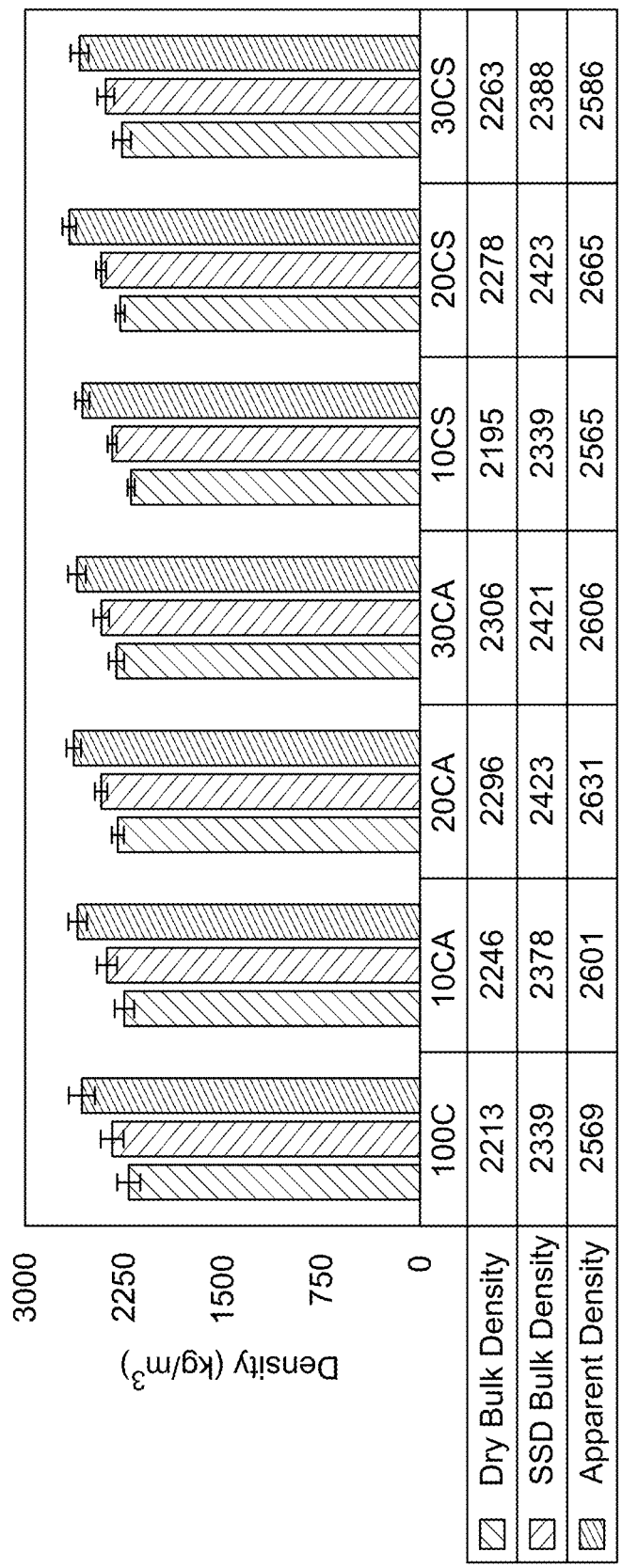
FIG. 11 is a bar graph depicting densities of various alkali-activated concrete (AAC) mixtures at 28 days, according to certain embodiments.
Figure 12:
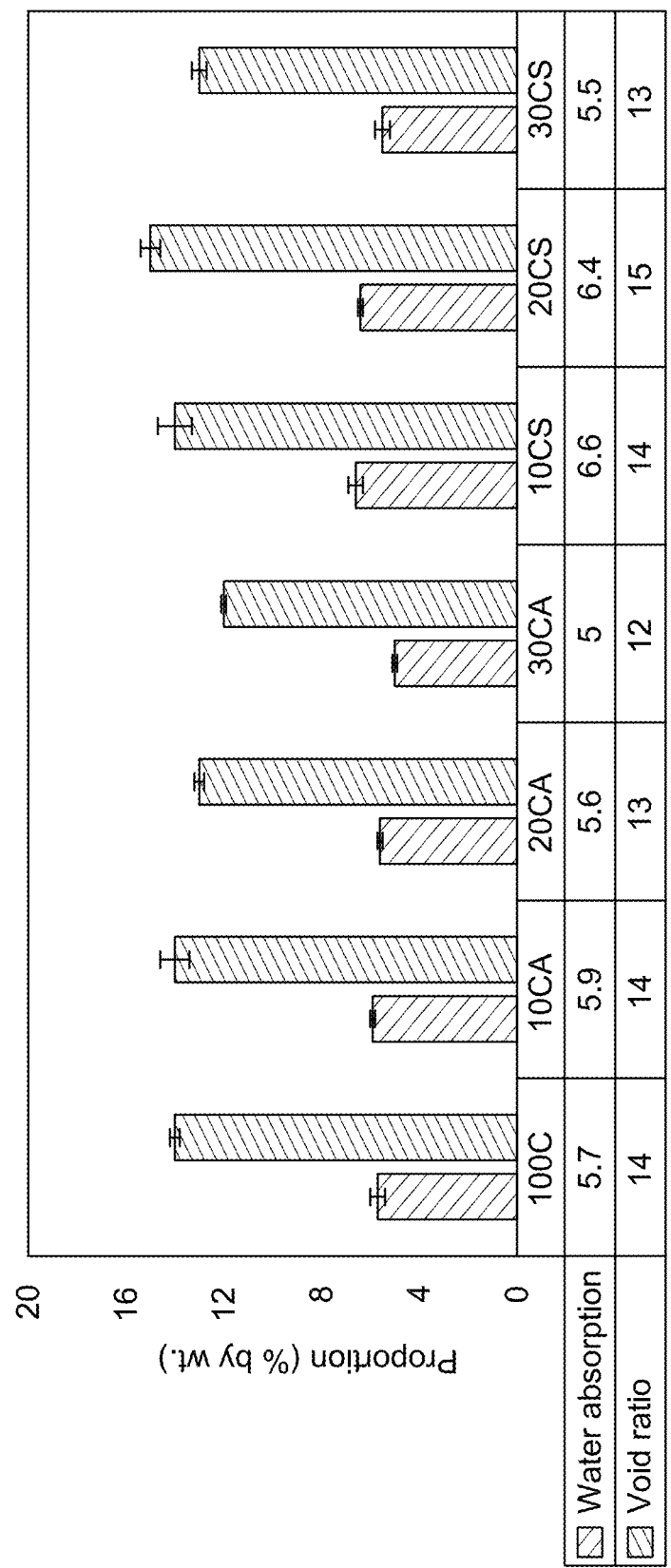
FIG. 12 is a bar graph depicting water absorption and void ratio of various AAC mixtures at 28 days, according to certain embodiments.

FIGS. 11 and 12 show the results of densities (dry, saturated-surface dry, and apparent), void ratio, and water absorption test. Both the AAC mixtures and control mixture exhibited insignificant variations in their density, void ratio, and water absorption values. The variations in density, water absorption, and voids were less than 90 kg/m³, 1.1%, and 3%, respectively. This can be owed to the minimal variation in the densities of the constituents used in the preparation of AAC and control mixture (specific gravities ranging from 2.88 to 3.1) as well as all mixtures possessing the same water, fine aggregate, and coarse aggregate contents, which constitute more than 75% of the weight of the concrete.

Example 24: Compressive Strength

Figure 13A:
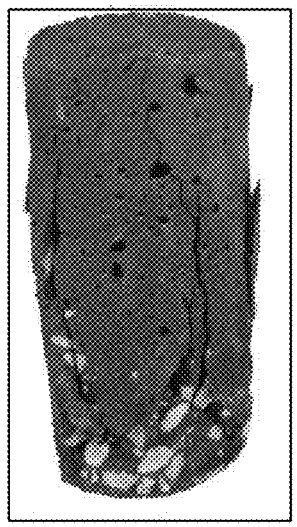
FIG. 13A is a pictorial image depicting an example of a compressive strength fracture pattern, according to certain embodiments.
Figure 13B:
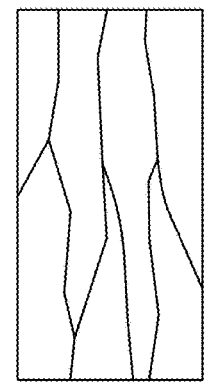
FIG. 13B is a pictorial image depicting the type of compressive strength fracture pattern from ASTM C39, according to certain embodiments.

The compressive strength development with age is shown in FIG. 13A. Type 3 fracture pattern (i.e., columnar vertical cracking through both ends of the specimen with no well-formed failure cones) was observed in all specimens according to the ASTM C39 standard (FIG. 13B). The control mixture reached a maximum compressive strength of 29.4 MPa at 28 days. Its rate of strength development trend seems to agree with results reported in the literature for OPC mixtures with similar mixture characteristics [L. Valentini, S. Contessi, M. C. Dalconi, F. Zorzi, and E. Garbin, "Alkali-activated calcined smectite clay blended with waste calcium carbonate as a low-carbon binder," *J. Clean. Prod.*, vol. 184, pp. 41-49, 2018, which is incorporated herein by reference in its entirety]. Regarding the compressive strength of the AACs, steam-cured mixtures exhibited higher compressive strengths at all ages compared to their ambient-air cured counterparts. The increase in the compressive strength in the steam-cured mixtures is more pronounced at the early age (i.e., three days) where increases of 100%, 75%, and 44% were observed for 10CS, 20CS, and 30CS compared to 10CA, 20CA, and 30CA, respectively. The reason behind higher strength in the steam-cured AACs especially at early age can be attributed to the formation of more polymerization products as a result of increase in the internal temperature due to steam curing since the polymerization reaction is influenced by alkalinity and temperature level. In addition, it is worth noting that around 90% of the ultimate compressive strength for the steam-cured AAC mixtures was reached during the first seven days, indicating its feasibility for applications where rapid strength gain is necessary such as for precast concrete members.

Figure 13C:
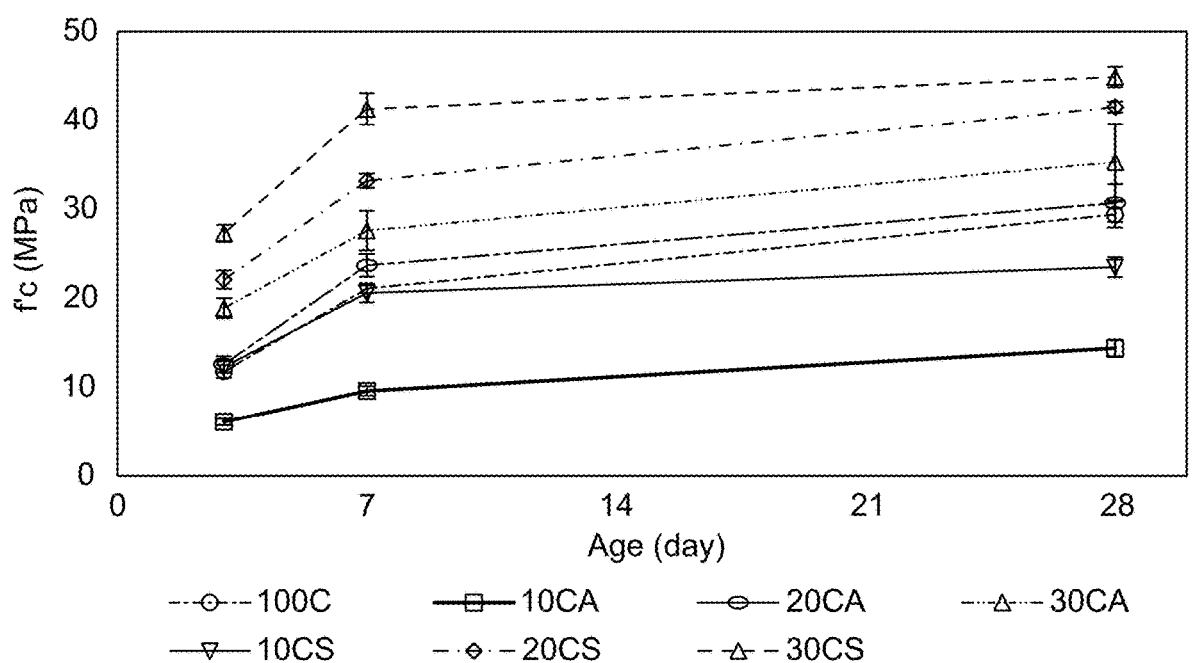
FIGS. 13C and 13D show graphs depicting compressive strength development of various AAC mixtures with age, according to certain embodiments.
Figure 13D:
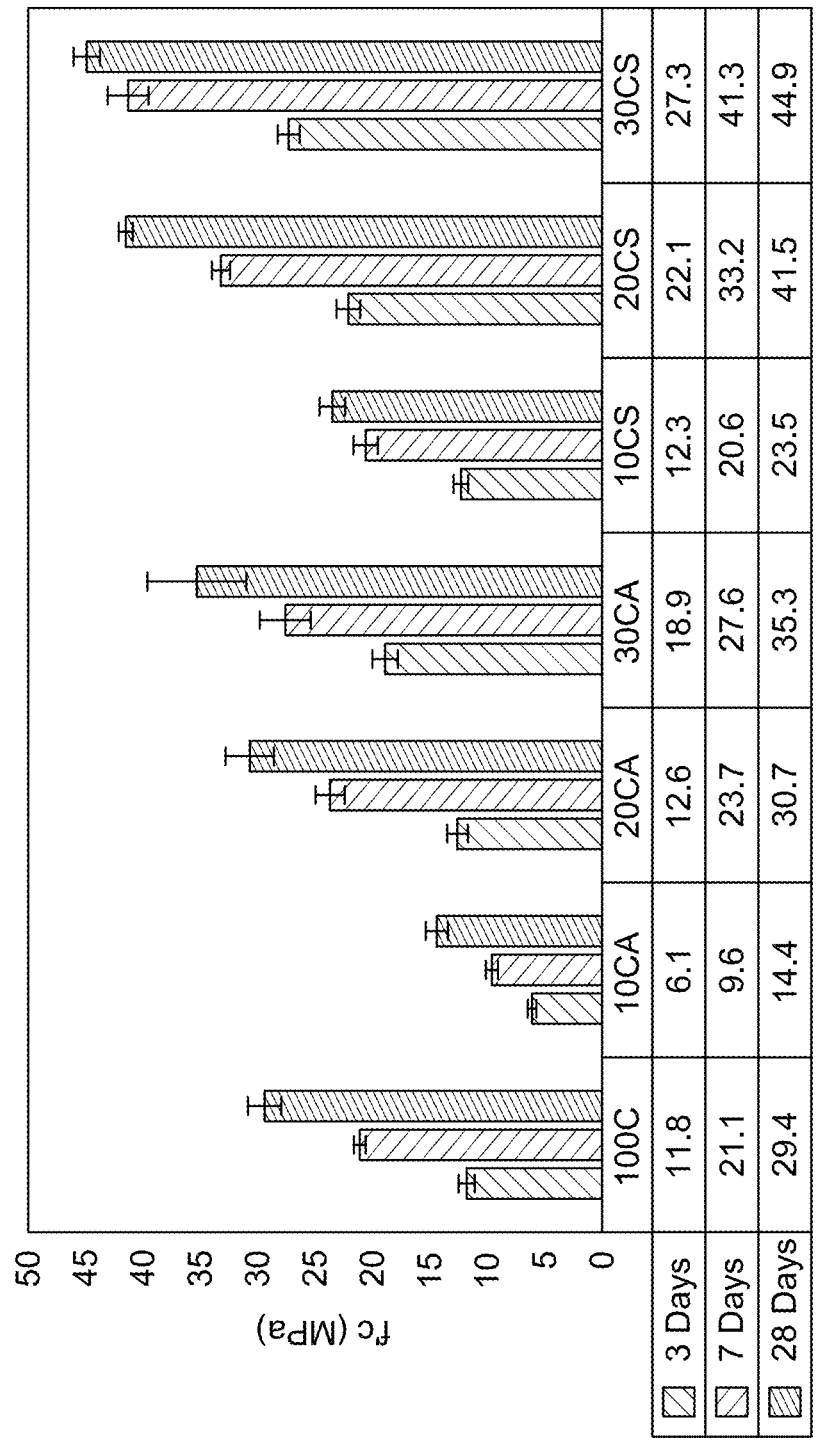

The plots of compressive strengths of AACs, as shown in FIG. 13C and FIG. 13D indicate that the increase in the OPC content in the precursor significantly increases the strength, especially when OPC content is increased from 10 to 20%. The developed AACs having more than 10% OPC content surpassed the compressive strength of the control mixture at all ages irrespective of the type of curing. At 28 days, the AAC mixtures having more than 10% OPC in the precursor (i.e., 20CA, 30CA, 20CS, and 30CS) exhibited compressive strengths of 30.7, 35.3, 41.5, and 44.9 MPa which are higher than the strength of normal concrete ($f_c$>27.6 MPa [4000 psi]). In addition, 20CS, and 30CS exhibited compressive strength beyond 41.4 MPa [6000 psi] required for the high strength concrete classification. Higher strength indicates a denser and more tightly-packed microstructure of concrete where voids are filled with polymerization products.

The compressive strength increased with the increase in OPC content of the AACs. Increase in the compressive strength (113% for the air cured mixtures and 44% for the steam cured mixtures) was observed when the OPC content of the precursor increased from 10 to 20%. The developed AACs (except for 10CA and 10CS) had higher compressive strength than the control mixture even under ambient curing conditions at all ages. At 28 days, 20CA, 30CA, 20CS, and 30CS exhibited compressive strengths of 30.7 MPa, 35.3 MPa, 41.5 MPa, and 44.9 MPa, which is higher than the requirement for standard concrete (f'c>27.6 MPa [4000 psi]) and higher than the control mixture. In addition, 20CS and 30CS exhibited compressive strength beyond 41.4 MPa (6000 psi) required for the high-strength concrete classification. Higher strength indicates a more tightly-packed microstructure where voids are filled with polymerization products.

Example 25: Split-Tensile Strength

Figure 14:
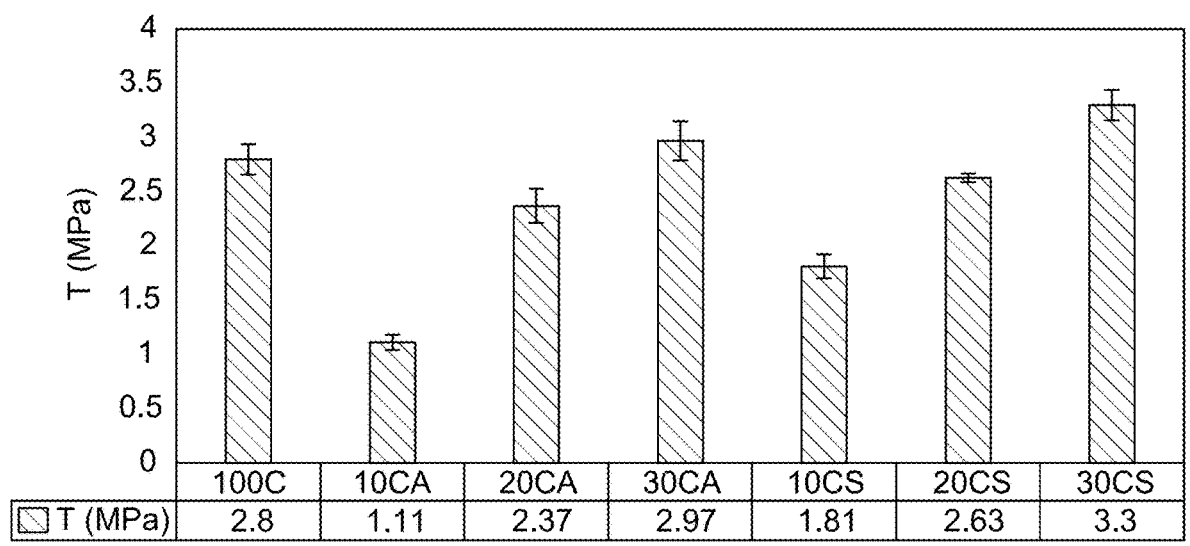
FIG. 14 shows a plot of the split-tensile strength results of various AAC mixtures, according to certain embodiments.

FIG. 14 shows the plots of the split-tensile strength results of the developed six AAC and control OPC mixtures. The tensile strength values ranged from 1.11 to 3.3 MPa. The control mixture had an average split tensile strength of 2.8 MPa, which is higher than all the AAC mixtures except for the AAC mixtures containing 30% OPC in the precursor (i.e., 30CA and 30CS), which were higher than that of control mixture (100C). The steam-cured AAC mixtures exhibited higher tensile strengths than the ambient-cured mixtures, a trend that has been observed for the compressive strength as well. Further, the tensile strength increased with increasing OPC content in the precursor, which was also observed in case of the compressive strength.

The split-tensile can be used as a conservative estimate of the flexural strength of concrete. Split tensile strengths are usually 50-60% lower than flexural strength. The flexural strength is an important design parameter for prestressed concrete where the tensile stresses are designed to be less than the modulus of rupture (i.e., flexural strength) of concrete. The split-tensile strength test results were used to develop an empirical model to correlate the split-tensile strength with the compressive strength. The best-fitted model obtained is as follows (Equation 14):

$$T = 3.409\sqrt{f'c} - 4.902 \qquad \text{Equation 14}$$

Figure 15:
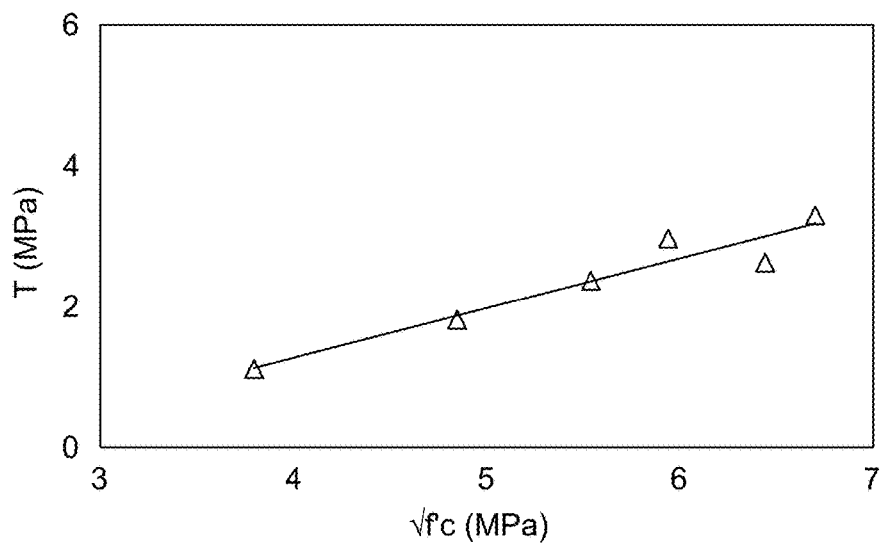
FIG. 15 shows regression results of the split-tensile strength data, according to certain embodiments.

A high value of the coefficient of determination, $R^2$=0.933, indicates an excellent fit of the data, as also evident from FIG. 15.

Example 26: Modulus of Elasticity

Figure 16:
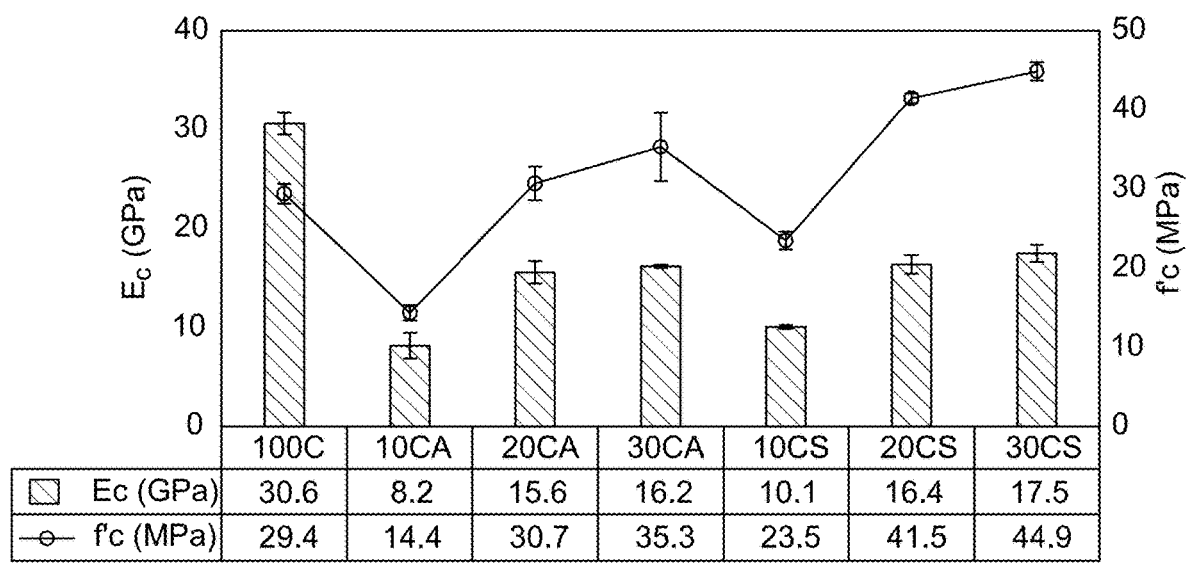
FIG. 16 shows a plot of the modulus of elasticity ($E_c$) and the compressive strength of various AAC mixtures, according to certain embodiments.

FIG. 16 shows the plots of the results of 28-days static modulus of elasticity for the developed AAC mixtures. Out of the six AACs, mixtures 30CS and 30CA showed the highest chord modulus of elasticity, followed by the 20CS and 20CA indicating the positive effect of increasing the dosage of OPC in the precursor. Mixtures 10CS, 20CS, and 30CS exhibited modulus of elasticity values larger than their ambient air cured counterparts (10CA, 20CA, and 30CA), which indicates the evolution of more tightly-packed microstructure due to steam curing. The control mixture 100C showed a higher value of modulus of elasticity as compared to those exhibited by all six AAC mixtures, e.g., lower modulus of elasticity and higher compressive strength values of AAC mixtures as compared to that of conventional OPC concrete, are reported in the literature [Y. Muntingh, "Durability and diffusive behaviour evaluation of geopolymeric material," University of Stellenbosch, 2006; and S. Mundra, M. Criado, S. A. Bernal, and J. L. Provis, "Chloride-induced corrosion of steel rebars in simulated pore solutions of alkali-activated concretes," Cem. Concr. Res., vol. 100, pp. 385-397, October 2017, which is incorporated herein by reference in its entirety]. The reason behind higher values of the compressive strength and lower values of the modulus of elasticity of AAC mixtures may be attributed to the higher ductility of the major polymerization products acting as binders (i.e., CASH, NASH and Mn—SH) as compared to the CSH which is the main component of the binder in case of conventional OPC concrete mixtures. Although, the bond between aggregates and binder matrix in AAC mixtures is better resulting in a higher compressive strength, the higher ductility of the binder matrix in AAC mixtures allows higher normal strain under the influence of the same compressive stress thereby decreasing the modulus of elasticity. Therefore, considering the fact that the AAC mixtures possess relatively lower modulus of elasticity without compromising the strength, they can be utilized in walls, slabs, and foundation of the buildings and structures where the deflection is controlled mainly by larger cross-sections unlike the case of slender members such as beams and columns where the deflection is governed by both cross-section and modulus of elasticity.

The American Concrete Institute (ACI) provides an empirical model to estimate the modulus of elasticity based on the compressive strength of conventional OPC concrete mixtures. However, the same model is unsuitable for AAC mixtures since they present lower moduli of elasticity as discussed previously. Hence, statistical analysis of the compressive strength versus modulus of elasticity data, generated for the AAC mixtures in the present study, was carried out and an empirical model based on the least squares method was obtained, as follows:

$$E_C = 3.409\sqrt{f'c} - 4.902 \qquad \text{Equation 15}$$

Figure 17:
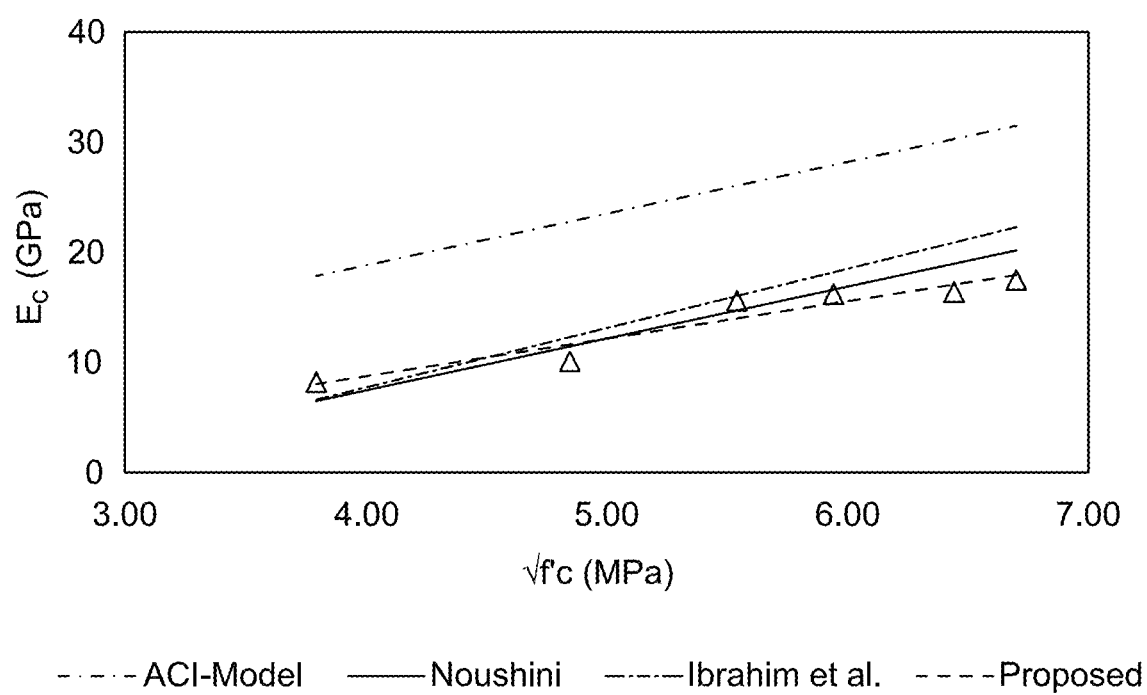
FIG. 17 show a plot of modulus of elasticity ($E_c$) for various models from the literature, the various AAC mixtures of the present disclosure, according to certain embodiments.

A high value of $R^2=0.936$ indicates that the developed model (Equation 15) had the high degree of fit of the data. The plots of the model developed in the present study was compared to the ACI-318 [M. Ibrahim, M. Kalimur Rahman, M. A. Megat Johari, M. Nasir, and E. Adeoluwa Oladapo, "Chloride diffusion and chloride-induced corrosion of steel embedded in natural pozzolan-based alkali activated concrete," *Constr. Build. Mater.*, vol. 262, p. 120669, November 2020, which is incorporated herein by reference in its entirety] model for normal OPC concrete mixtures, as well as to the models developed by Noushini et al. and Ibrahim et al. [S. Mundra, M. Criado, S. A. Bernal, and J. L. Provis, "Chloride-induced corrosion of steel rebars in simulated pore solutions of alkali-activated concretes," *Cem. Concr. Res.*, vol. 100, pp. 385-397, October 2017, which is incorporated herein by reference in its entirety] for AAC mixtures, as shown in FIG. 17. It can be observed from the plots shown in FIG. 17 that, as expected the ACI model overestimates the modulus of elasticity for the same compressive strength values as compared to the models for the AAC mixtures, which supports the discussion on the reason behind lower modulus of elasticity of AAC mixtures presented previously.

Example 27: Drying Shrinkage

Figure 18:
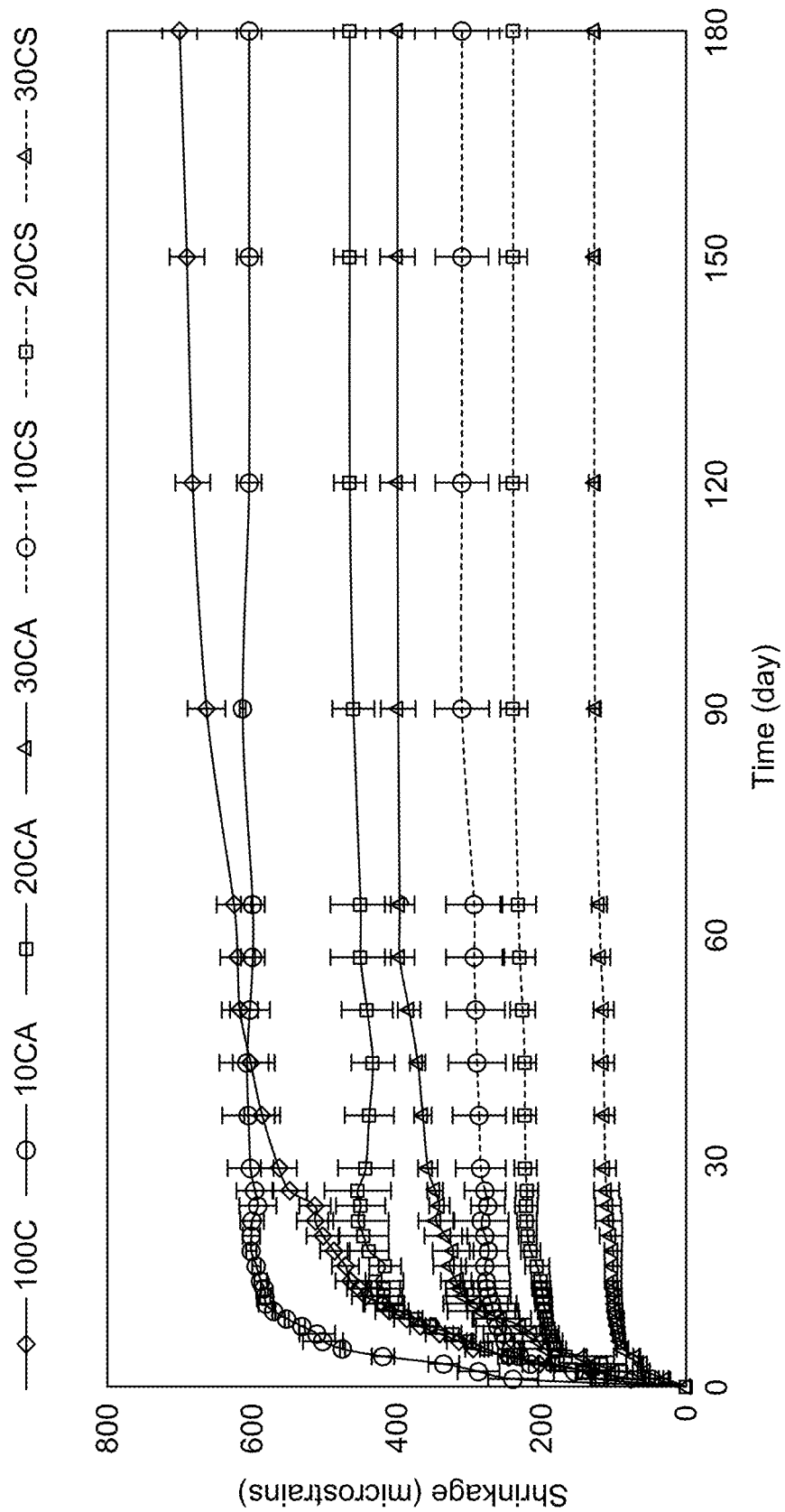
FIG. 18 is a plot of drying shrinkage of various AAC mixtures with age, according to certain embodiments.

Drying shrinkage occurs when free water evaporates, causing contraction of the concrete that develops tensile stress resulting in the cracking of concrete. FIG. 18 shows the plots of the drying shrinkage versus age, up to 180 days, for the mixtures under the present study. The shrinkage rate was the highest during the first 30 days for all mixtures, after which a noticeable plateau in the shrinkage curves can be observed. Mixture 10CA had shrunk the most, followed by the control OPC mixture during the first 45 days, after which the latter surpassed it in shrinking. In addition, as OPC content increased in the precursor, the drying shrinkage decreased significantly. This can be owed to the consumption of free water during the hydration of OPC. Furthermore, as OPC content increased, the pore structure was refined and filled by the polymerization/hydration products, which further decreased the shrinkage exhibited by mixtures with higher OPC content, irrespective of the curing method.

Figure 19:
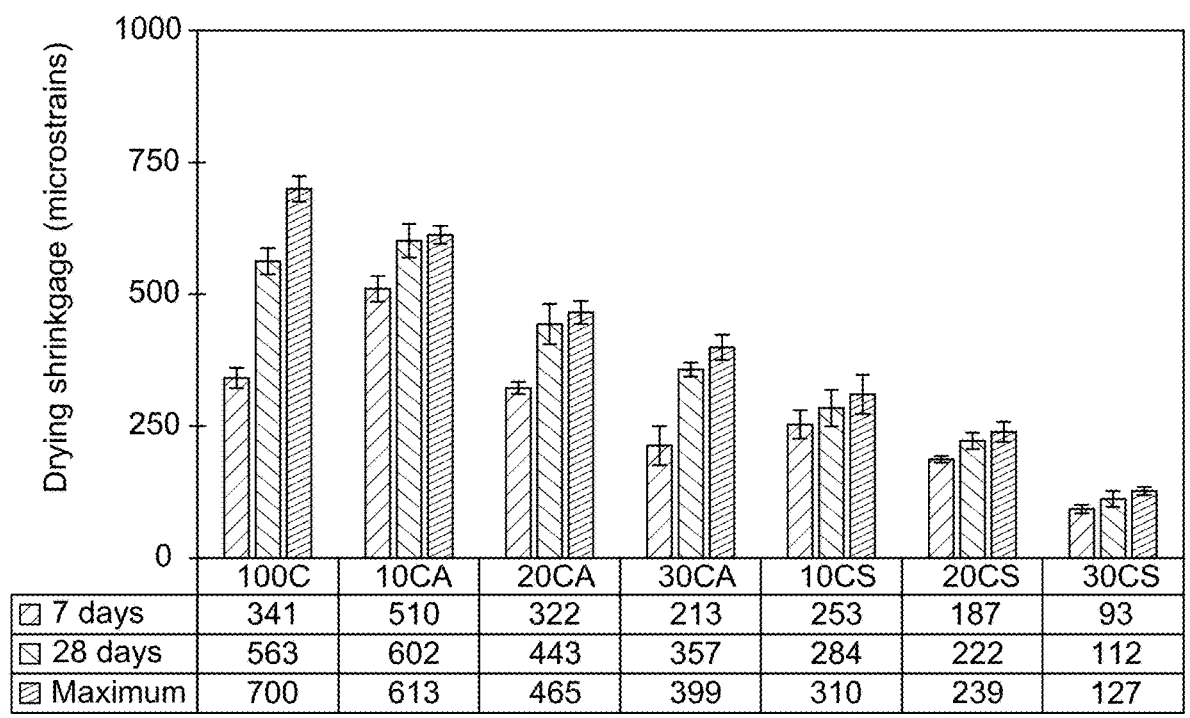
FIG. 19 is a plot of drying shrinkage summary of various AAC mixtures with age, according to certain embodiments.

The maximum overall drying shrinkage was observed in the case for the control mixture (100C), followed by the ambient-air-cured and steam-cured mixtures, respectively. At seven days, a shrinkage of 510 microstrains (i.e., µm/m) was observed for mixture 10CA, representing an increase of 49.6% compared to the control mixture, which had a drying shrinkage of 341 microstrains. Mixtures 20CA, 30CA, 10CS, 20CS, 30CS shrank by 322, 213, 253, 187, and 93 microstrains at 7 days which represent decreases of 5.6, 37.5, 25.8, 45.2, and 72.7%, respectively, compared to the control mixture (FIG. 19). The limit for drying shrinkage at 28 days is 0.05% (i.e., 500 microstrains) which was exceeded by mixtures 100C (563 microstrains) and 10CA (602 microstrains). The other developed mixtures showed lower drying shrinkage values of 443, 357, 284, 222, and 112 microstrains for 20CA, 30CA, 10CS, 20CS, and 30CS at 28 days which represent decreases of 21.3, 36.6, 49.6, 60.6, and 80.1%, respectively. At the end of the experiment, the control mixture (100C) exhibited the maximum shrinkage of 700 microstrains compared to that of all six AAC mixtures, which were lower. There was an overall decrease in the drying shrinkage of 12.4, 34.9, 43.0, 55.7, 65.9, and 81.9% for mixtures 10CA, 20CA, 30CA, 10CS, 20CS, 30CS, respectively, at 180 days, which indicates that the AAC mixtures developed stronger microstructures with refined pores that were able to resist and limit the shrinkage caused by the loss of moisture. In addition, similar to the observed beneficial effect on the mechanical properties, the steam-cured AAC mixtures exhibited drying shrinkage values less than their ambient-air cured AAC mixture counterparts at all ages, indicating that the microstructure of the prior was more tightly-packed and refined than the latter, thus restricting the shrinkage caused by the loss of moisture.

Example 28: Acid Attack

Figure 20A:
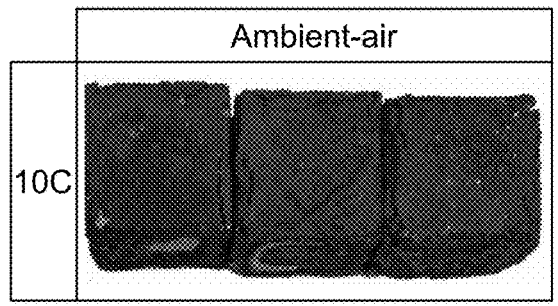
FIGS. 20A, 20C, and 20E show the physical condition of various alkali-activated binder (AAB) paste specimens after exposure to 3% sulfuric acid for 90 days, under ambient air conditions, according to certain embodiments.
Figure 20B:
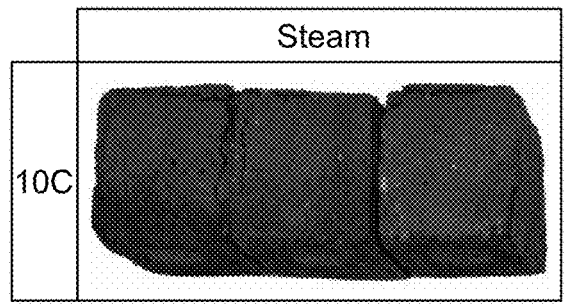
FIGS. 20B, 20D, and 20F show the physical condition of various AAB paste specimens after exposure to 3% sulfuric acid for 90 days, under steam conditions, according to certain embodiments.
Figure 20C:
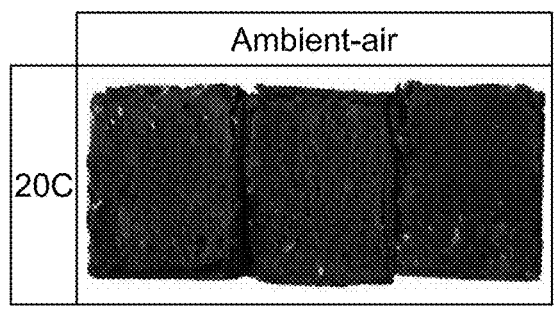
Figure 20D:
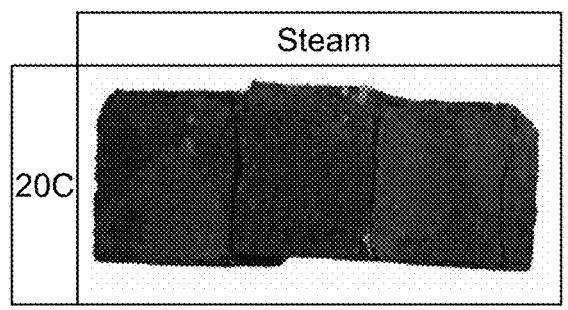
Figure 20E:
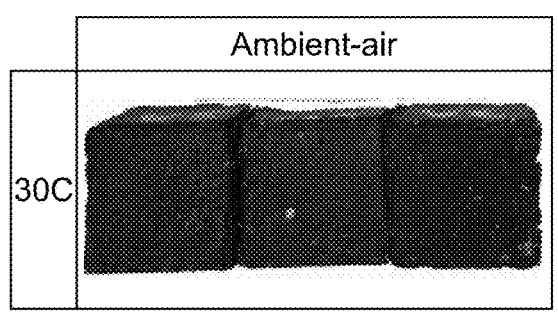
Figure 20F:
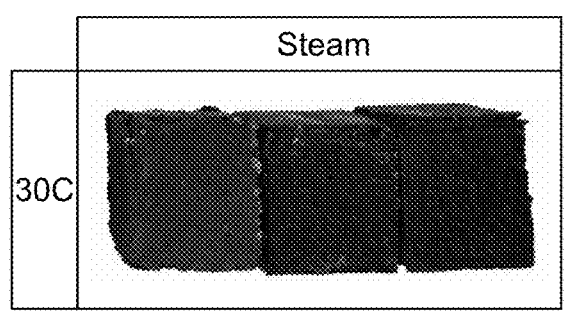

FIGS. 20A, 20C and 20E shows the physical condition of the AAC paste specimens after exposure to 3% sulfuric acid for 90 days in ambient air conditions, while FIGS. 20B, 20D, and 20F shows the physical condition of the AAC paste specimens after exposure to 3% sulfuric acid for 90 days under steam conditions. The specimens showed minimal signs of damage despite the low pH of the exposure medium ($\approx 1.23$). After exposure, the surface had changed color to a brighter brown and had become covered with a soft calcium sulfate dihydrate layer. The edges of the paste specimens had begun to show signs of cracking and detachment, especially in the case of the low OPC content mixtures (i.e., 10CS and 10CA—FIG. 20A and FIG. 20B). Furthermore, the outermost layer of paste of those specimens had started to show signs of detachment as the acid had penetrated the underlying binder causing depolymerization and deterioration. Specimens with higher OPC content showed fewer signs of visual deterioration.

Figure 21:
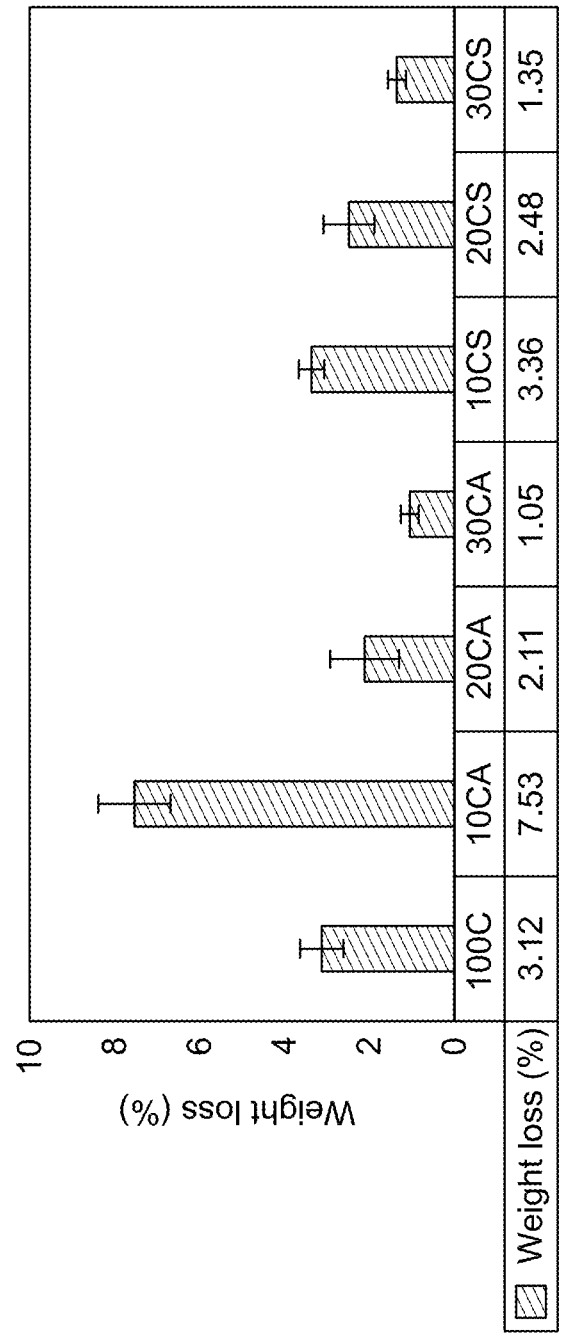
FIG. 21 shows percentage weight loss for various AAB paste specimens, measured after 90 days of exposure to 3% sulfuric acid, according to certain embodiments.

FIG. 21 shows the weight loss measured at the end of acid exposure. It ranged from 1.05 to 7.53% compared to specimens kept in water. The control mixture (100C) had lost 3.12% of its mass, while the ambient-air cured specimens had lost 7.53% for 10CA, 2.11% for 20CA, and 1.05% for 30CA of their masses. The steam-cured specimens lost 3.36% for 10CS, 2.48% 20CS, and 1.35% for 30CS of their respective average masses.

Figure 22:
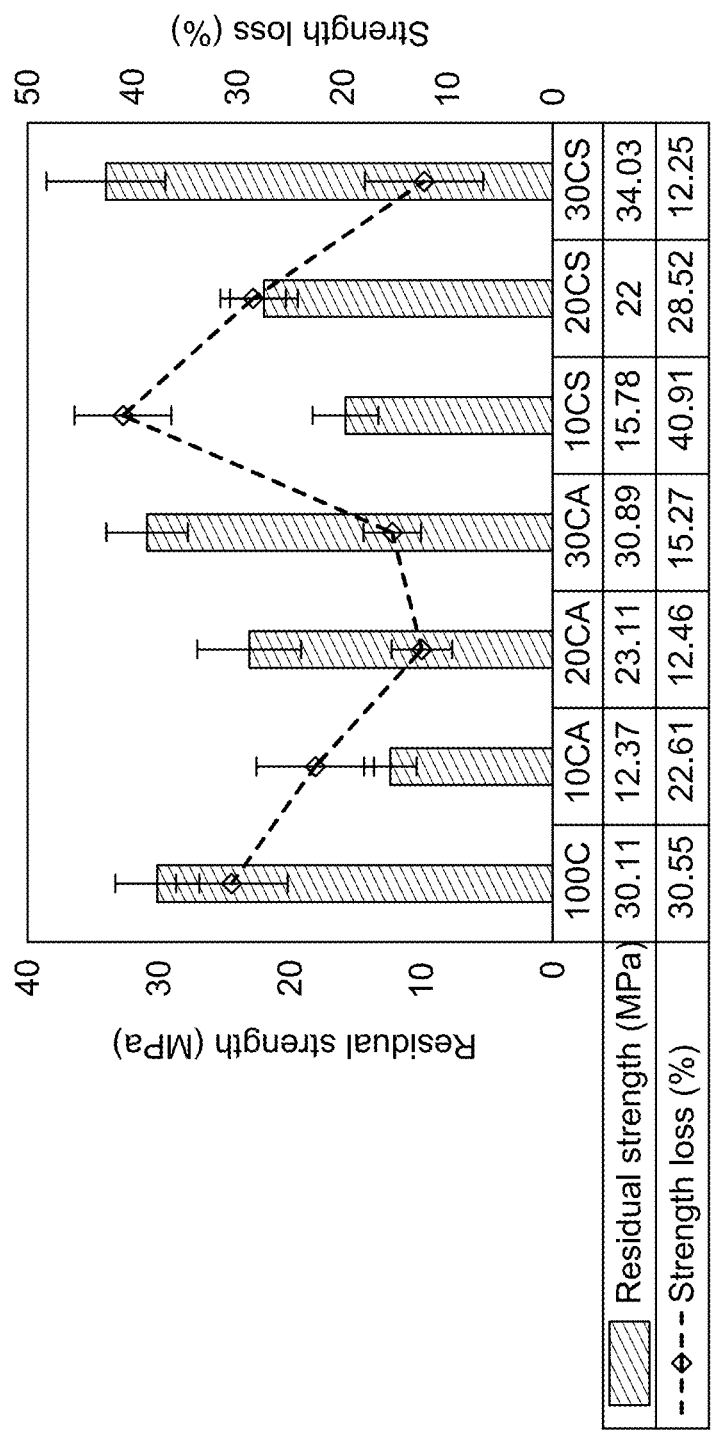
FIG. 22 shows strength loss and residual strength of control OPC and the AAB paste specimens after exposure to 3% sulfuric acid for 90 days.

FIG. 22 shows the strength loss and residual strength of the control OPC and AAB paste specimens after exposure to sulfuric acid for 90 days. The control mixture lost a third of its compressive strength after exposure and had a residual compressive strength of 30 MPa. All of the AAB specimens showed residual strengths lower than the control except for 30CS and 30CA, which had residual strengths of 34 MPa and 31 MPa, respectively. It is worth noting that the steam-cured mixtures showed greater compressive strength losses (as a percentage of their initial compressive strength) compared to the ambient-cured specimens. However, their residual strengths were still higher than the ambient-cured specimens. This indicates that steam curing can be both an advantage in terms of higher overall residual strength and a disadvantage in terms of more susceptibility to damage in acidic environments.

Example 29: Sulfate Attack

Figure 23:
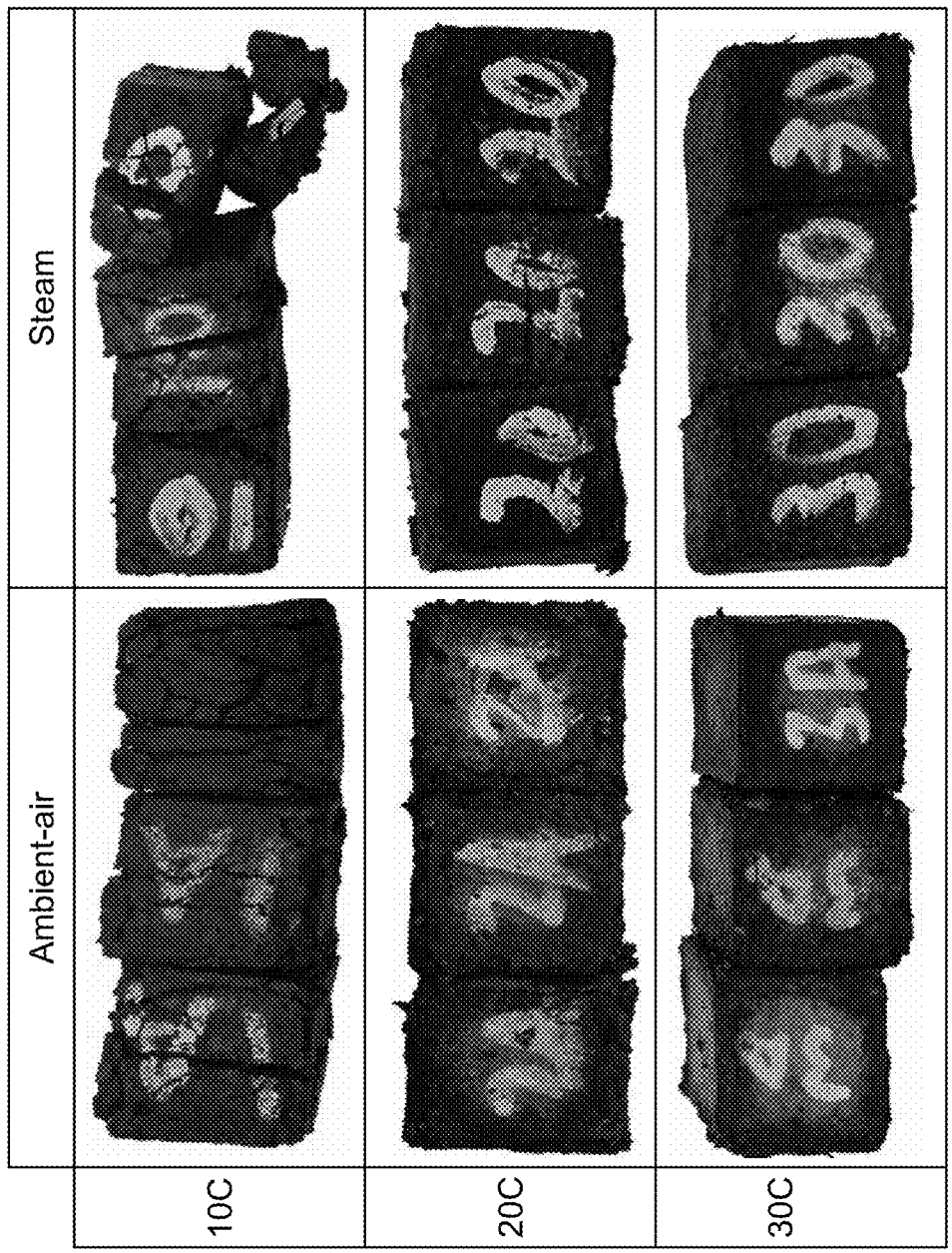
FIG. 23 shows the physical condition of various AAB paste specimens after exposure to a mixture of sodium and magnesium sulfates 180 days, according to certain embodiments.

FIG. 23 shows the physical condition of the AAB paste specimens after 180 days of exposure to a mixture of sodium and magnesium sulfates at a combined concentration of 20% by weight. The specimens showed moderate to severe damage after exposure to the sulfate solution. Similar to the behavior of the specimens exposed to acid, mixtures with low OPC content (i.e., 10CA and 10CS) exhibited damage where the majority of specimens (all of the specimens in the case of 10CA) had expanded and cracked into several pieces. The surface of the specimens had become covered with a mushy white precipitate which is thought to be a mixture of gypsum and calcite. The other specimens (i.e., 20CA, 20CS, 30CA, and 30CS) showed varying signs of expansion and delamination. Specimens with higher OPC content showed less sign of visual deterioration, especially 30CA, and 30CS, which showed damages around the outermost layer along the edges only.

Figure 24:
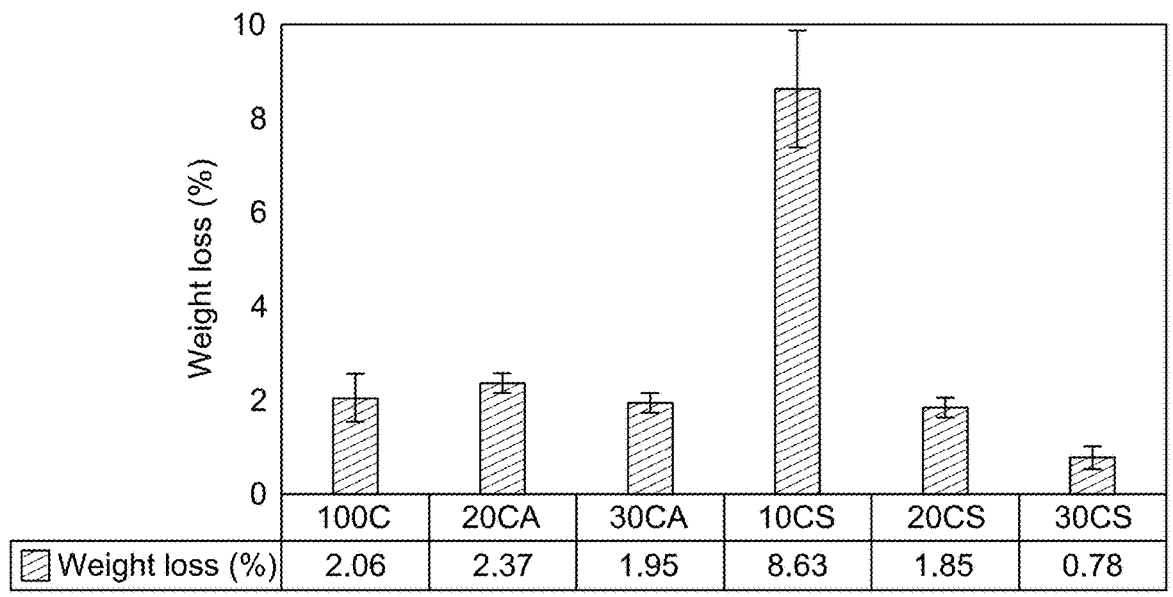
FIG. 24 shows percentage weight loss for various AAB paste specimens measured after 180 days of exposure to 20% sulfate salts, according to certain embodiments.

FIG. 24 shows the weight loss of the AAC mixtures/specimens at the end of sulfate exposure. It ranged from 0.78 to 8.63% compared to specimens kept in water. The control mixture had lost 2.06% of its mass, while the ambient-air cured specimens had lost 2.37% for 20CA and 1.95% for 30CA. On the other hand, the steam-cured specimens lost 8.63% for 10CS, 1.85% for 20CS, and 0.78% for 30CS of their respective average mass.

Figure 35:
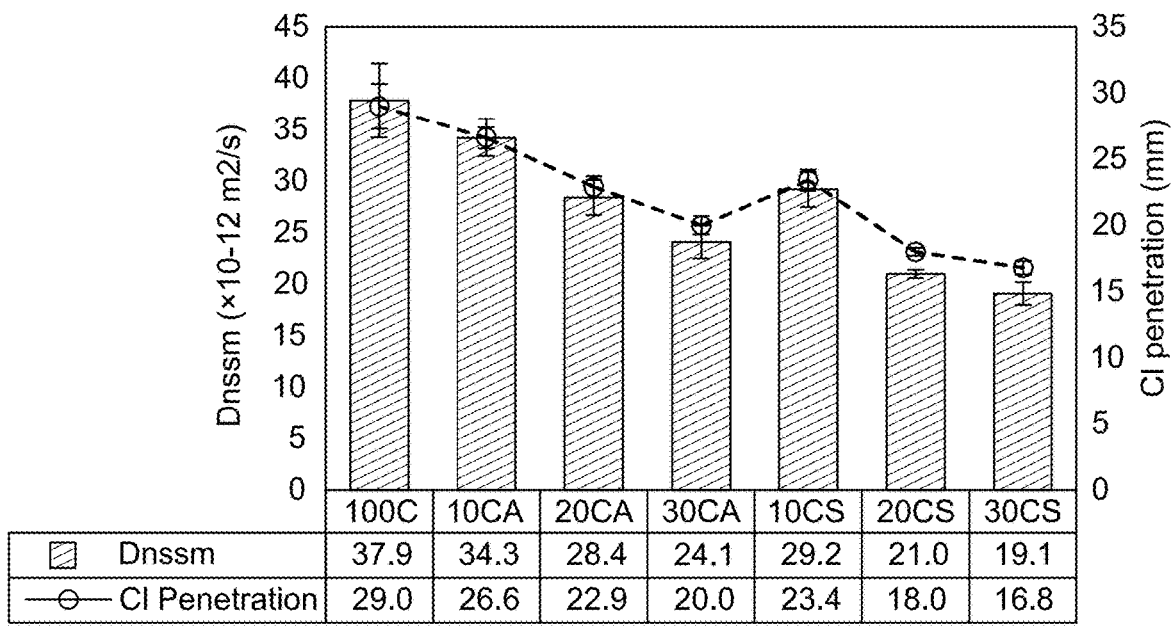
FIG. 35 shows a plot of chloride migration test results measured in terms of the chloride penetration depth and the non-steady state migration diffusion coefficient ($D_{nssm}$), according to certain embodiments.

FIG. 35 shows the percentage strength loss and residual strength of the AAB paste specimens at the end of the 180-day exposure to sulfate solution. The control mixture lost 44% of its compressive strength after exposure and had a residual compressive strength of 24.3 MPa. All of the AAB paste specimens showed residual strengths lower than the control except for 20CS, 30CS, and 30CA, which had residual strengths of 26.04 MPa, 38.6 MPa, and 27.99 MPa, respectively, higher than the residual strength. This indicates that an increase in the dosage of OPC in precursor beyond 10% improved the resistance to damage caused by sulfate attack.

Further, the residual strengths of the steam-cured mixtures were higher than the ambient-cured mixtures of equal OPC content. This observation agrees with the observations made earlier in the case of the mechanical properties, shrinkage, and acid attack, which supports the hypothesis that steam curing led to denser microstructures that possess superior properties at the same OPC content.

Example 31: Influence of OPC Content and Curing Regime

FIG. 26A and FIG. 26B shows the XRD diffractograms of the AAB paste specimens of the mixtures under the present study. All of the specimens showed similar key mineral phases which are summarized in Table 7. The peaks of calcite at 22° 2θ can be owed to the carbonation of the specimens during pulverization and storage before testing, as well as the addition of the LSP in the precursor, which consists mainly of calcite.

TABLE 7

Summary of the phases identified by XRD

| Mineral phase | Reference |
| --- | --- |
| Stratlingite $(Ca_2Al_2(SiO_2)(OH)_{10} \cdot 2.5H_2O)$ | [A. Mehta and R. Siddique, "Sulfuric acid resistance of fly ash based geopolymer concrete," Constr. Build. Mater., vol. 146, pp. 136-143, August 2017] |
| Nchwaningite $(Mn_2SiO_3(OH)_2 \cdot H_2O)$ | [M. Babaee and A. Castel, "Chloride diffusivity, chloride threshold, and corrosion initiation in reinforced alkali-activated mortars: Role of calcium, alkali, and silicate content," Cem. Concr. Res., vol. 111, no. August 2017, pp. 56-71, 2018] |
| CSH | [A. Mehta and R. Siddique, "Sulfuric acid resistance of fly ash based geopolymer concrete," Constr. Build. Mater., vol. 146, pp. 136-143, August 2017] |
| K-Feldspar (K-A-S-H) | [M. Babaee and A. Castel, "Chloride diffusivity, chloride threshold, and corrosion initiation in reinforced alkali-activated mortars: Role of calcium, alkali, and silicate content," Cem. Concr. Res., vol. 111, no. August 2017, pp. 56-71, 2018] |
| Manganese calcium hydrate (Mn—C—H) | [M. Babaee and A. Castel, "Chloride diffusivity, chloride threshold, and corrosion initiation in reinforced alkali-activated mortars: Role of calcium, alkali, and silicate content," Cem. Concr. Res., vol. 111, no. August 2017, pp. 56-71, 2018] |
| Portlandite (CH) | [W. A. Chaparro, J. H. B. Ruiz, and R. de J. T. Gómez, "Corrosion of reinforcing bars embedded in alkali-activated slag concrete subjected to chloride attack," Mater. Res., vol. 15, no. 1, pp. 57-62, December 2011] |
| Calcite $(CaCO_3)$ | [A. Mehta and R. Siddique, "Sulfuric acid resistance of fly ash based geopolymer concrete," Constr. Build. Mater., vol. 146, pp. 136-143, August 2017; and R. Pouhet and M. Cyr, "Carbonation in the pore solution of metakaolin-based geopolymer," Cem. Concr. Res., vol. 88, pp. 227-235, October 2016] |
| Quartz $(SiO_2)$ | [W. A. Chaparro, J. H. B. Ruiz, and R. de J. T. Gómez, "Corrosion of reinforcing bars embedded in alkali-activated slag concrete subjected to chloride attack," Mater. Res., vol. 15, no. 1, pp. 57-62, December 2011] |
| Anorthite $(CaAl_2Si_2O_8)$ | [Q. Gawah, M. A. Al-Osta, M. Maslehuddin, M. A. Abdullah, M. Shameem, and S. U. Al-Dulaijan, "Development of sustainable self-compacting concrete |

TABLE 7-continued

Summary of the phases identified by XRD

| Mineral phase | Reference |
|---|---|
| | utilising silico manganese fume," *Eur. J. Environ. Civ. Eng.*, pp. 1-22, July 2022] |
| Sodium aluminosilicate hydrate (NASH) | [Q. Gawah, M. A. Al-Osta, M. Maslehuddin, M. A. Abdullah, M. Shameem, and S. U. Al-Dulaijan, "Development of sustainable self-compacting concrete utilising silico manganese fume," *Eur. J. Environ. Civ. Eng.*, pp. 1-22, July 202256] |
| Hydrotalcite $(Mg_6Al_2(OH)_{16}CO_3 \cdot 4H_2O)$ | [A. Mehta and R. Siddique, "Sulfuric acid resistance of fly ash based geopolymer concrete," *Constr. Build. Mater.*, vol. 146, pp. 136-143, August 2017; and W. A. Chaparro, J. H. B. Ruiz, and R. de J. T. Gómez, "Corrosion of reinforcing bars embedded in alkali-activated slag concrete subjected to chloride attack," *Mater. Res.*, vol. 15, no. 1, pp. 57-62, December 2011] |

As shown in FIG. 26A, as the OPC content increased in the precursor, the peaks of CASH, CSH, and Stratlingite increased in sharpness, indicating the formation of more crystalline polymerization products. Further, the peaks of quartz decreased, indicating that more silica phases were consumed in mixtures with higher OPC content leading to a more refined microstructure. Furthermore, the peaks of calcite and hydrotalcite increased when OPC decreased which indicates that there was an abundance of calcium-carrying and aluminum-carrying phases that were not consumed in the polymerization process which then were free to react with air and magnesium to form calcite and hydrotalcite. The same observations apply in the case of the ambient-cured specimens as depicted in FIG. 26B, where the absence of the heat generated by steam curing slowed down the polymerization process leading to less crystalline polymerization products, as evident by the less intense polymerization products peaks and more intense peaks of the unreacted phases that formed calcite and hydrotalcite.

The influence of acid and sulfate attacks is illustrated in FIG. 27. The main binder matrix deterioration, in the case of acid immersed specimens, manifested in the formation of calcium sulfate dihydrate ($CaSO_4 \cdot 2H_2O$) via the reaction between the sulfuric acid and calcium ions as shown in Equation 16, which had peaked at 12°, 23.5°, 29.4°, 40.9°, 42.6°, and 48°. The source of calcium ions could be either from the unreacted calcium phases or from the calcium-carrying polymerization/hydration products (CASH, CSH), which have been reported to be susceptible to this form of dissolution [A. A. El Fattah, I. Al-Duais, K. Riding, M. Thomas, S. Al-Dulaijan, and M. Al-Zahrani, "Field validation of concrete transport property measurement methods," *Materials (Basel)*, vol. 13, no. 5, pp. 1-19, 2020; and A. Noushini and A. Castel, "Performance-based criteria to assess the suitability of geopolymer concrete in marine environments using modified ASTM C1202 and ASTM C1556 methods," *Mater. Struct. Constr.*, vol. 51, no. 6, pp. 1-16, 2018, each of which is incorporated herein by reference in their entireties]. It is worth mentioning that other polymerization products, such as Mn—CSH, KASH, and NASH, are also susceptible to depolymerization by $H_2SO_4$, similar to CSH and CASH. Furthermore, minor peaks of natrite ($Na_2CO_3$), dolomite ($CaMg(CO_3)_2$), portlandite, and calcite were detected, which resulted due to the carbonation of the calcium, sodium, and magnesium ions liberated by sulfuric acid from their respective polymers as well as unreacted raw PMs as shown by Equation 17. The formation of the calcium sulfate dihydrate mentioned above led to the binder matrix's disintegration and subsequently loss of strength due to its expansive nature. Furthermore, the formation of sulfate products in the empty spaces in the voids of the binder matrix leads to the creation of internal stresses that contribute further to the disintegration of the binder matrix and further propagation of sulfate ions that start the cycle of attack again.

On the other hand, sulfate attack diffractograms (FIG. 27) shows the formation of calcium sulfate dihydrate and concomitant thaumasite ($CaSiO_3 \cdot CaCO_3 \cdot CaSO_4 \cdot 15H_2O$) at 12.5°, 23.5°, 29.4°, 40.9°, 42.6°, and 48°. Their formation occurs as a result of the reaction between sulfate ions and calcium ions from calcium-carrying polymerization products in the case calcium sulfate dihydrate (Equation 18) and as a result of the reaction between carbonated phases, sulfates and CSH (Equation 19). The relatively low temperature and high relative humidity favor the formation of thaumasite. Radial needle-like thamuasite was observed in SEM imaging of some specimens, which confirms the mechanism of formation of thaumasite mentioned previously. The formation of calcium sulfate dihydrate and thaumasite are expansive and cause expansion and cracking as discussed earlier.

$$Ca^{+2} + H_2SO_4 \rightarrow CaSO_4 \cdot xH_2O \quad \text{Equation 16}$$

$$Ca^{+2}/2Na^+/Mg^{+2} + CO_3^{-2} \rightarrow CaCO_3/Na_2CO_3/MgCO_3/CaMg(CO_3)_2 \quad \text{Equation 17}$$

$$Ca(OH)_2 + Na_2SO_4/MgSO_4 \rightarrow CaSO_4 \cdot 2H_2O + 2NaOH/Mg(OH)_2 \quad \text{Equation 18}$$

$$3CaO \cdot 2SiO_2 \cdot 4H_2O + CaCO_3 + Na_2SO_4/MgSO_4 + 28H_2O \rightarrow 2(CaSiO_3 \cdot CaCO_3 \cdot CaSO_4 \cdot 15H_2O) + 2NaOH/Mg(OH)_2 \quad \text{Equation 19}$$

Figure 28A:
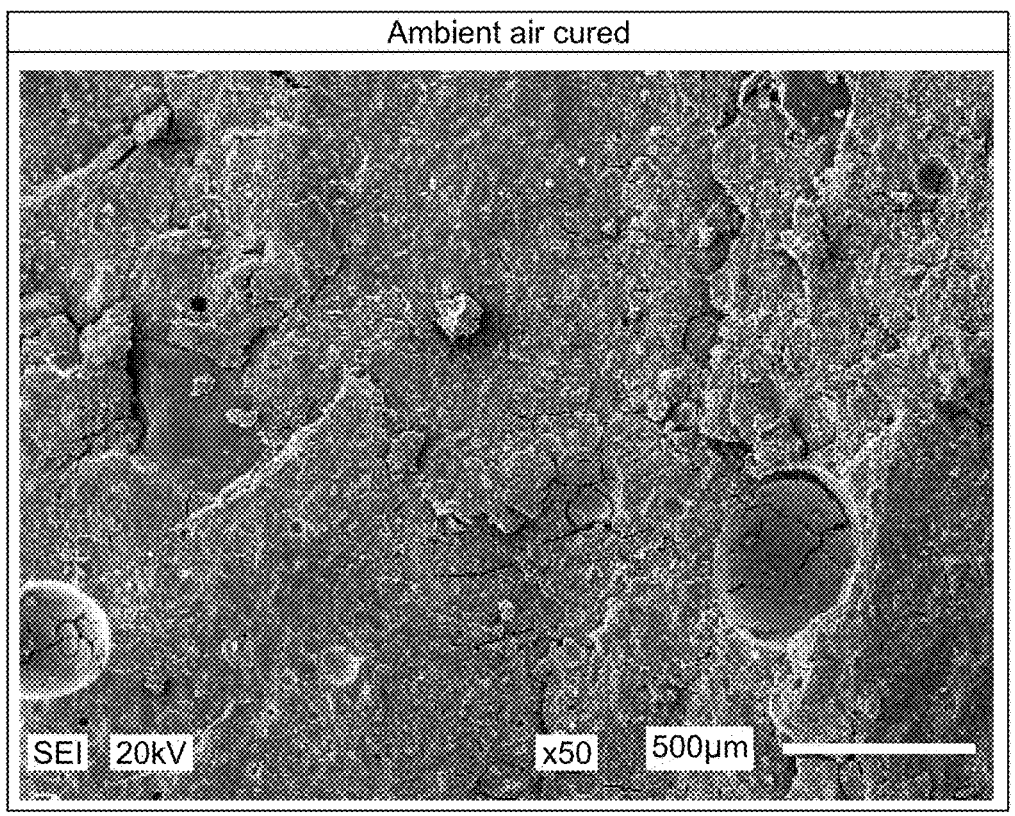
FIGS. 28A and 28B are scanning electron microscope (SEM) images showing surface morphology of an ambient-air cured specimen, at two magnification levels, according to certain embodiments.
Figure 28B:
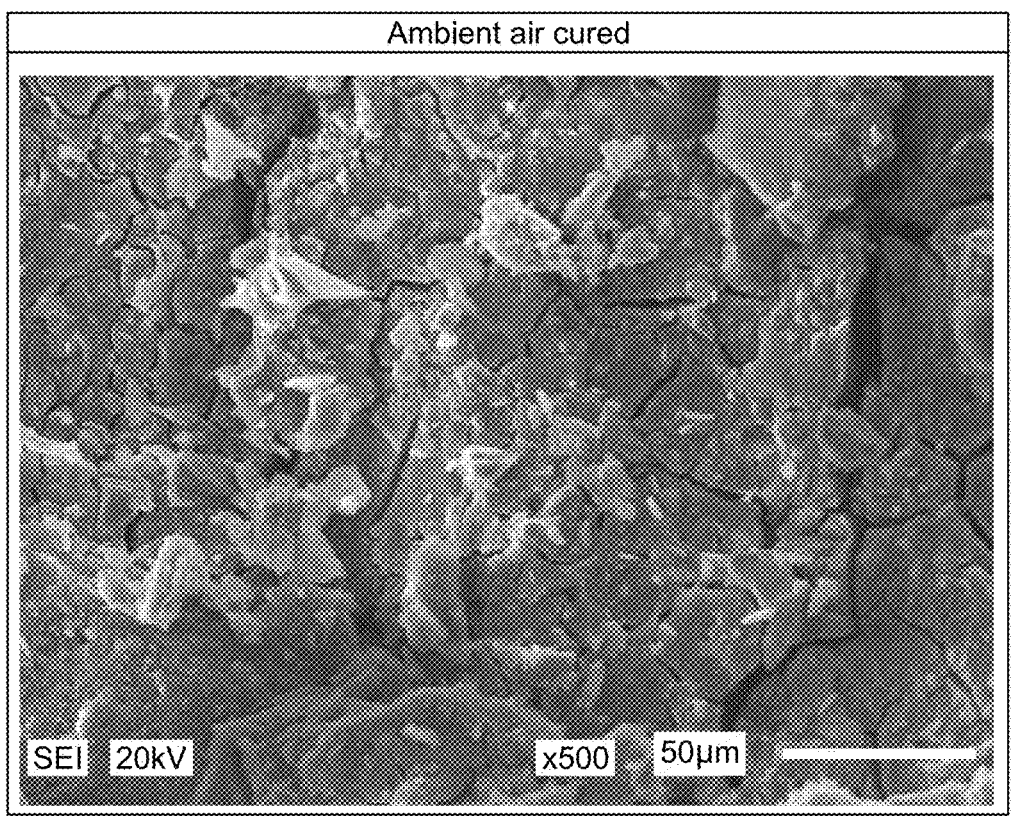
Figure 28C:
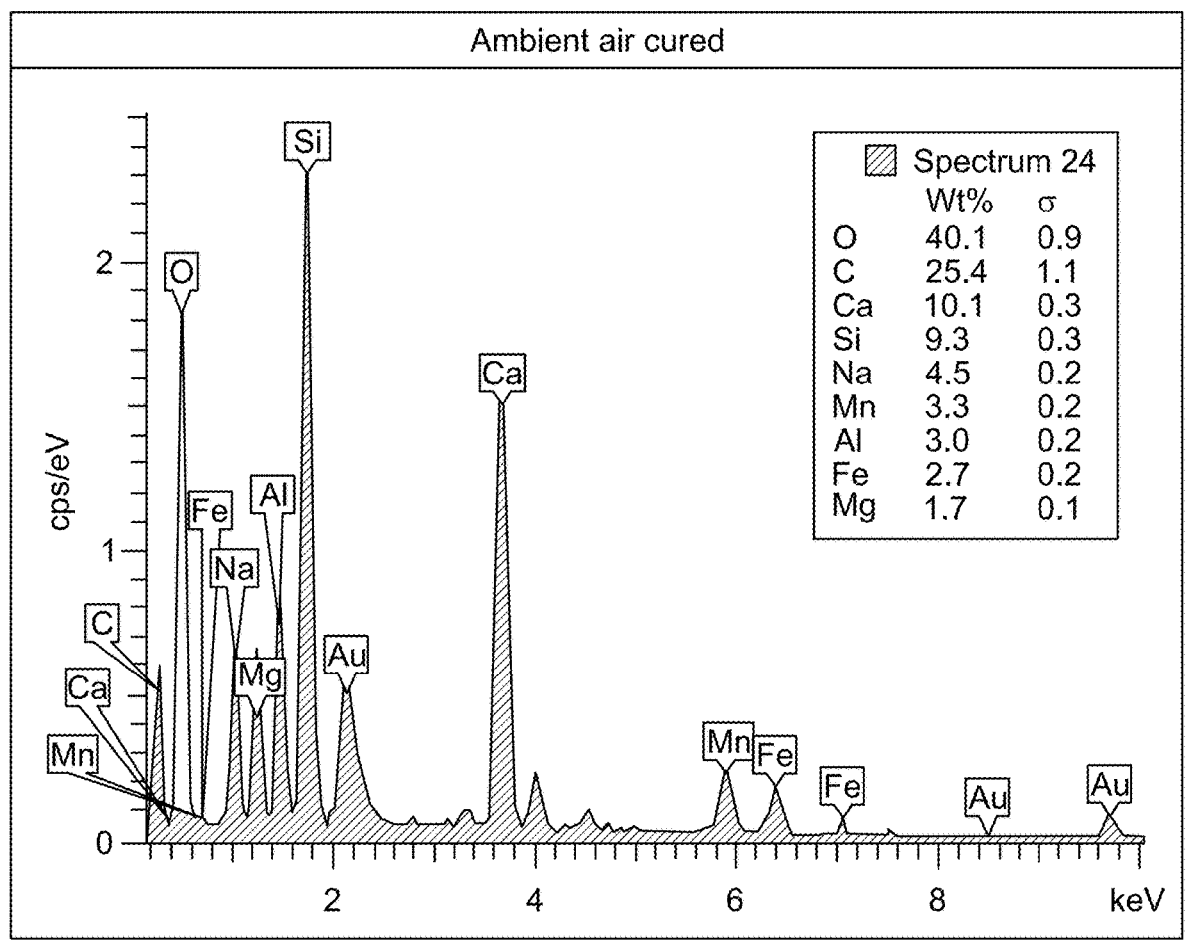
FIG. 28C is an EDX spectrum of the ambient-air cured specimen showing influence of curing on morphology, according to certain embodiments.
Figure 28D:
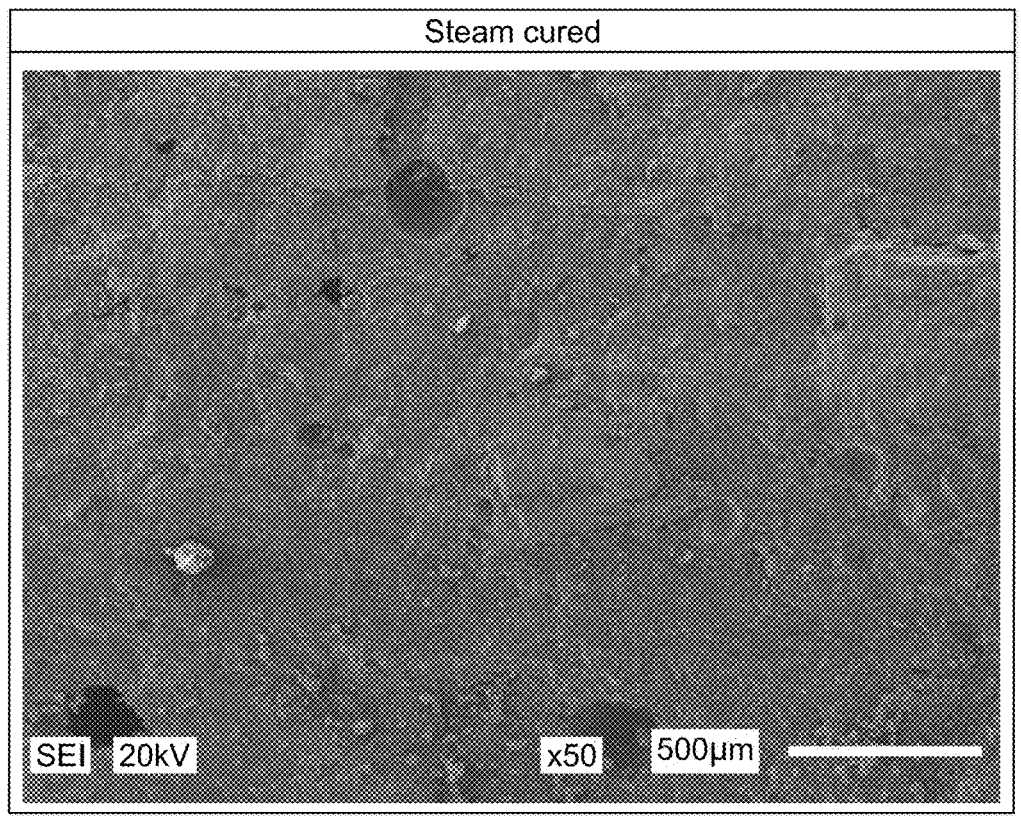
FIGS. 28D and 28E are SEM images showing surface morphology of a steam cured specimen, at two magnification levels, according to certain embodiments.
Figure 28E:
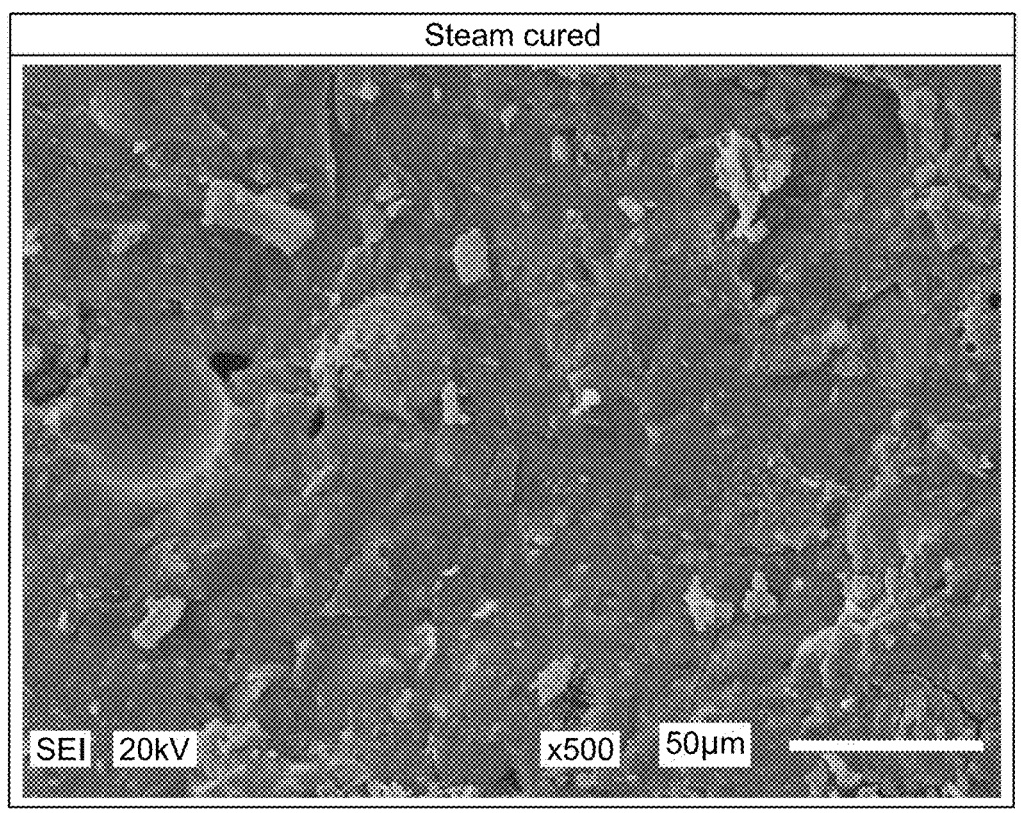
Figure 28F:
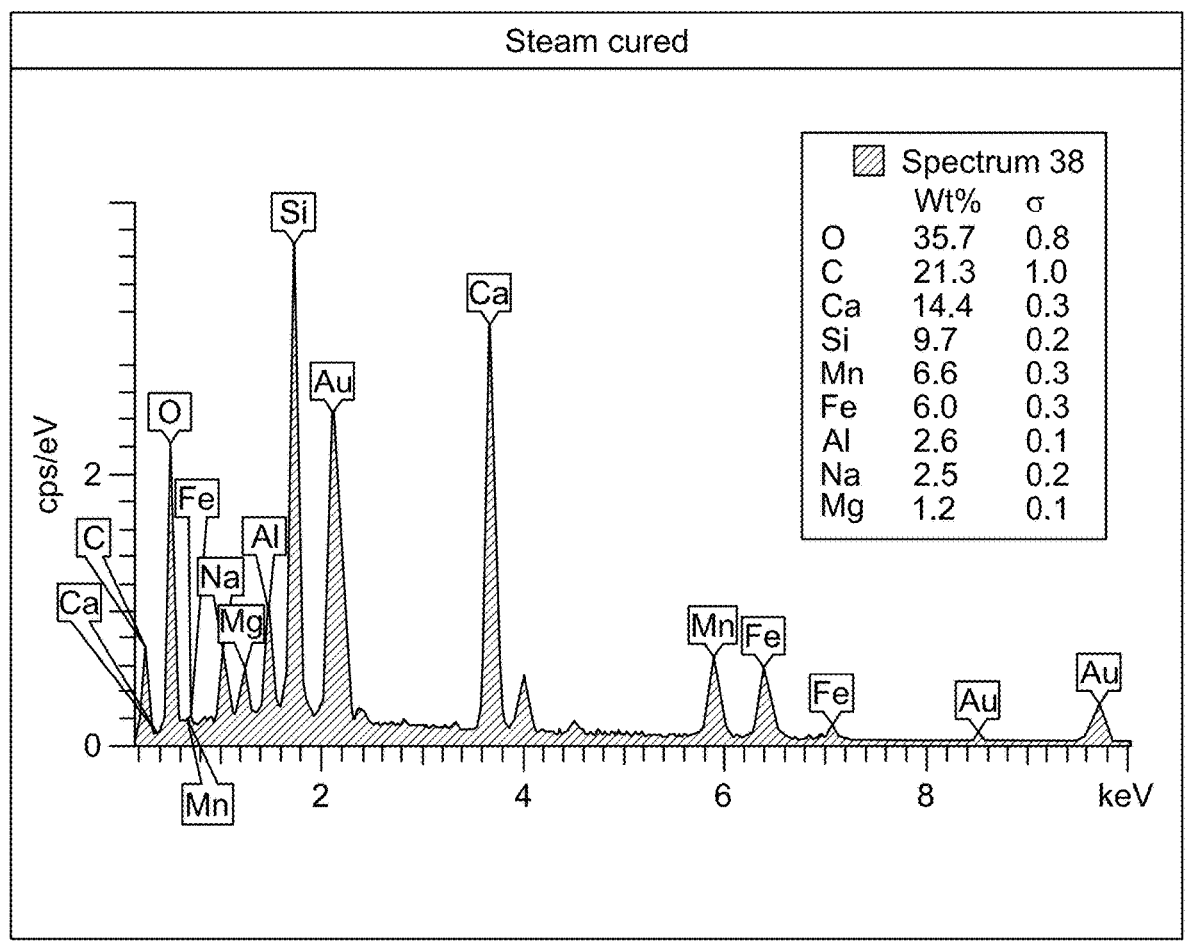
FIG. 28F is an EDX spectrum of the steam-cured specimen showing influence of curing on morphology, according to certain embodiments.
Figure 29A:
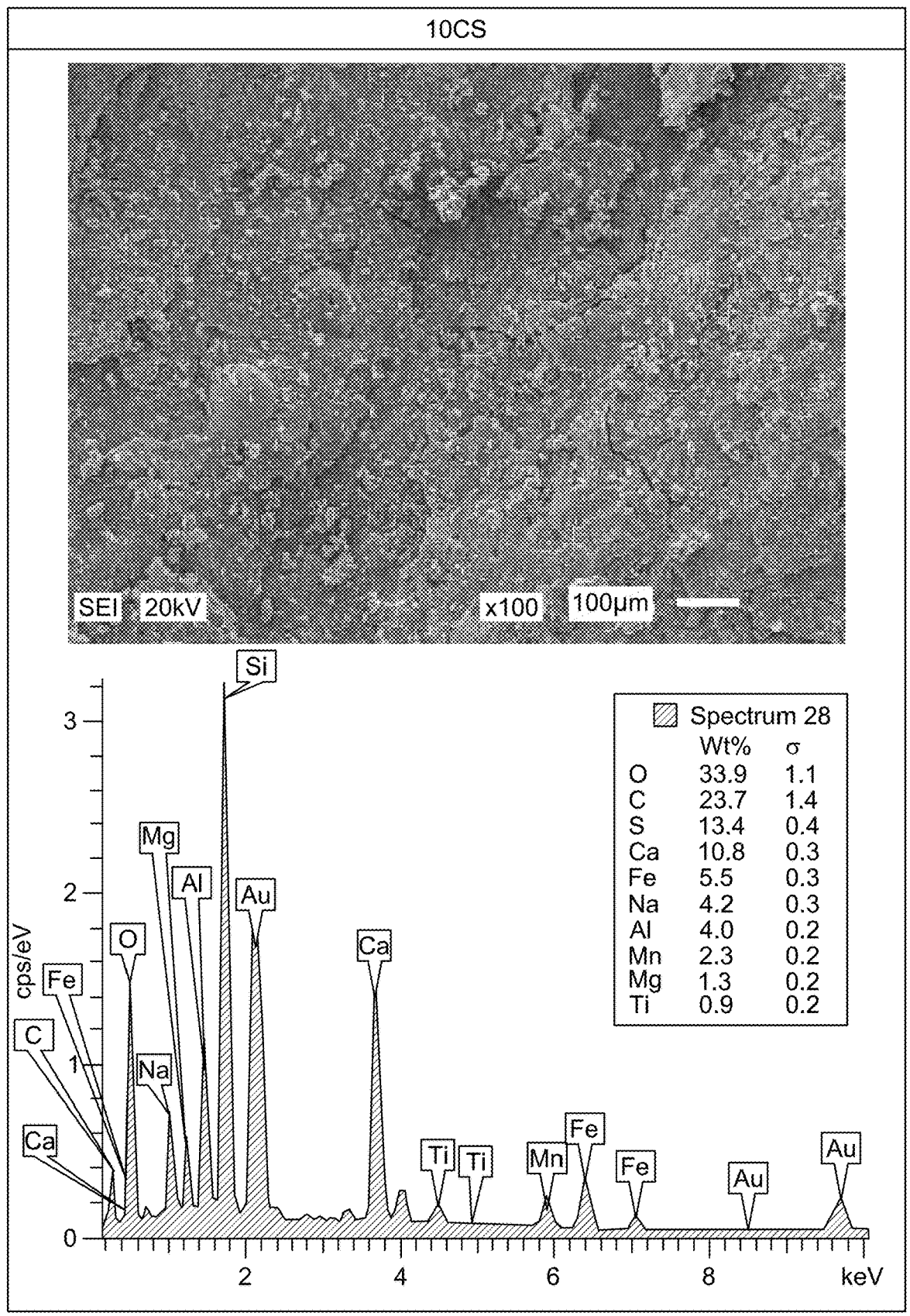
FIGS. 29A and 29B are SEM-EDX spectra for AAB specimen (10CS) with different OPC content, according to certain embodiments.
Figure 29B:
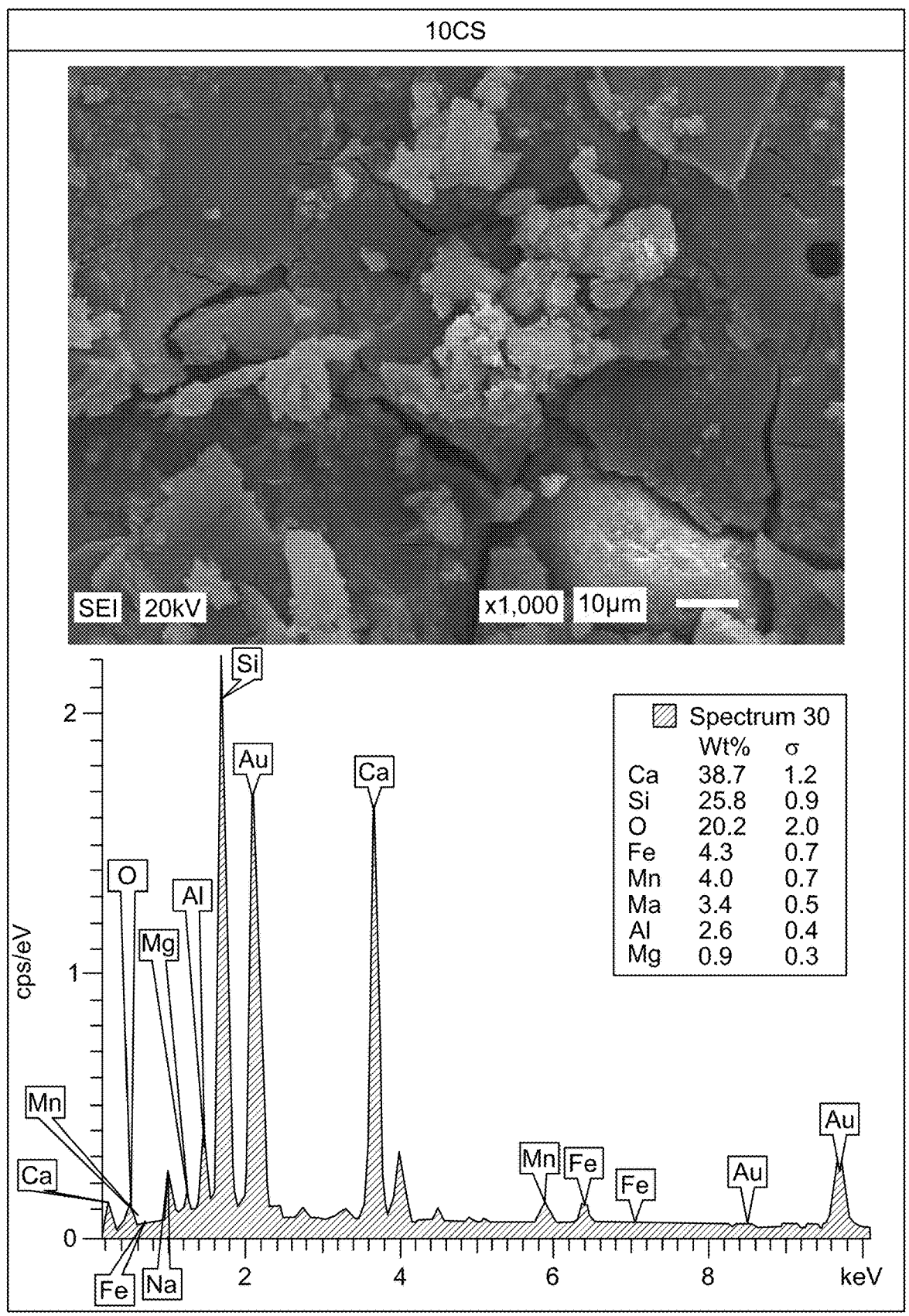
Figure 29C:
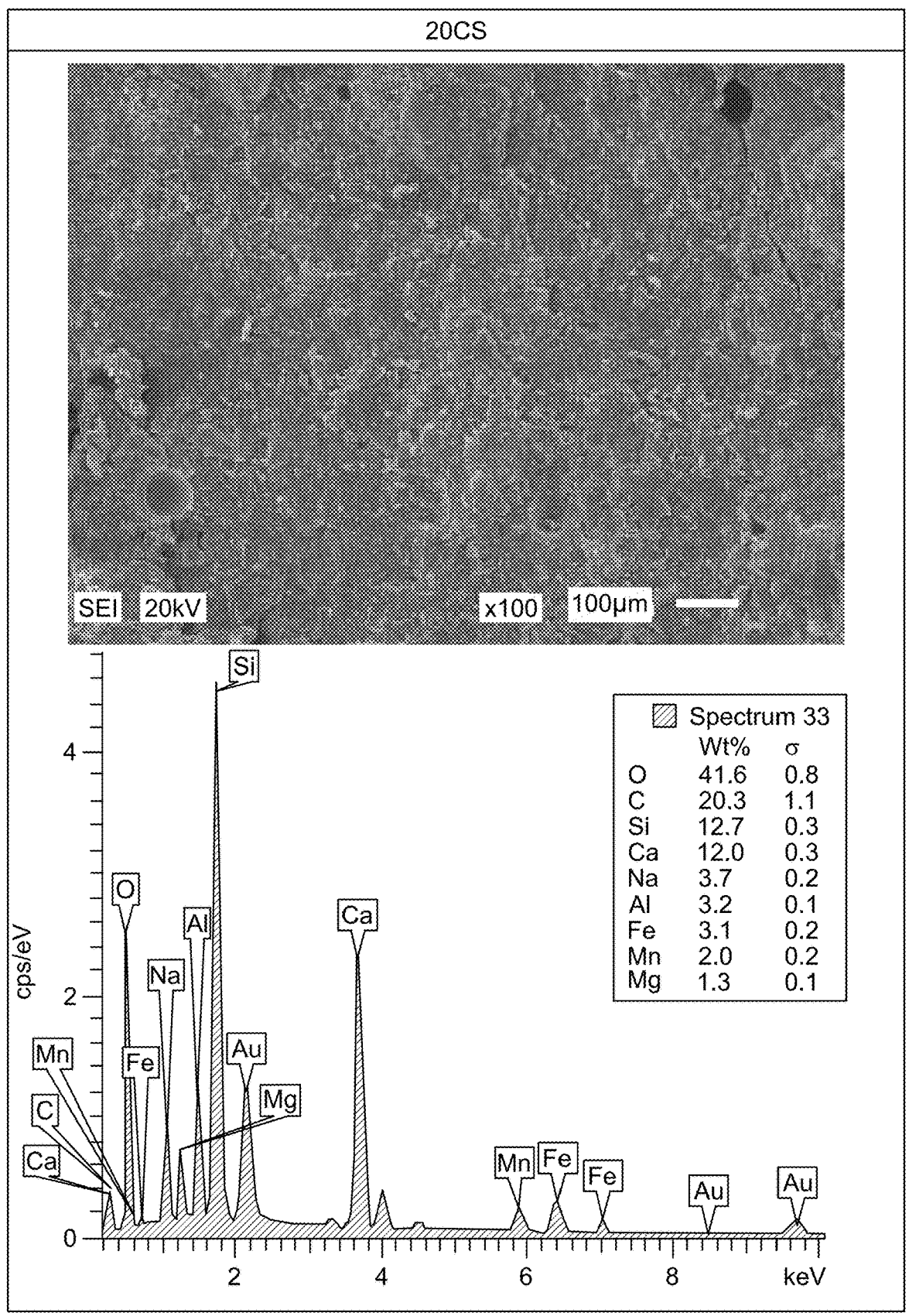
FIGS. 29C and 29D are SEM-EDX spectra for AAB specimen (20CS) with different OPC content, according to certain embodiments.
Figure 29D:
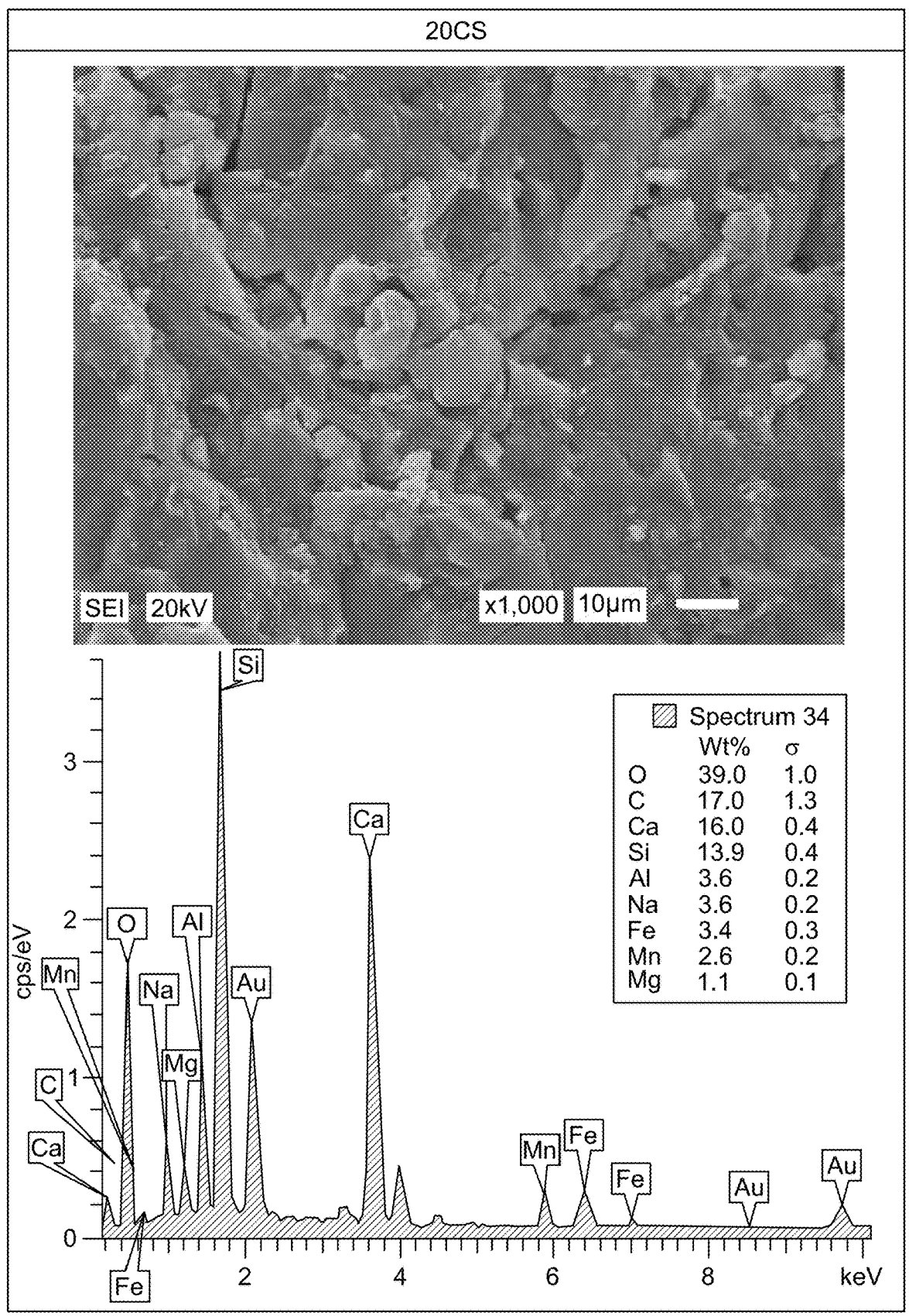
Figure 29E:
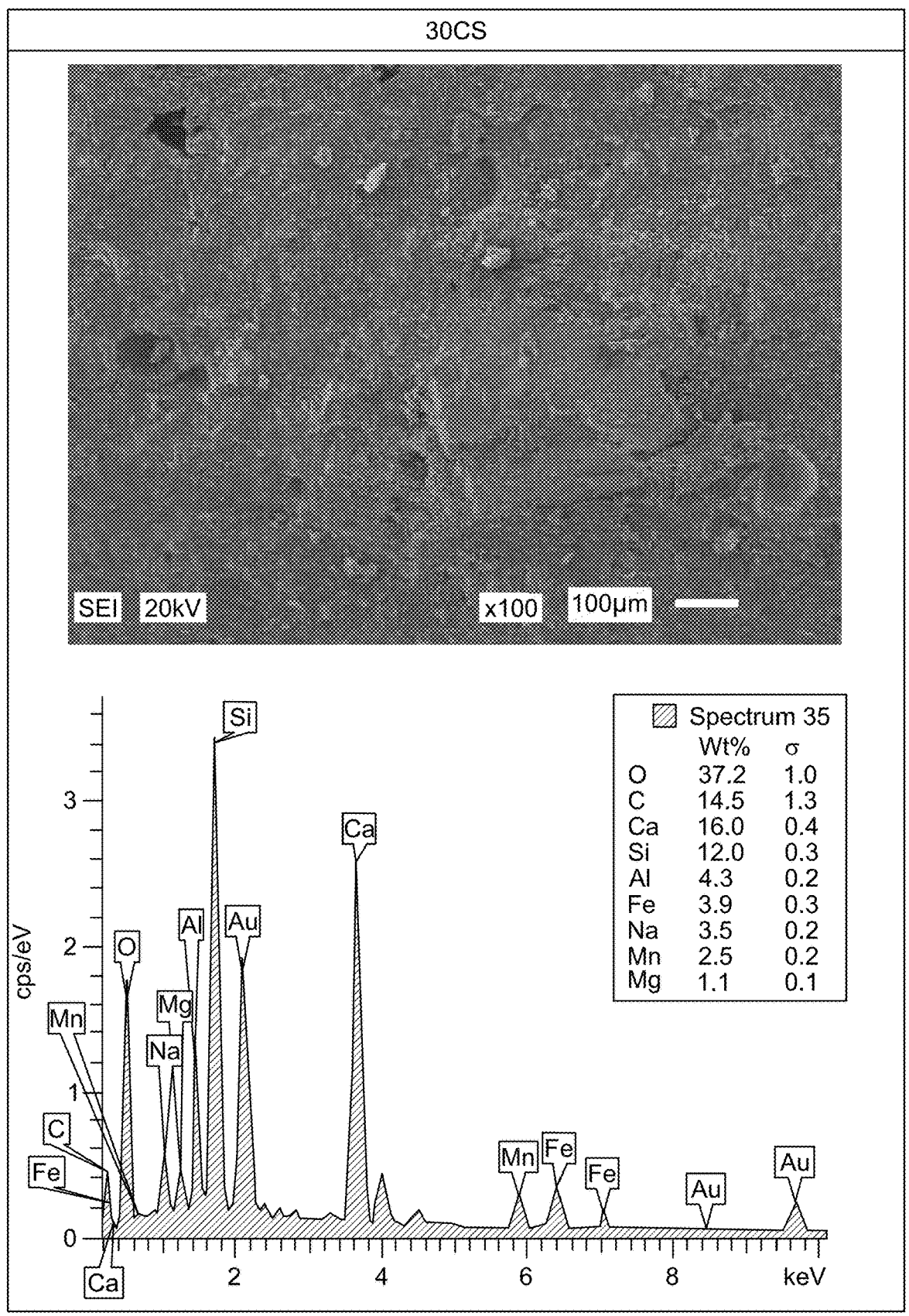
FIGS. 29E and 29F are SEM-EDX spectra for AAB specimen (30CS) with different OPC content, according to certain embodiments.
Figure 29F:
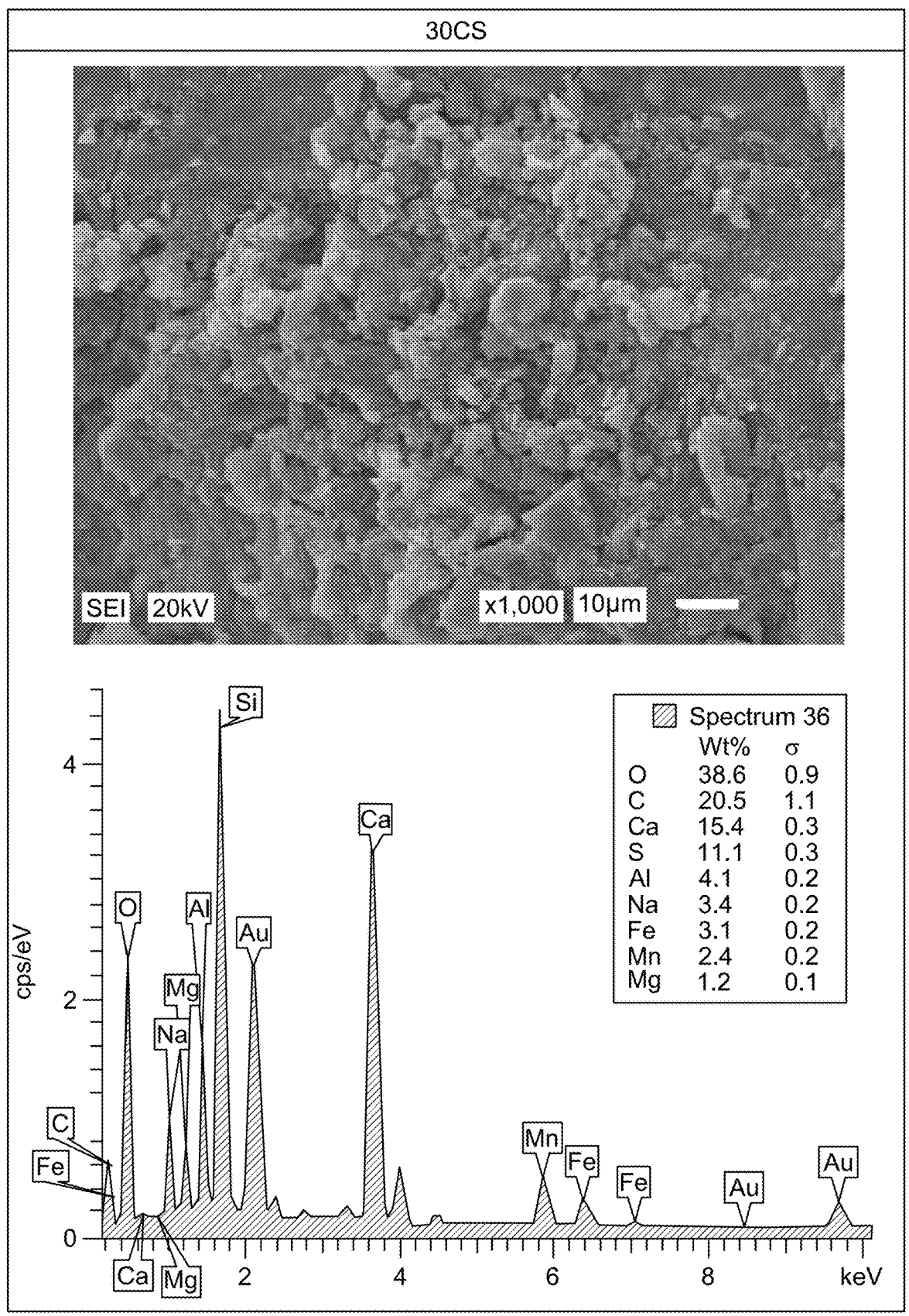
Figure 30A:
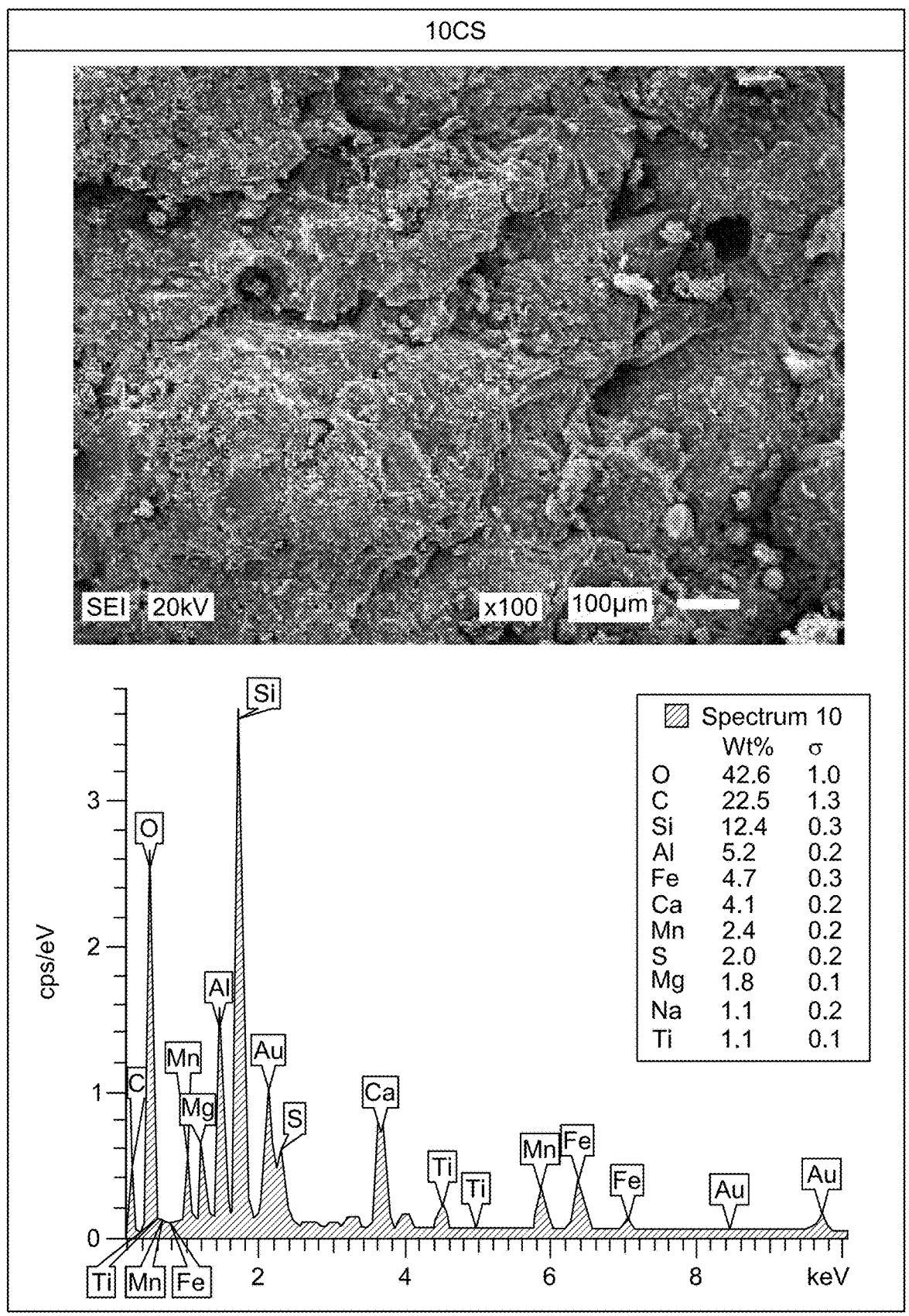
FIGS. 30A and 30B are SEM-EDX spectra for the AAB specimen (10CS) with different OPC content, after exposure to 3% sulfuric acid for 90 days, according to certain embodiments.
Figure 30B:
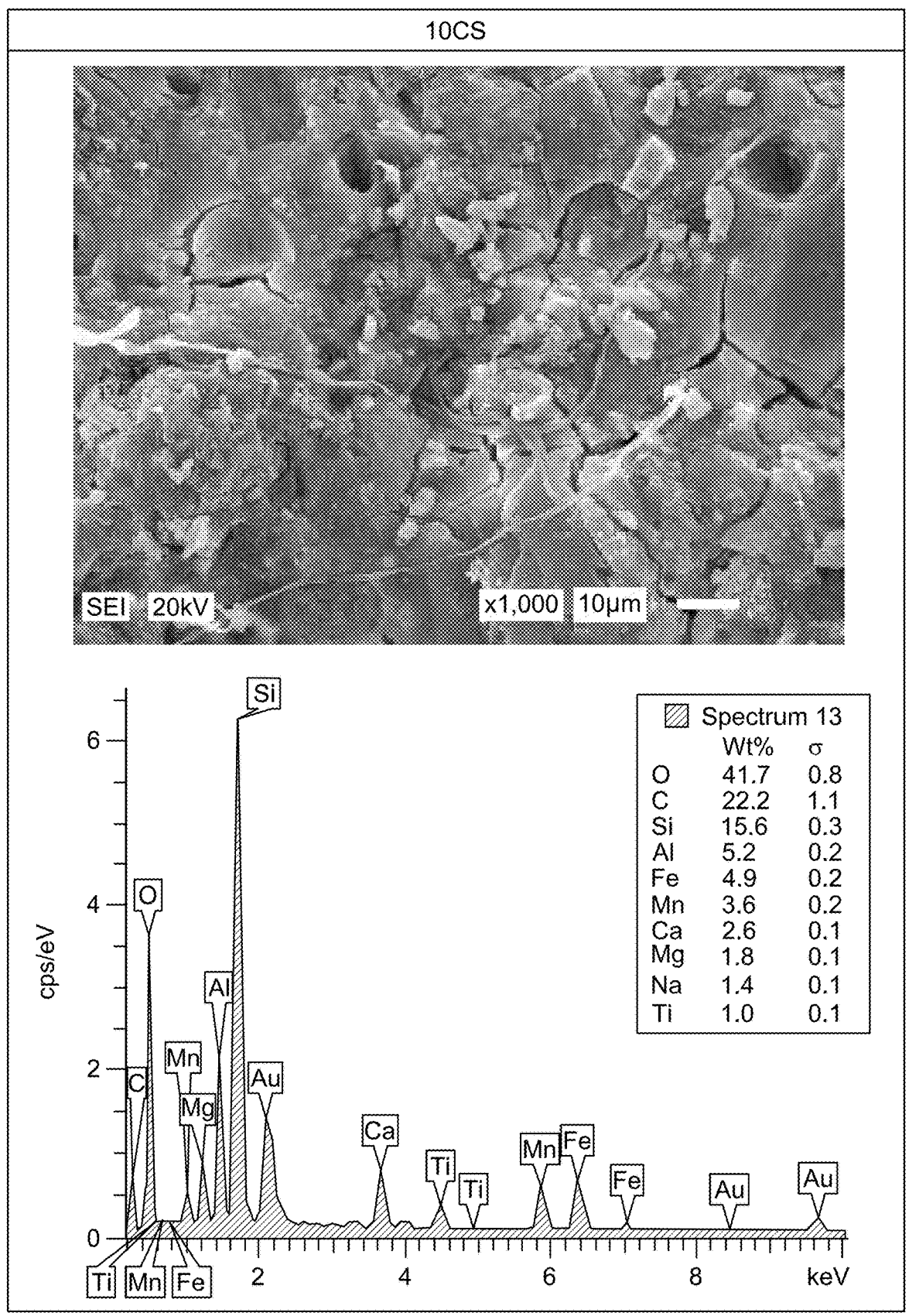
Figure 30C:
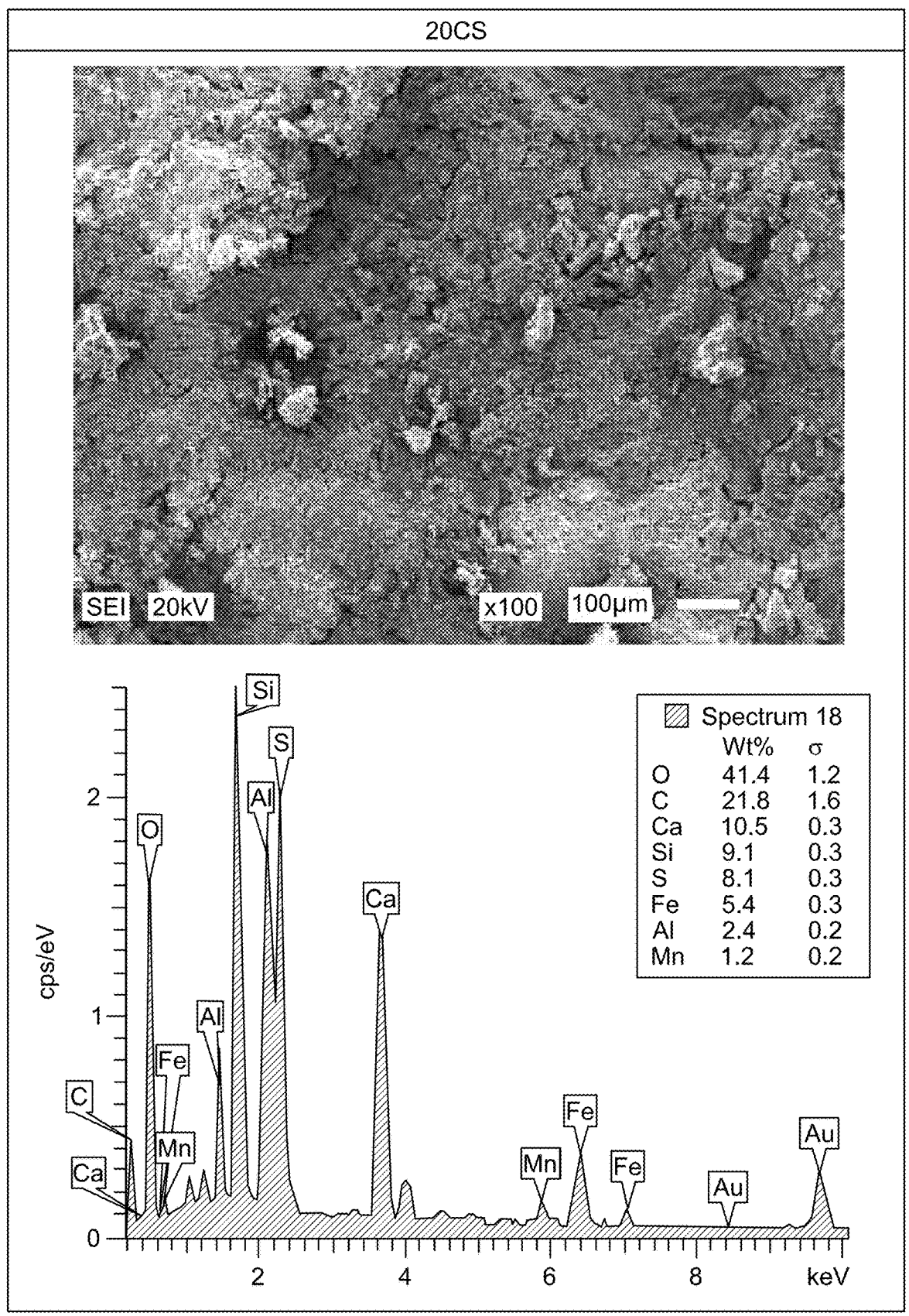
FIGS. 30C and 30D are SEM-EDX spectra for the AAB specimen (20CS) with different OPC content, after exposure to 3% sulfuric acid for 90 days, according to certain embodiments.
Figure 30D:
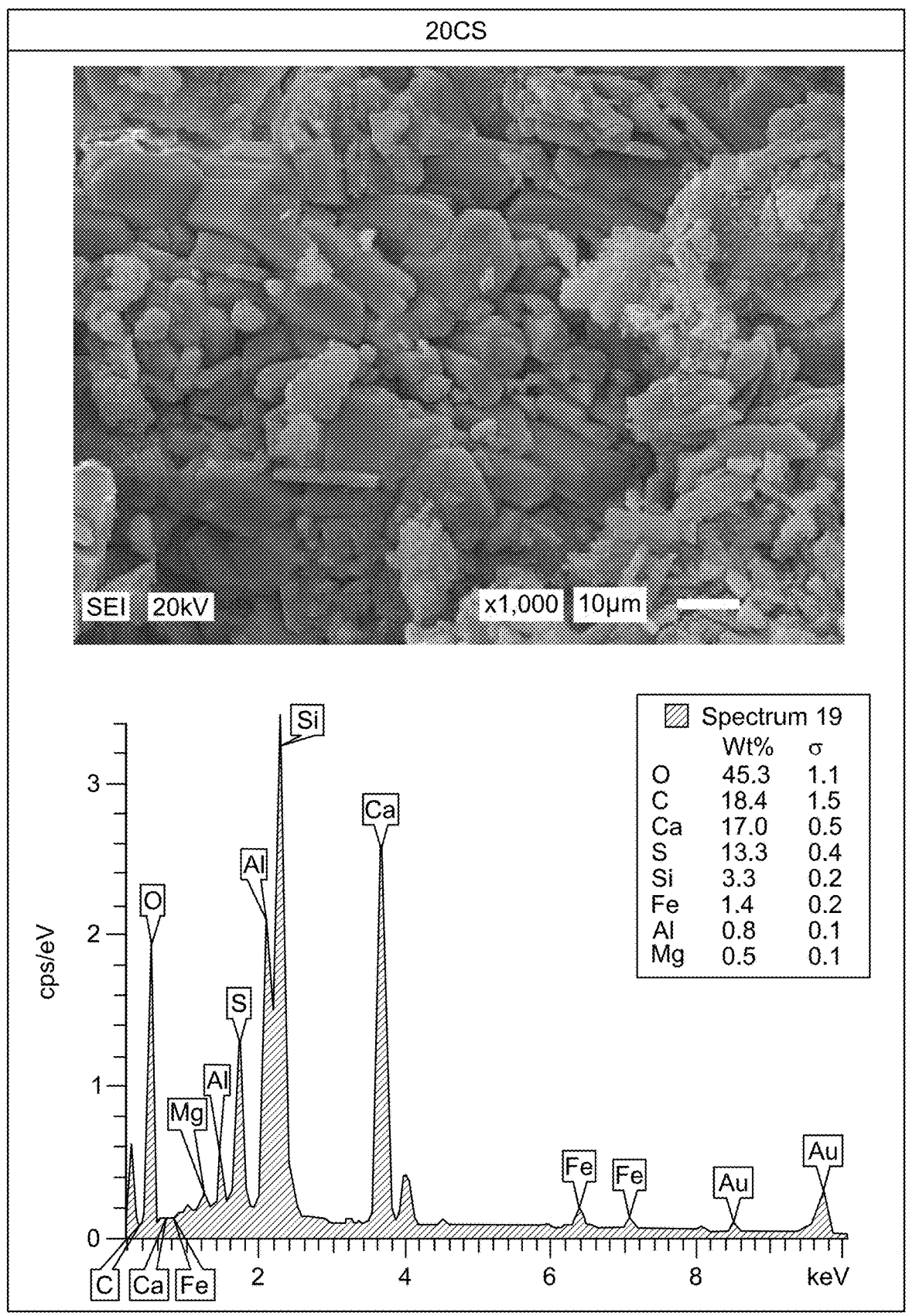
Figure 30E:
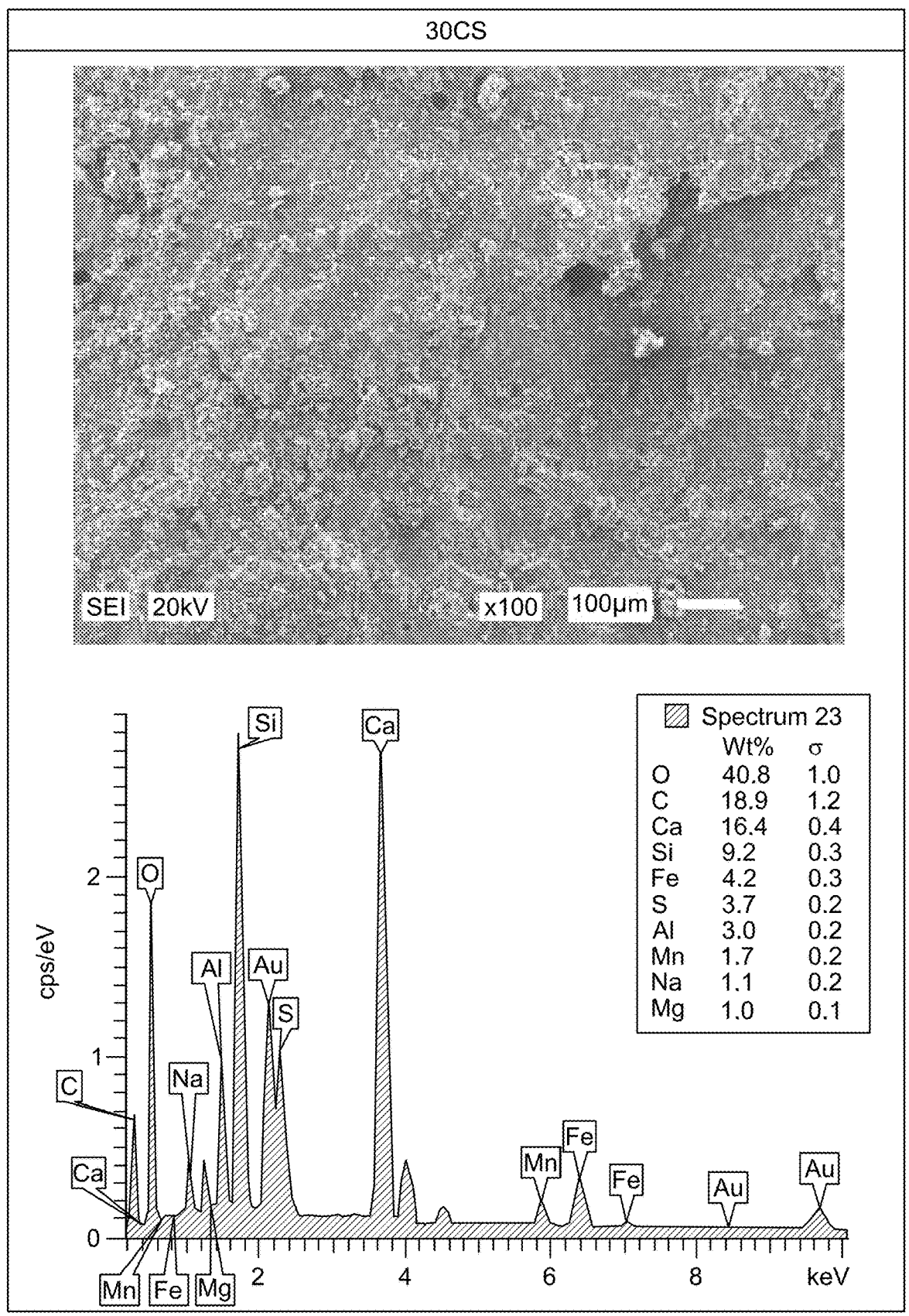
FIGS. 30E and 30F are SEM-EDX spectra for the AAB specimen (30CS) with different OPC content, after exposure to 3% sulfuric acid for 90 days, according to certain embodiments.
Figure 30F:
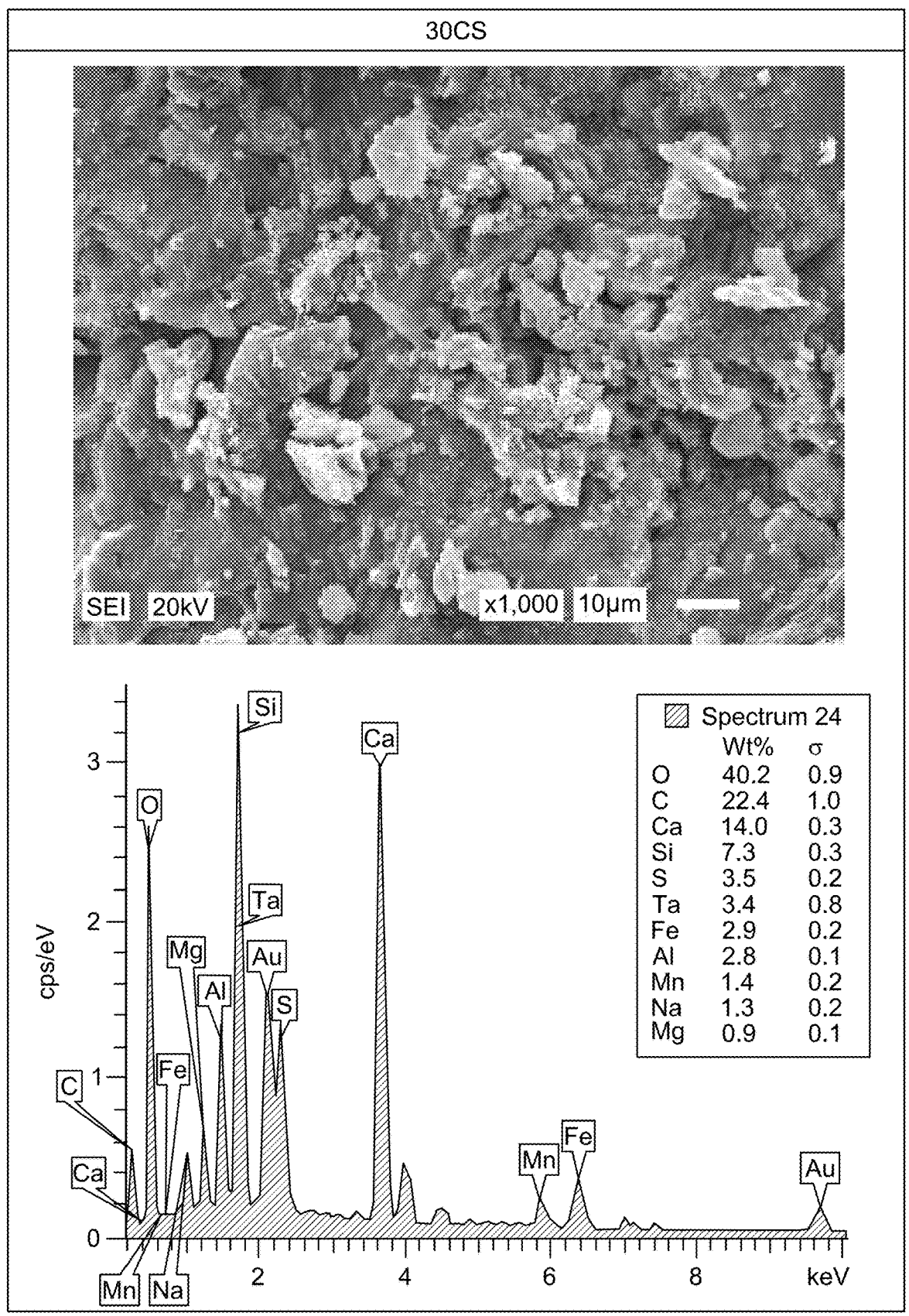
Figure 31A:
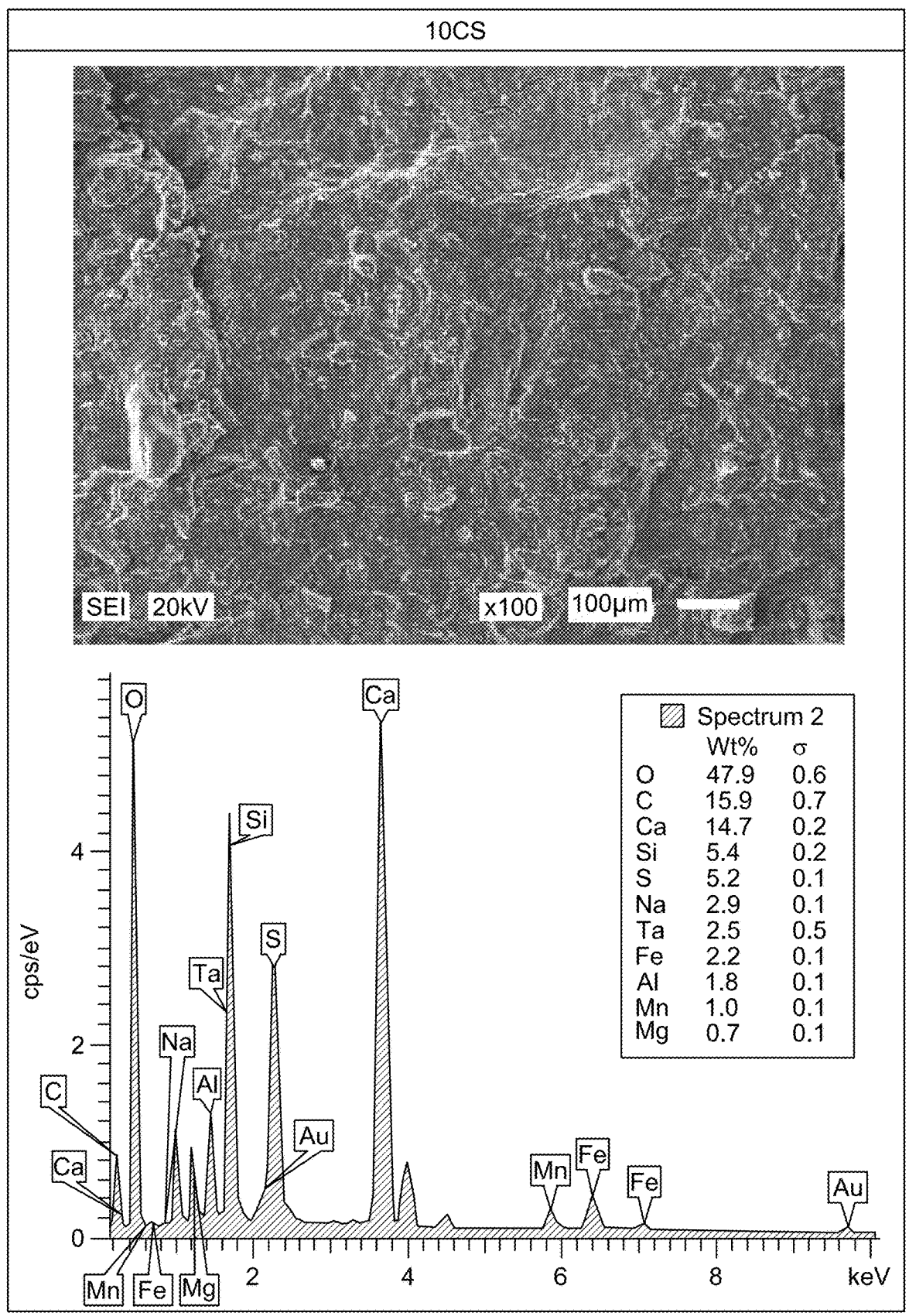
FIGS. 31A and 31B are SEM-EDX spectra for the AAB specimen (10CS) with different OPC content, after 180 days of exposure to a mixture of sodium and magnesium sulphate solution, according to certain embodiments.
Figure 31B:
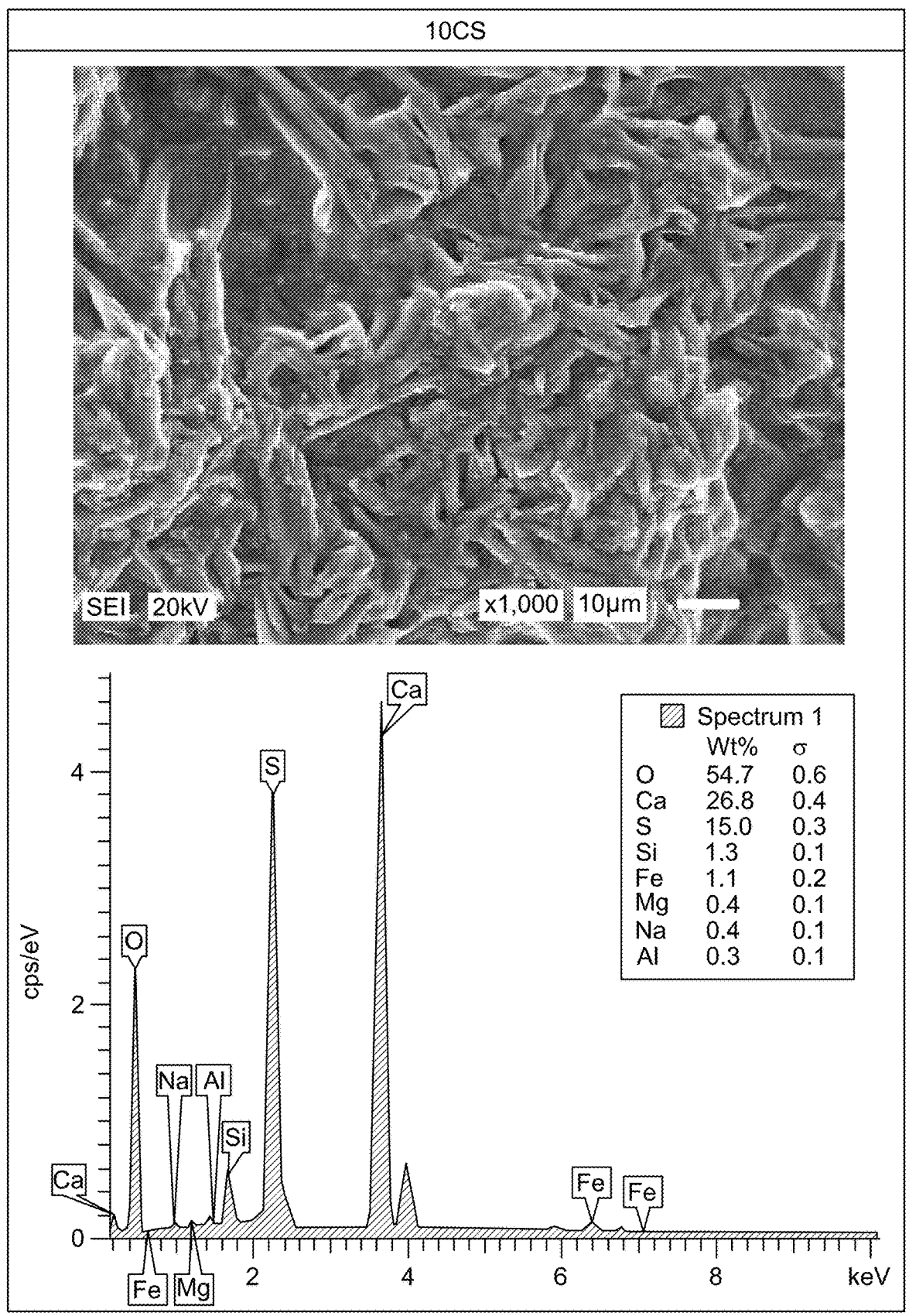
Figure 31C:
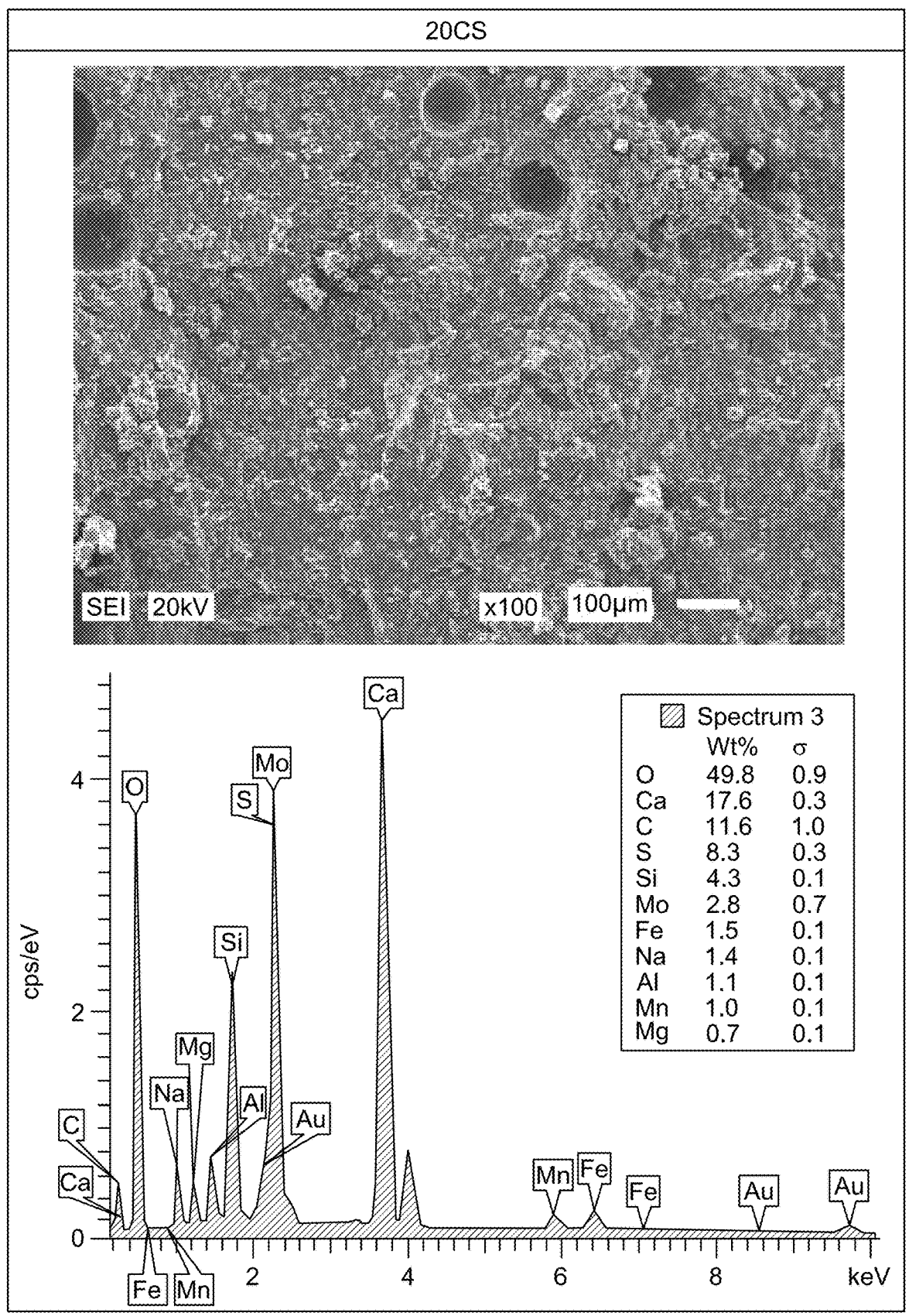
FIGS. 31C and 31D are SEM-EDX spectra for the AAB specimen (20CS) with different OPC content, after 180 days of exposure to a mixture of sodium and magnesium sulphate solution, according to certain embodiments.
Figure 31D:
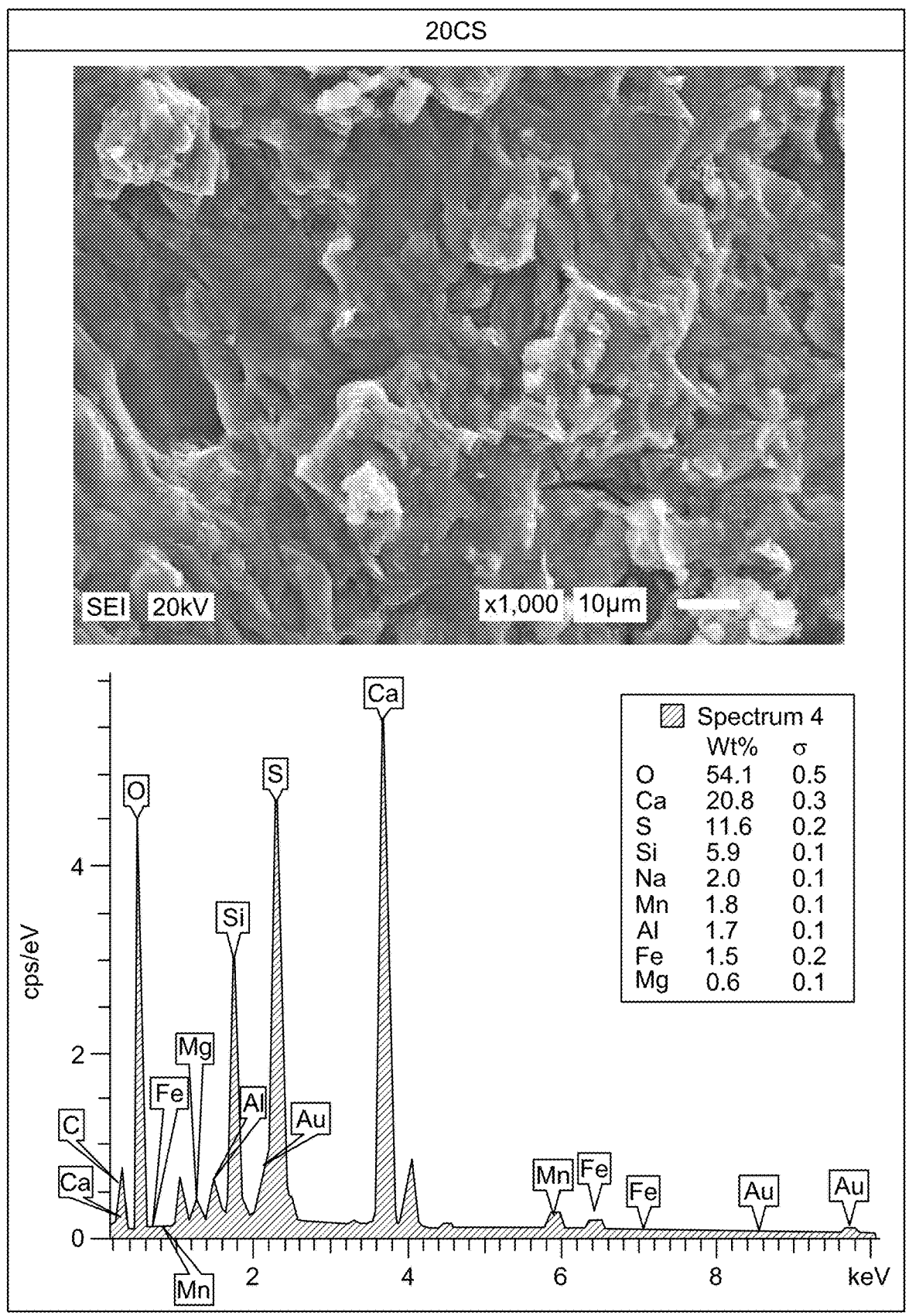
Figure 31E:
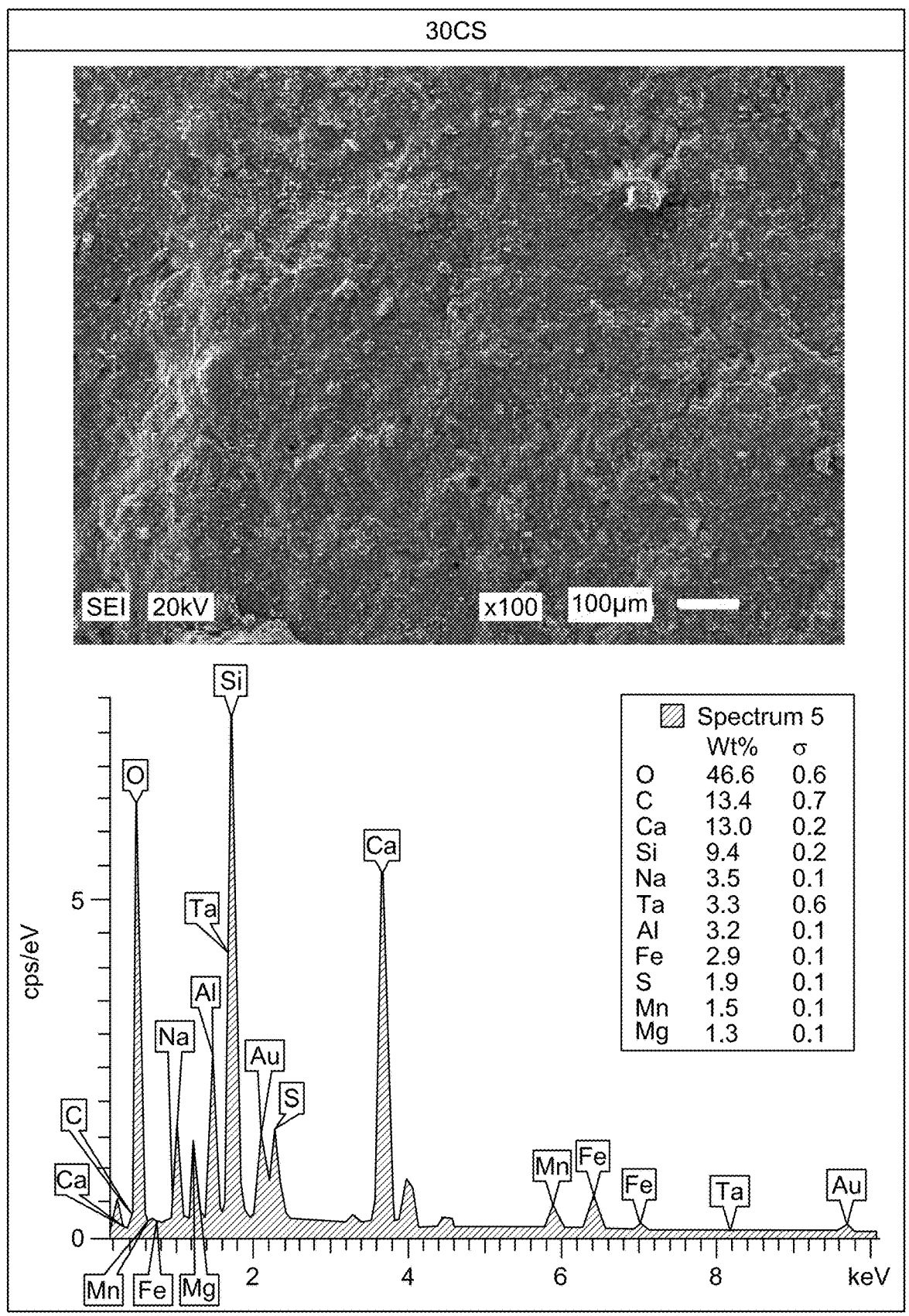
FIGS. 31E and 31F are SEM-EDX spectra for the AAB specimen (30CS) with different OPC content, after 180 days of exposure to a mixture of sodium and magnesium sulphate solution, according to certain embodiments.
Figure 31F:
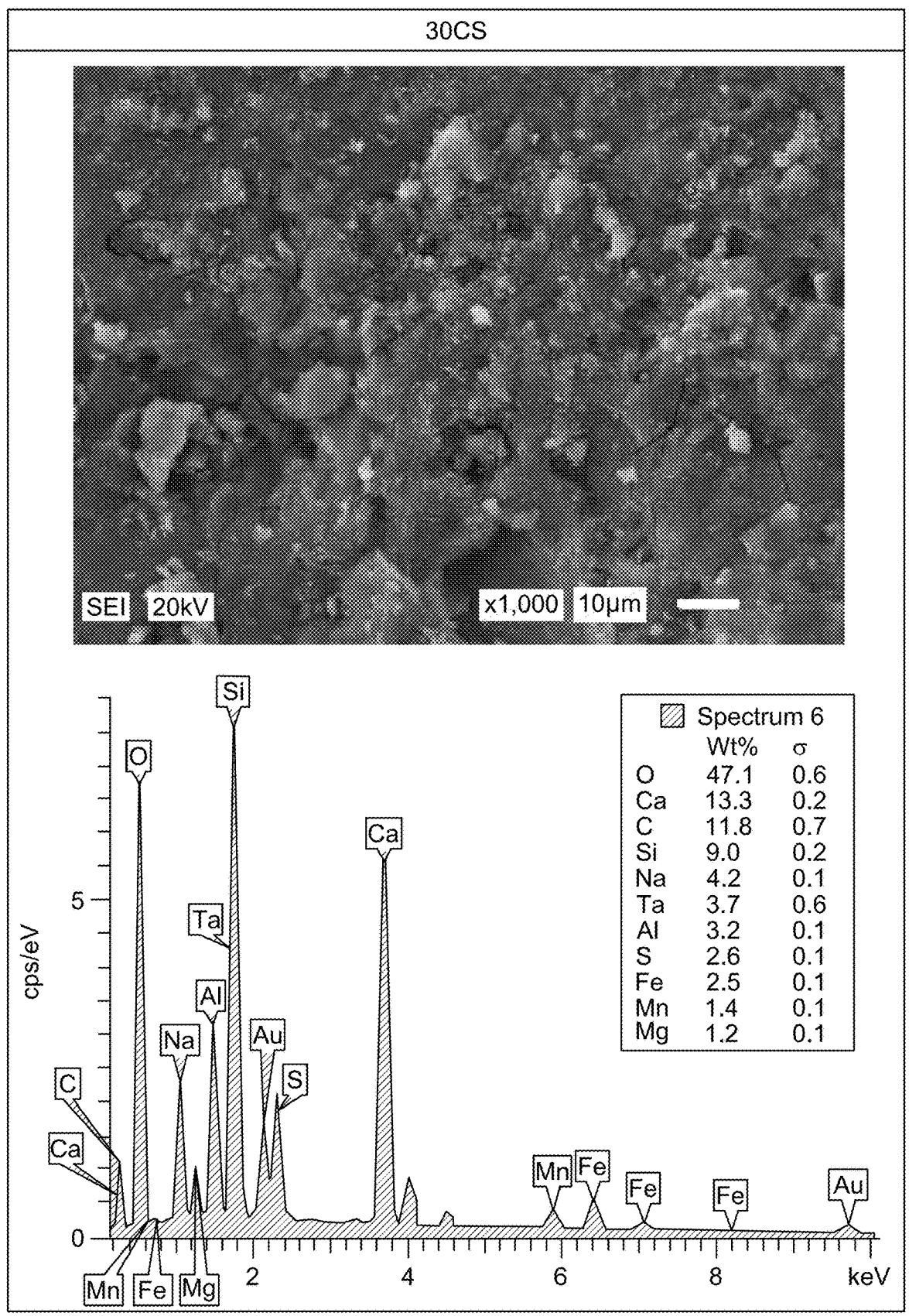
Figure 32A:
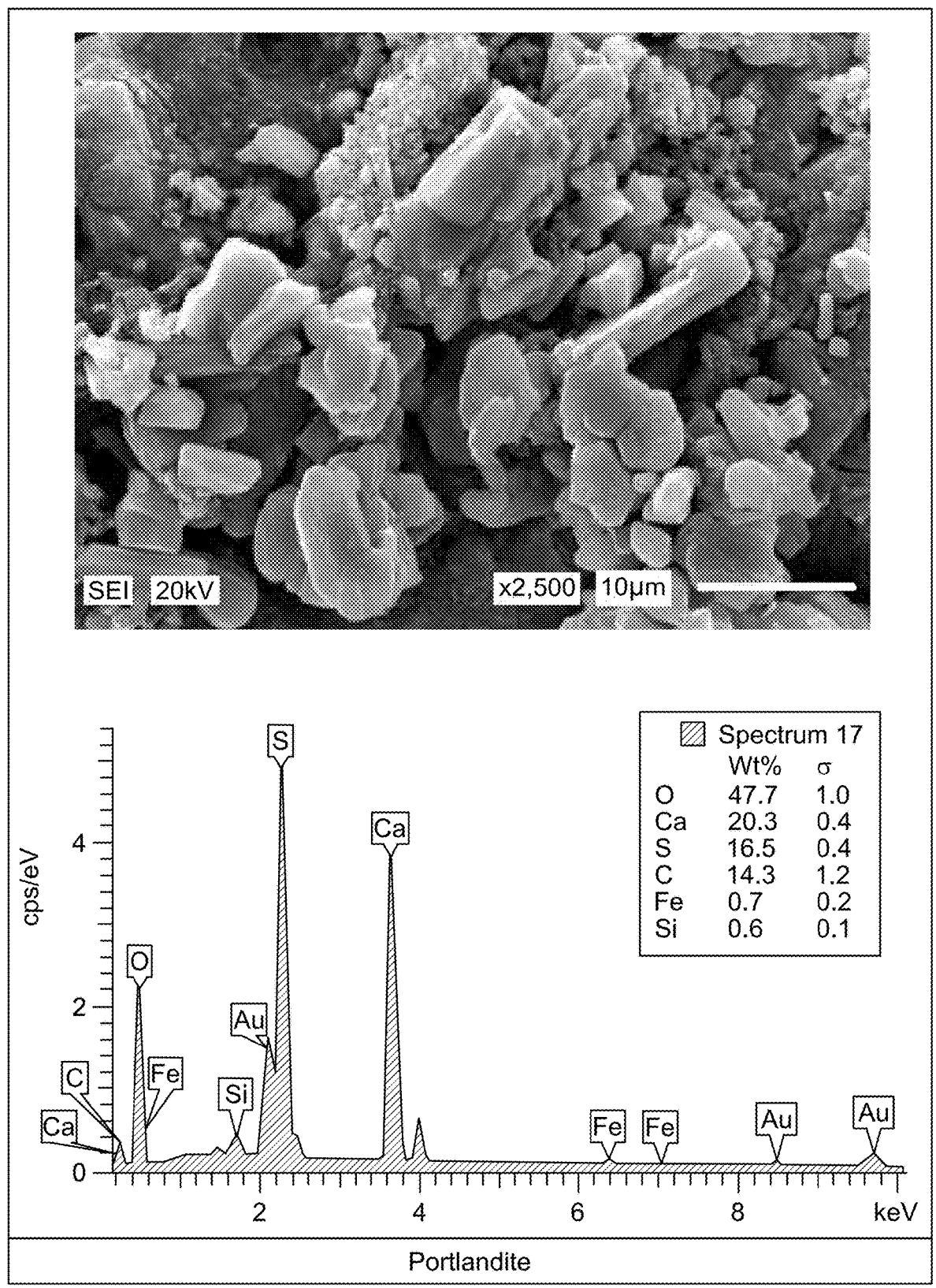
FIGS. 32A-32D are SEM-EDX spectra of portlandite, calcite, thaumasite, calcium sulfate dihydrate, respectively, obtained on deterioration of the AAB specimens after exposure to sulfuric acid and sulfates, according to certain embodiments.
Figure 32B:
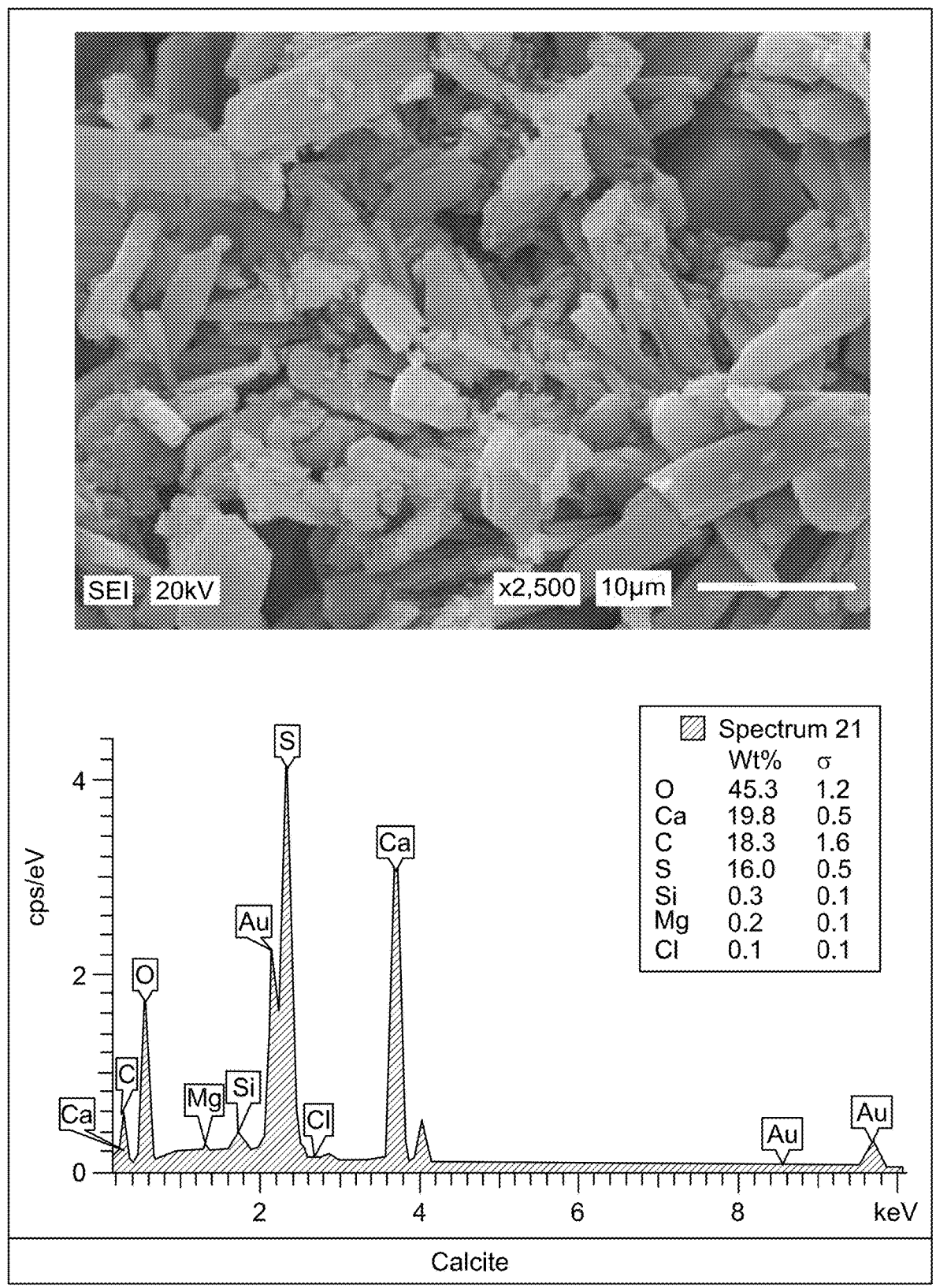
Figure 32C:
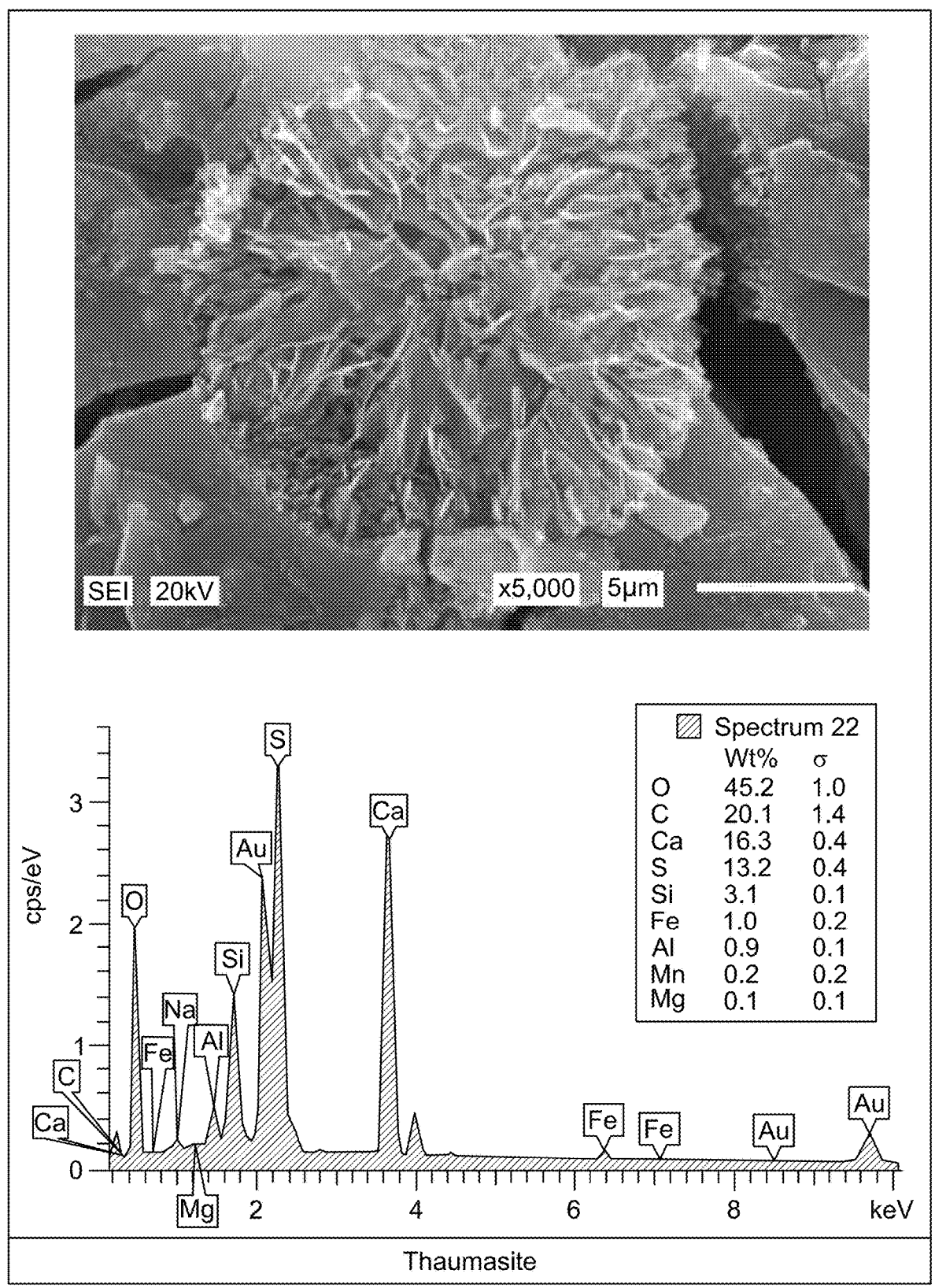
Figure 32D:
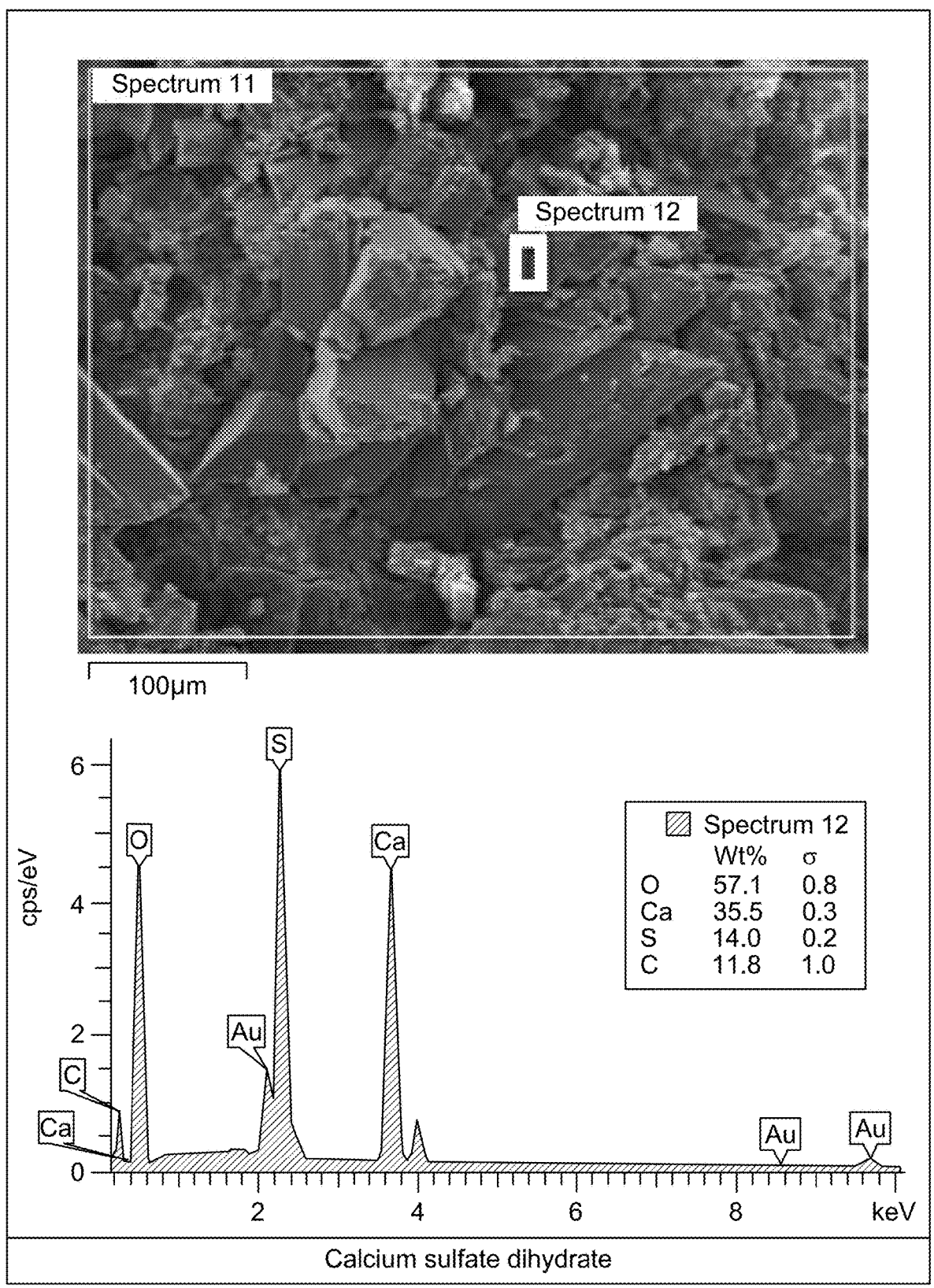

FIGS. 28A-28B shows the surface morphology and EDS spectrum (FIG. 28C) of a typical ambient-air cured specimen compared to that of a typical steam-cured specimen (FIG. 28D-28F) at the same OPC content at two magnification levels. Steam-curing showed an improvement in the microstructure where fewer cracks were visible compared to the ambient-air cured sample. Further, the steam-cured specimen showed fewer unhydrated particles, a denser microstructure with fewer voids, and a more homogenous microstructure where the voids and cracks are filled with a network of polymerization/hydration products. On the other hand, the increase in OPC content showed a similar influence on the microstructure, as shown in FIG. 29A-29F. As OPC increased, the microstructure had fewer voids, cracks, and unhydrated particles, resulting in a denser microstructure.

FIGS. 30A-30F and FIGS. 31A-31F show the microstructure of specimens after 90 days of exposure to 3% sulfuric acid, and after 180 days of exposure to a mixture of sodium and magnesium sulphate solution, respectively. The micrographs show uneven surfaces with cracks, pits, and loose materials, especially in the case of 10CS. The cracks seem more intensive and pervasive within the binder matrix in the case of the specimens exposed to sulfate which could indicate a higher susceptibility of the AAB mixtures to sulfate attack. However, since the duration of the sulfate attack exposure was considerably more than that of the acid exposure in addition to the concentration of the exposure medium being significantly higher than that of the acid attack medium, no direct comparison of severity could be established between the two exposures. As the OPC content increased, the surface was less damaged, and the cracks were less prevalent in the binder matrix resulting in better durability and better longevity for AAB mixtures with higher OPC content in corrosive environments.

FIGS. 32A-32D shows some of the main deterioration products observed in the developed binders, including platelets of portlandite (FIG. 32A), flakes of calcite (FIG. 32B), radial needles of thaumasite (FIG. 32C), and crystals of calcium sulfate dihydrate (FIG. 32D), which supports the XRD results.

Example 31: RCPT

Figure 33:
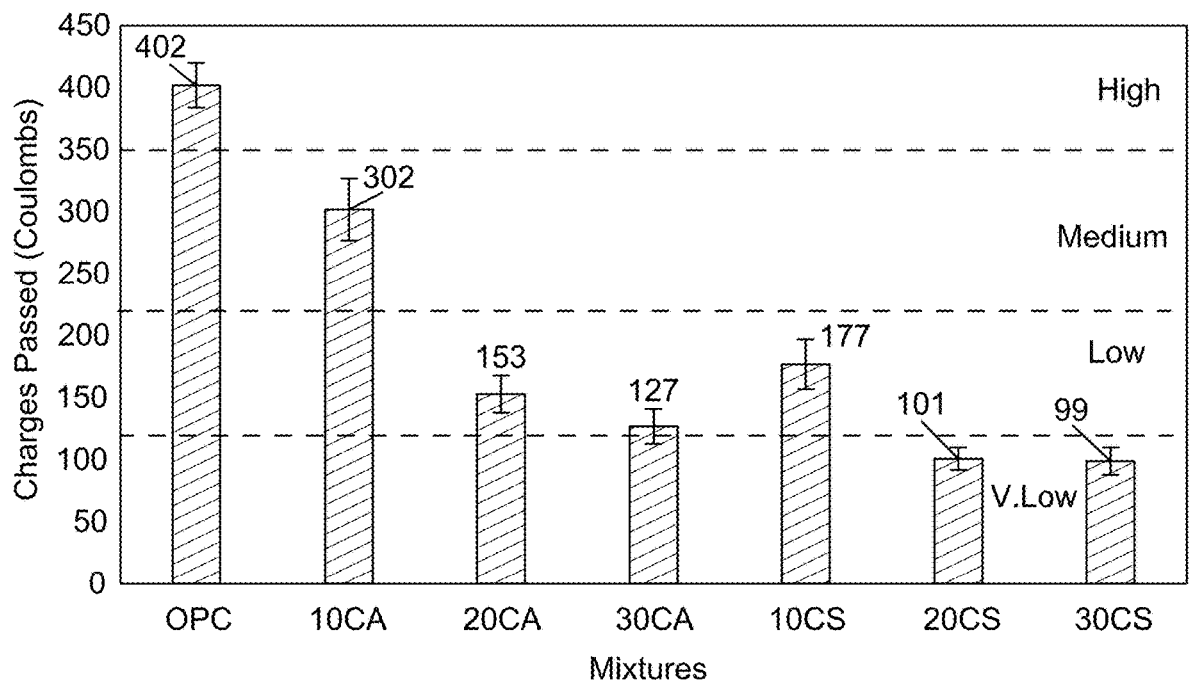
FIG. 33 shows a plot of modified rapid chloride permeability test (RCPT) and the subsequent chloride permeability classification of the mixtures, according to certain embodiments.

FIG. 33 illustrates the results of the modified rapid chloride permeability test (RCPT) and the subsequent chloride permeability classification of the mixtures considered under the present study. A lower RCPT value indicates a more compact microstructure that has the ability to hinder the movement of ions through it. The maximum passed charges of 402 Coulombs was recorded for the control mixture (100C) which belonged to the 'high permeability' class while the AAC mixture 30CS had the least passed charges of 99 Coulombs which belonged to the 'very low' chloride permeability class indicating high resistance of the AAC mixtures against chloride penetration.

Figure 34:
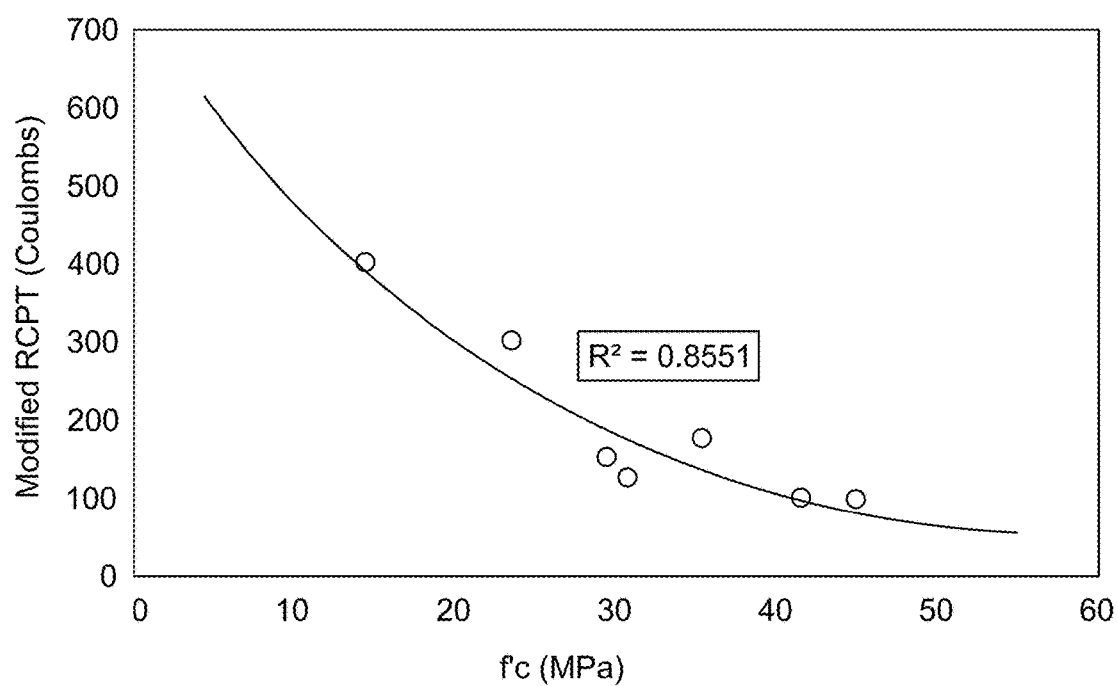
FIG. 34 is a plot of RCPT vs compressive strength at 28 days, according to certain embodiments.

As compared to the control mixture, reductions of 24.9, 61.9, and 68.4% in the charges passed were observed for the AAC mixtures 10CA, 20CA, and 30CA, respectively. A similar trend was observed in the steam-cured AACs also where reductions in the charges passed were found to be 56, 74.5, and 75.4% for 10CS, 20CS, and 30CS, respectively, as compared to the control mixture. Similar to the case of compressive strength, major reductions in the chloride permeability were recorded when the OPC content in the precursor was increased from 10 to 20%. This is due to the fact that the increase in the densness of the microstructure of the AACs showed beneficial effects on both the compressive strength as well as resistance against chloride permeability. Furthermore, this correlation was also reflected when the RCPT results of all concrete mixtures in the present study were plotted against their respective 28-day compressive strengths, as shown in FIG. 34. An exponential model (Equation 6) was obtained with a coefficient of determination ($R^2$) of 0.86 by statistically fitting the $f_c$ versus RCPT data. A high value of $R^2$ indicates a strong correlation between the compressive strength and chloride permeability.

$$RCPT = 757.75e^{-0.048 f'_c} \quad \text{Equation 20}$$

Example 32: Chloride Migration

FIG. 35 shows the plots of chloride migration test results measured in terms of the chloride penetration depth and the non-steady state migration diffusion coefficient ($D_{nssm}$). A concrete mixture that has a porous microstructure with interconnected voids is more prone to chloride migration reflected by higher values of $D_{nssm}$ and chloride penetration depth. The $D_{nssm}$ and chloride penetration depth values ranged from $37.85 \times 10^{-12}$ m²/s and 29 mm to $19.1 \times 10^{-12}$ m²/s and 16.8 mm, respectively. Similar to the RCPT results, the control mixture (100C) exhibited the highest $D_{nssm}$ and chloride penetration depth while AAC mixture 30CS exhibited the lowest values. Increase in the OPC content of the precursor resulted in a significant decrease in the $D_{nssm}$ and chloride penetration depth irrespective of the curing method. However, as compared to the ambient air curing the steam curing had a better resistance against chloride migration.

Figure 36:
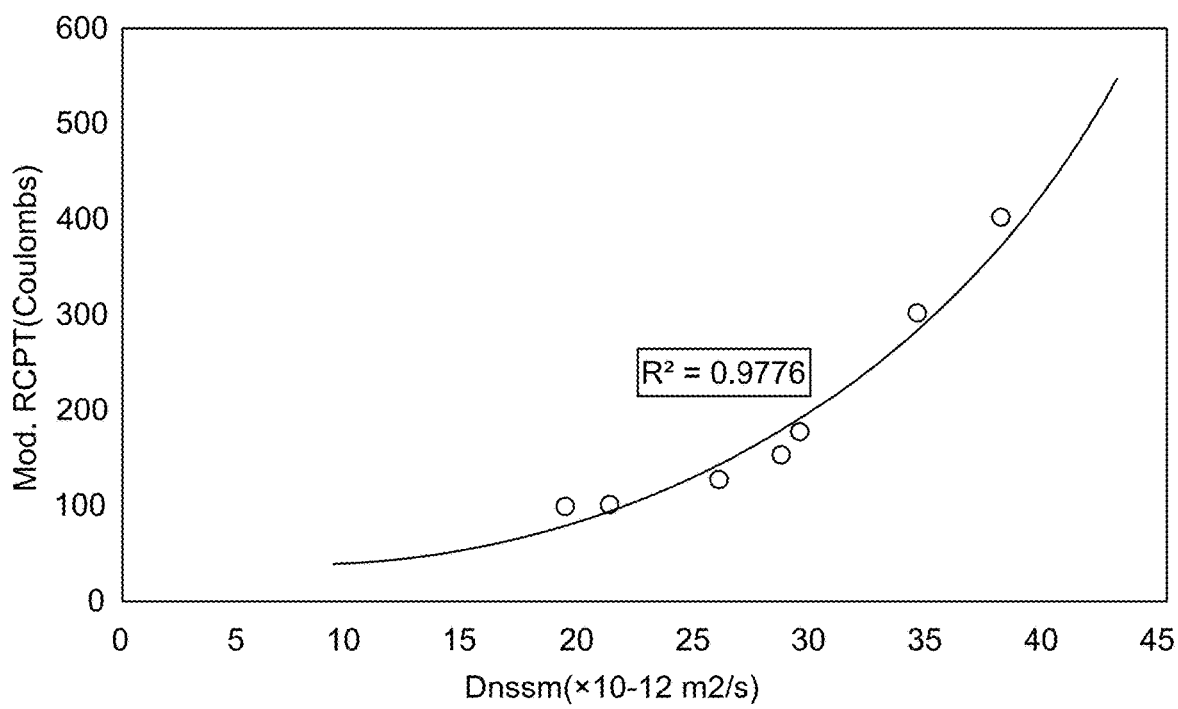
FIG. 36 is a plot of $D_{nssm}$ values vs RCPT values, according to certain embodiments.

The $D_{nssm}$ values were plotted against the RCPT values, as shown in FIG. 36 to observe if a correlation exists between these two chloride transport parameters. The plot shown in FIG. 36 confirmed a strong correlation between $D_{nssm}$ and RCPT and therefore an exponential model (Equation 21) was obtained with a very high value of $R^2$ (0.98) by fitting the data. However, more data that cover a larger range of RCPT and $D_{nssm}$ values is required to establish a more reliable correlation between these two parameters.

$$RCPT = 19.187 e^{0.0782 D_{nssm}} \quad \text{Equation 21}$$

Where RCPT is in coulombs and $D_{nssm}$ is in $\times 10^{-12}$ m²/s.

Example 33: Chloride Diffusion

Figure 37A:
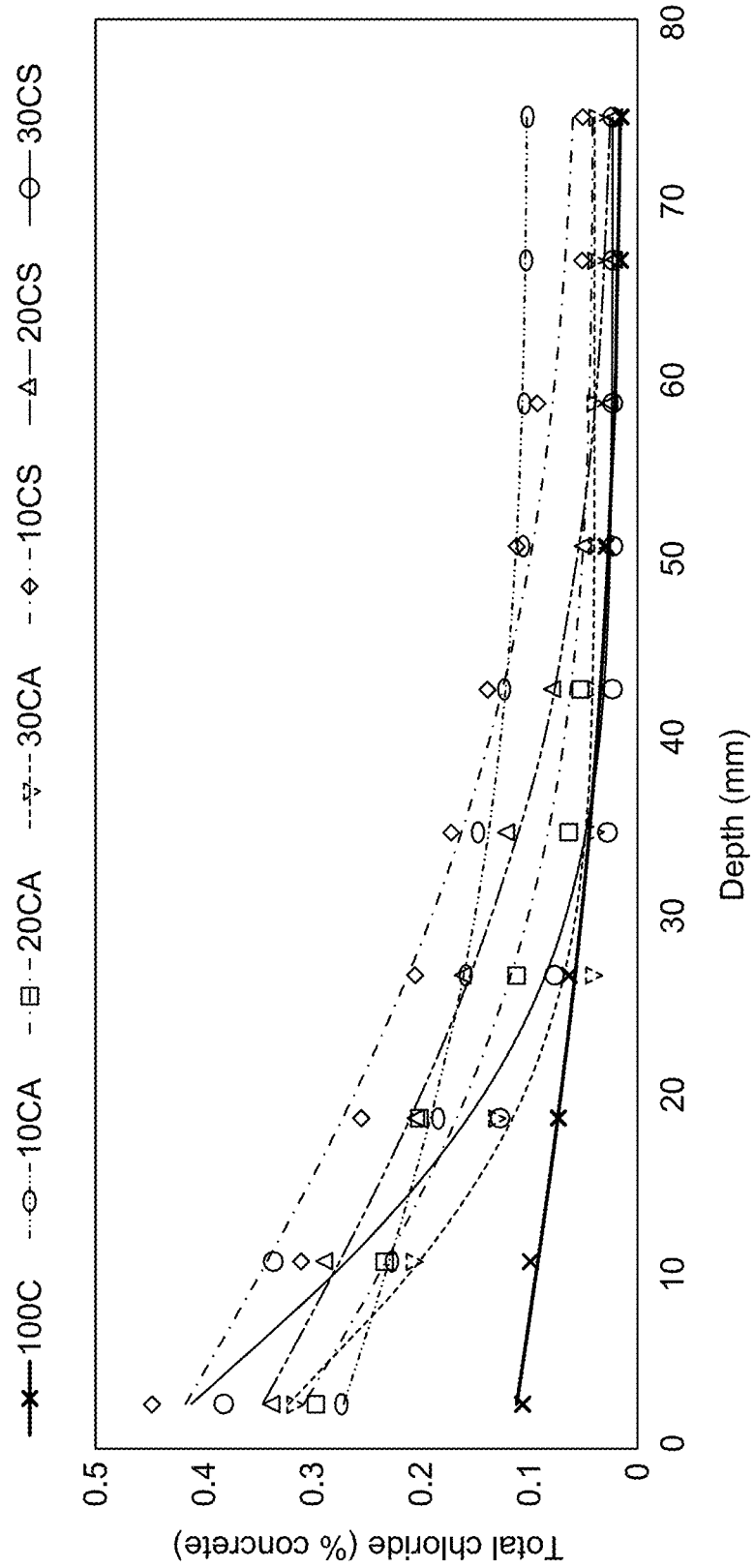
FIG. 37A shows a plot of total chloride profile of various AAC mixtures after an exposure for 180 days in sodium chloride solution, according to certain embodiments.
Figure 37B:
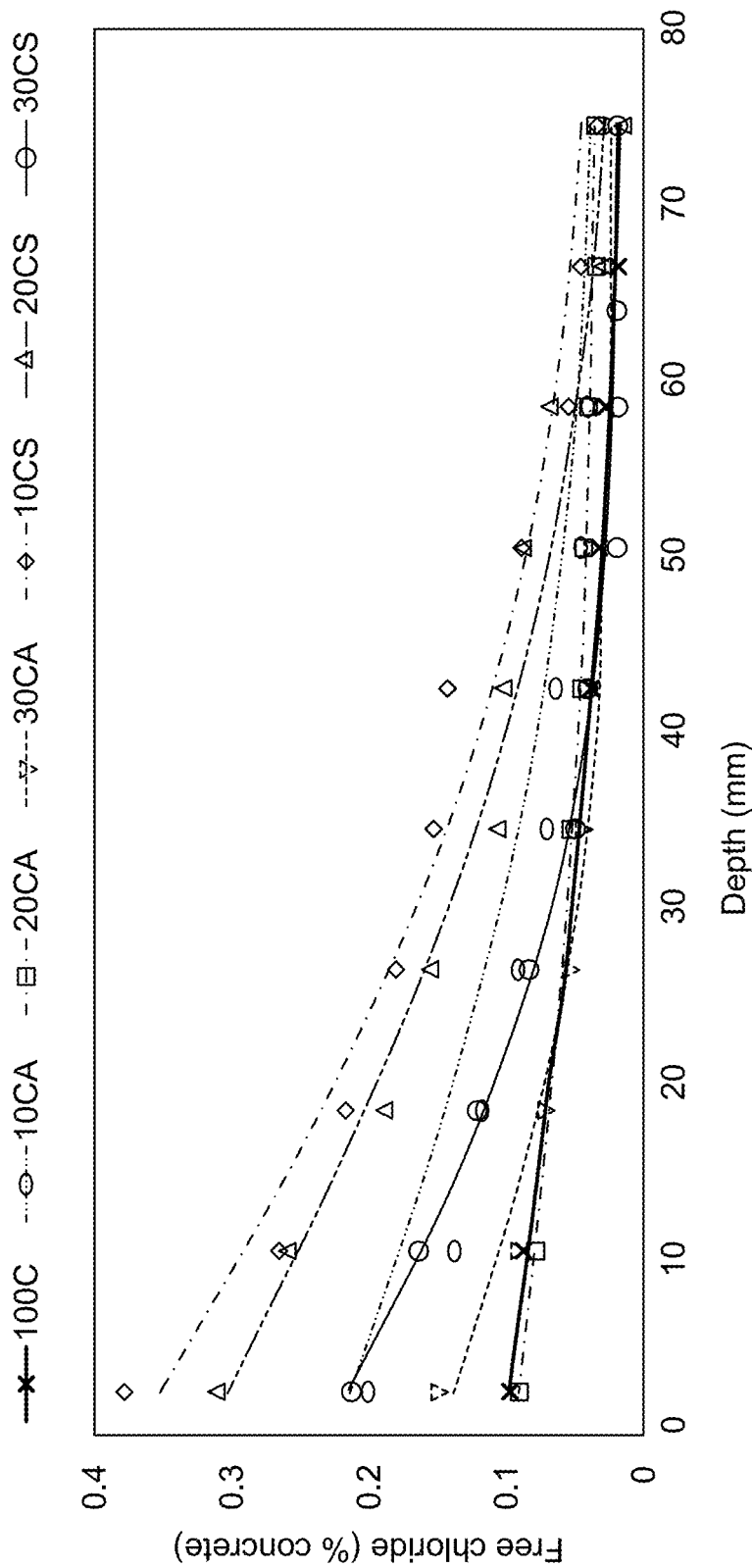
FIG. 37B shows a plot of free chloride profile of various AAC mixtures, after an exposure for 180 days in sodium chloride solution, according to certain embodiments.

FIG. 37A and FIG. 37B presents the total and free chloride profiles of the developed mixtures after an exposure for 180 days in sodium chloride solution (165 g/l), respectively. The chloride concentration decreased as the depth increased following Fick's law of diffusion. The fitted data were used to estimate the surface chloride concentration ($C_s$) and apparent chloride diffusion coefficient ($D_a$) for both free as well as total chlorides. The values of $C_s$ and $D_a$ for all concrete mixtures are presented in Table 8.

Figure 38:
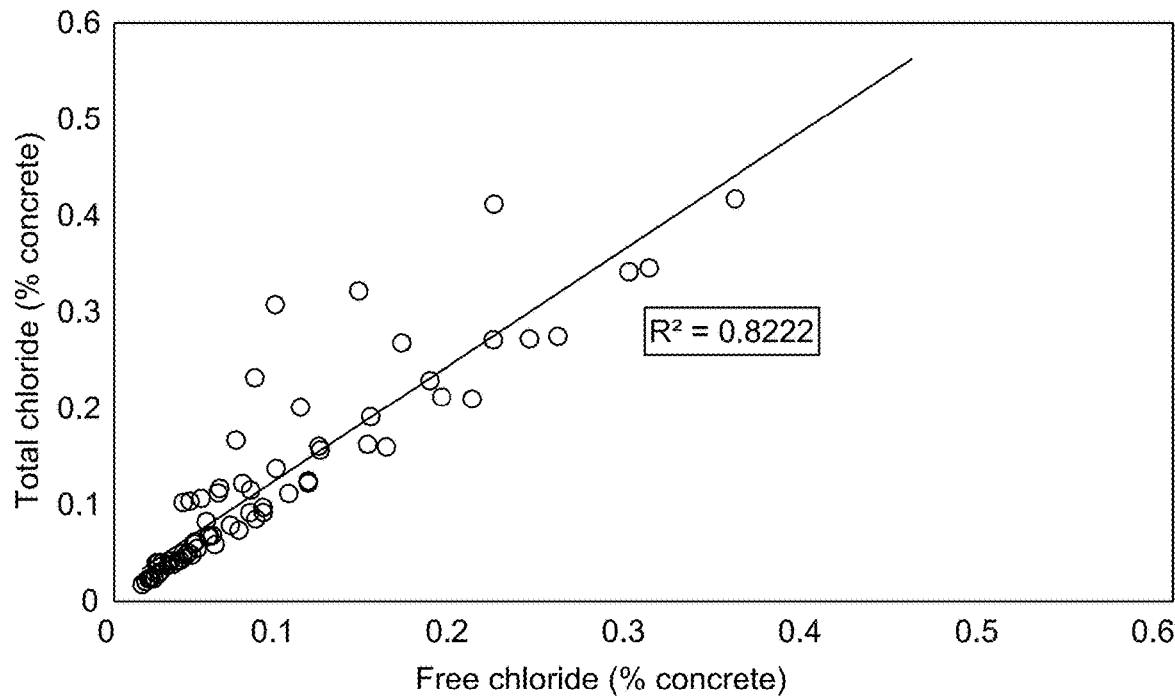
FIG. 38 shows a plot of total vs free chloride concentration, according to certain embodiments.

FIG. 38 shows the correlation between the total and free chloride concentrations. A linear model (Equation 22) was best-fitted with an $R^2$ value of 0.82 indicating a fairly good correlation between the free and total chloride. Equation 8 can be used to calculate the total chloride using the measured value of free chloride.

$$C_{total} = 1.2129 \, C_{free} + 0.0144 \quad \text{Equation 22}$$

The chloride diffusion coefficient, $D_a$, represents an evaluation of the ease of diffusion of chloride through concrete. A higher value indicates faster and easier diffusion of chloride, and the opposite is true. In the present study, $D_a$ ranged from $53 \times 10^{-12}$ to $27.6 \times 10^{-12}$ m²/s for the free chloride and from $35.1 \times 10^{-12}$ to $7.8 \times 10^{-12}$ m²/s for the total chloride, as shown in Table 8. In both cases, the control mixture showed the highest $D_a$ value followed by ambient-air cured mixtures and then the steam-cured mixtures. The $D_a$ value decreased significantly with increasing OPC content of the precursor in the ambient air cured mixtures as well as the steam-cured mixtures. There was a decrease in $D_a$ by 4.6, 14.5, 70.1, 34.2, 49.3 and 77.8% for the total chloride and 16.03, 25.3, 62.1, 33.2, 35.3, and 66.8%, for the free chloride for mixtures 10CA, 20CA, 30CA, 10CS, 20CS, and 30CS, respectively, compared to the control mixture.

The surface chloride concentration, $C_s$, represents an estimation of the maximum chloride content which exists at the interface between the concrete and exposure medium (i.e., chloride solution) hence the name. In addition, it represents the maximum chloride content after exposure and can be used to estimate the binding capacity. It is expressed as a percentage of either concrete of equivalent paste. The $C_s$ values for the total chloride ranged from 0.118% to 0.49% (by weight of concrete), as shown in Table 8. Further, it increased with increasing OPC content of the precursor in the AACs. The curing method also influenced the $C_s$ values with steam-cured mixtures having higher $C_s$ values than that of ambient-air cured mixtures indicating more binding capacity of the former mixtures. The same trends were observed for the free chloride $C_s$ values which ranged from 0.104 to 0.371% (by wt. of concrete).

TABLE 8

Total and free surface chloride (Cs), and chloride diffusion coefficients ($D_a$) after 180 days of exposure to NaCl

| | Total chloride | | Free chloride | |
|---|---|---|---|---|
| Mixture | $C_s$ (% weight of concrete) | $D_a$ (×10⁻¹² m²/s) | $C_s$ (% weight of concrete) | $D_a$ (×10⁻¹² m²/s) |
| 100C | 0.118 | 35.1 | 0.104 | 53.0 |
| 10CA | 0.285 | 33.5 | 0.227 | 44.5 |
| 20CA | 0.332 | 30.0 | 0.211 | 34.3 |
| 30CA | 0.460 | 10.5 | 0.232 | 20.1 |
| 10CS | 0.491 | 23.1 | 0.371 | 34.3 |
| 20CS | 0.368 | 17.8 | 0.202 | 29.6 |
| 30CS | 0.363 | 7.8 | 0.149 | 17.6 |

Figure 39:
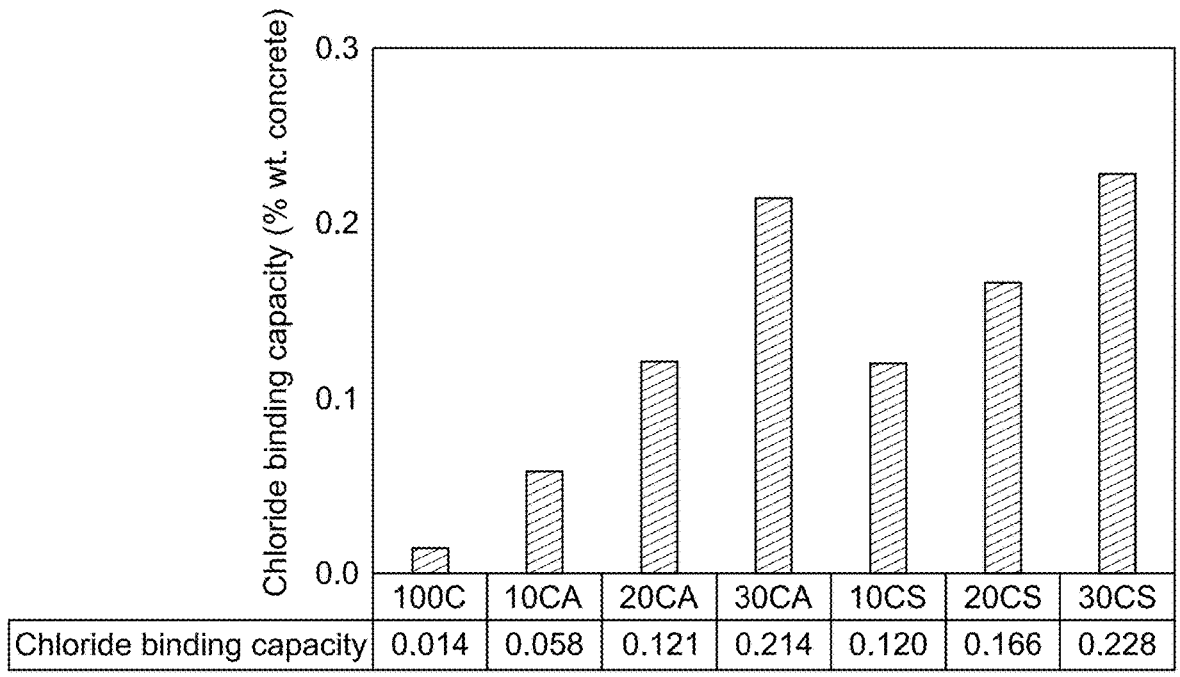
FIG. 39 shows a plot of chloride binding capacity of various AAC mixtures, according to certain embodiments.

Chloride exists in concrete in the form of free chloride and bound chloride with the latter being in the form of complex alumina-chloride salts such as Friedal's salt. As the alumina hydration products increase, the binding capacity increases which limits the amount of free chloride that initiates reinforcement corrosion in reinforced concrete structures. The chloride binding capacity for all the concrete mixtures were calculated using the values of total and free chloride concentrations at surface by subtracting the surface chloride values of the free chloride from those of the total chloride. FIG. 39 shows the values of bound chloride (i.e., chloride binding capacity) of all concrete mixtures. The binding capacity ranged from 0.014% (by wt. of concrete) for control mixture to 0.228% for 30CS. Further, the binding capacity increased with increasing OPC content in the precursor of the AAC mixtures. Furthermore, the steam curing regime increased the binding capacity as compared to that of the ambient air-cured mixtures. Both observations can be owed to the formation of more alumina-carrying polymerization products such as CASH, NASH, and Mn-ASH which results in higher binding capacity that can increase the service life of structures by delaying reinforcement corrosion initiation. Furthermore, alumina-rich mixtures have been reported to increase the threshold at which reinforcement corrosion is initiated, which is also known as the chloride threshold. For example, Ann and Song [K. Y. Ann and H. W. Song, "Chloride threshold level for corrosion of steel in concrete," Corros. Sci., vol. 49, no. 11, pp. 4113-4133, 2007, which is incorporated herein by reference in its entirety] reported increases in the chloride threshold ranging from 55 to 213% with the addition of 10% calcium aluminate cement to OPC.

Table 9 presents the free chloride concentration at a depth of 75 mm which is equivalent to the minimum concrete cover recommended by the ACI-318 code for concrete exposed to external chlorides. Table 9 also presents the free chloride limits for C1 and C2 types of exposure for reinforced concrete as well as prestressed concrete structures. Mixtures 30CA, 20CS, and 30CS showed chloride contents that pass the ACI-318 criteria for reinforced concrete structures in both exposure conditions C1 and C2. As for the prestressed concrete structures, all mixtures failed to meet the chloride content criterion set by the ACI-318.

TABLE 9

Free chloride concentration at 75 mm depth

| | | Chloride threshold (ACI-318) | | | |
|---|---|---|---|---|---|
| | Free chloride | RC | | Pre-stressed | |
| Mix | (% concrete) at 75 mm | C1 exposure | C2 Exposure | C1 exposure | C2 Exposure |
| 100C | 0.0149 | 0.05 | 0.025 | 0.01 | 0.01 |
| 10CA | 0.0348 | | | | |
| 20CA | 0.0350 | | | | |
| 30CA | 0.0237 | | | | |
| 10CS | 0.0341 | | | | |
| 20CS | 0.0144 | | | | |
| 30CS | 0.0190 | | | | |

Example 35: Electrochemical Methods

Figure 40:
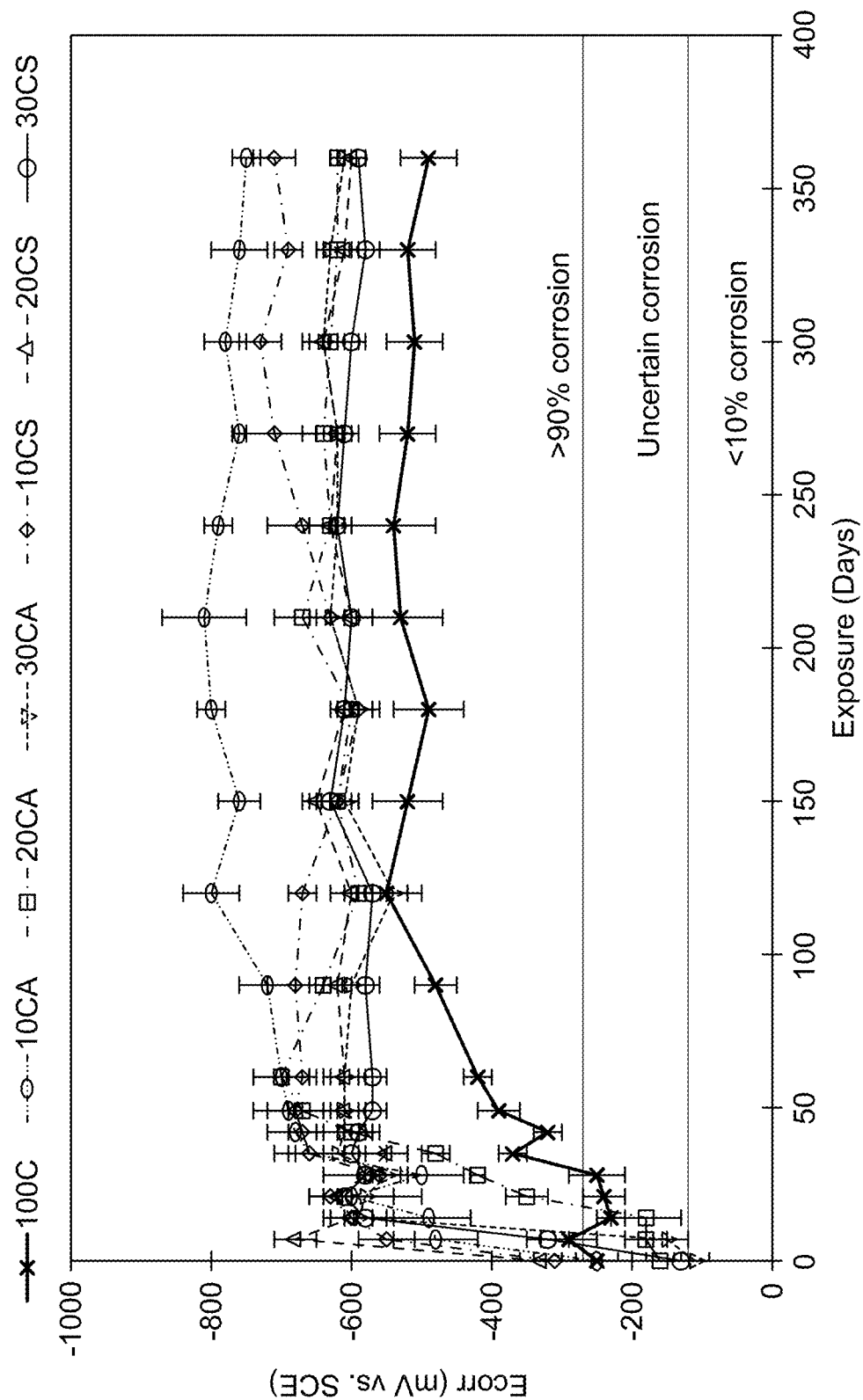
FIG. 40 shows variation of the half-cell potential (i.e., reinforcement corrosion potential, $E_{corr}$) of the specimens exposed to the chloride-laden environment for 360 days, according to certain embodiments.

FIG. 40 shows the variation of the half-cell potential (i.e., reinforcement corrosion potential, $E_{corr}$) of the specimens exposed to the chloride-laden environment for 360 days. Initially, all of the mixtures started in the uncertain reinforcement corrosion status range ($-270$ mV > $E_{corr}$ > $-420$ mV) or the >90% reinforcement corrosion probability range ($E_{corr}$ < $-420$ mV) according to the criteria set by the ASTM C876 standard. $E_{corr}$ for all AACs increased significantly within the first 60 days to reach $-700$ mV for 10CA and 20CA, $-610$ mV for 30CA and 20CS, $-670$ mV for 20CS, and $-570$ mV for 30CS compared to the control mixture which exhibited an $E_{corr}$ value of $-420$ mV at that time. Beyond the 60 days exposure period, $E_{corr}$ values remained relatively stable until the end of the exposure period which indicates that the status of the rebar inside concrete did not experience much change beyond the 60 days mark. Overall, the AAC mixtures showed more negative $E_{corr}$ values compared to that of the control mixture at every exposure stage. It was noted that the steam-cured mixtures exhibited marginally lower reinforcement corrosion potentials compared to their ambient-air cured counterparts. In addition, the $E_{corr}$ values decreased as the OPC content of the precursor in the AACs increased. However, given the qualitative nature of the ASTM C876's criteria, a more negative $E_{corr}$ value does not necessarily indicate a worse reinforcement corrosion condition of the embedded rebar or an active reinforcement corrosion status at all, since the thresholds provided by the ASTM C876 indicate only a probability of reinforcement corrosion and the actual reinforcement corrosion status itself is not known. The fact that a highly negative value of $E_{corr}$ does not necessarily indicate an active reinforcement corrosion in AACs mixtures was observed in the literature. Tennakon et al. [C. Tennakoon, A. Shayan, J. G. Sanjayan, and A. Xu, "Chloride ingress and steel corrosion in geopolymer concrete based on long term tests," Mater. Des., vol. 116, pp. 287-299, February 2017, which is incorporated herein by reference in its entirety] reported $E_{corr}$ values more negative than −700 mV within the first 30 days of exposure for AABs with varying fly ash and slag content while the rebars indicating such potentials were found to be in good condition (i.e., uncorroded). Furthermore, they analyzed the chloride content at the level of the rebar and found that chloride has not reached the reinforcement corrosion initiation threshold. In addition, Ibrahim et al. [[M. Ibrahim, M. Kalimur Rahman, M. A. Megat Johari, M. Nasir, and E. Adeoluwa Oladapo, "Chloride diffusion and chloride-induced corrosion of steel embedded in natural pozzolan-based alkali activated concrete," Constr. Build. Mater., vol. 262, p. 120669, November 2020, which is incorporated herein by reference in its entirety] showed reinforcement corrosion in pozzolana-based AACs with varying nano-silica content and reported a similar trend where the rebars in the AACs showed $E_{corr}$ values more negative than-550 m V while the rebars themselves were found to be in good conditions despite the more negative potentials compared to OPC concretes. The higher negative values were found to be a result of three factors which are: the lower pH of alkali-activated concretes, the lack of oxygen at the rebar level especially in the cathodic region due to the refined and more tortuous pore structure of AACs, and the interference with the measurement that is caused by the ionic accumulation in AACs. The measured pH at the rebar level was found to be 11.6 for the AAC mixtures and 12.8 for control mixture (100C) which might be in fact causing the more negative reading despite the rebar being in a passive status.

Figure 41:
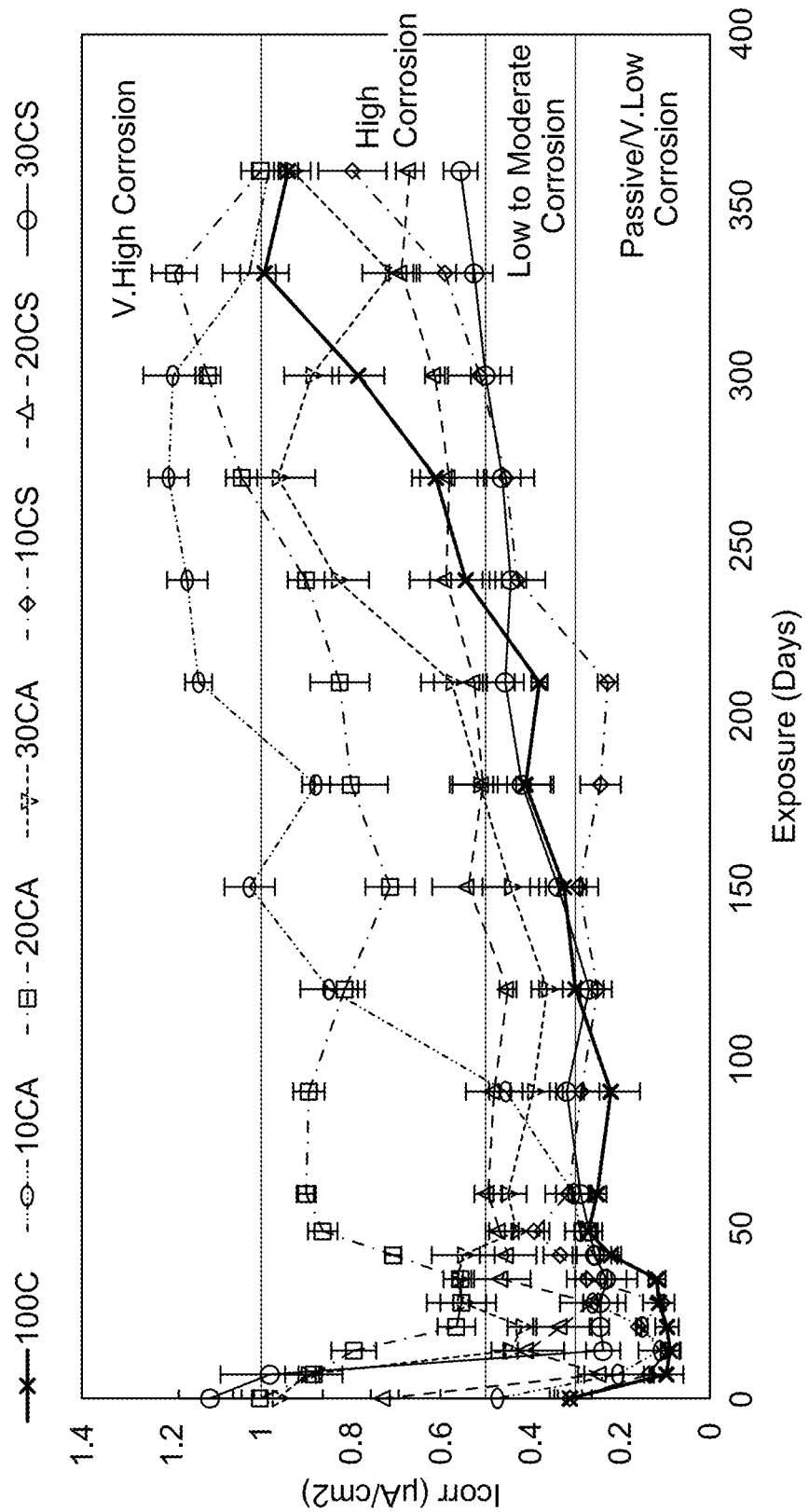
FIG. 41 shows plots of corrosion current ($I_{corr}$), measured electrochemically using the linear polarization resistance (LPR) method, at different times of the chloride exposure for a total duration of 360 days, according to certain embodiments.

FIG. 41 shows the plots of $I_{corr}$, measured electrochemically using the LPR method, at different times of the chloride exposure for a total duration of 360 days. The classification of the state of reinforcement corrosion, based on the value of $I_{corr}$ [passive/very low reinforcement corrosion range ($I_{corr}$<0.3 µA/cm²), low to moderate reinforcement corrosion range (0.3 µA/cm²<$I_{corr}$<0.5 µA/cm²), high reinforcement corrosion range (0.5 µA/cm²<$I_{corr}$<1 µA/cm²), and very high reinforcement corrosion range ($I_{corr}$>0.3 µA/cm²)] is also shown in FIG. 41.

All concrete mixtures exhibited a trend where the values of $I_{corr}$ was initially high and then it dropped within the first 60 days which could be attributed to the formation of the passive layer on the surface of the rebar. At the 60-day mark, all concrete mixtures (except for 20CA) exhibited $I_{corr}$ values in the 'low to moderate' reinforcement corrosion range which disagrees with the probability of reinforcement corrosion based on the $E_{corr}$ values that indicated a state of active reinforcement corrosion. For all mixtures, $I_{corr}$ trended in an increasing manner after the 60-day mark until the end of the exposure unlike $E_{corr}$ which, as mentioned previously, stabilized after 60 days of exposure. After a year of exposure to 5% NaCl, $I_{corr}$ values of 0.984, 1.001, 0.931, 0.797, 0.669, and 0.556 µA/cm² were measured for mixtures 10CA, 20CA, 30CA, 10CS, 20CS, and 30CS, respectively compared to an $I_{corr}$ value of 0.94 µA/cm² measured for the control mixture which classifies all of the mixtures in the 'high' and 'very high' reinforcement corrosion states. In addition, studies reported cracking of the concrete specimens due to internal tensile stresses caused by the expansion of the products of reinforcement corrosion when $I_{corr}$ values exceeded 0.9 µA/cm², which was not observed in the present study. The performance of the AACs in general was comparable to the control mixture in terms of the measured $I_{corr}$ values. It was also noted that the steam-cured mixtures exhibited $I_{corr}$ values lower than their counterparts from the ambient-air curing group and even lower than the control mixture for 20CS and 30CS in particular. This can be owed to the denser microstructure that hinders the dissolution of the rebar as well as the diffusion of oxygen required for the reinforcement corrosion reaction.

Example 36: Gravimetric Method

Figure 42:
FIG. 42 shows a pictorial image of a concrete mixture containing a centrally embedded reinforcement bar (rebar condition), after 360 days of exposure to 5% NaCl, according to certain embodiments.
Figure 43:
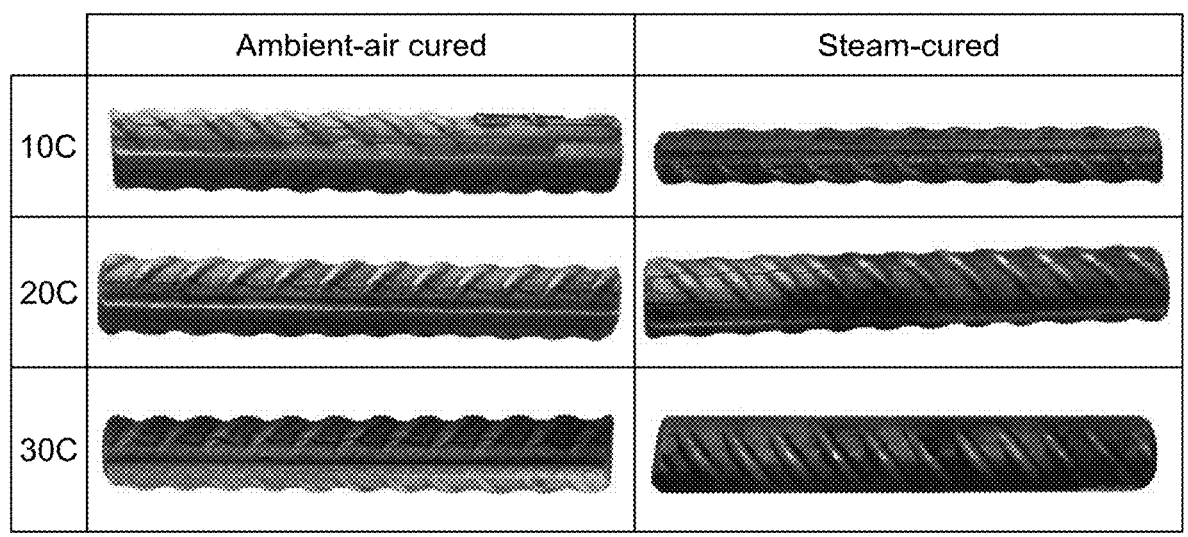
FIG. 43 is a pictorial image of cleaned rebar condition after 360 days of exposure to 5% NaCl, according to certain embodiments.

Two specimens belonging to each concrete mixture containing centrally embedded reinforcement bars were picked up after one year of exposure to 5% NaCl. The bars were exposed for observing the status of reinforcement corrosion by splitting the specimens along their length, shown in FIG. 42, for a typical specimen. The rebars embedded in the AAC mixtures were observed to be in good condition with no signs of active, pitting, or crevice reinforcement corrosion were visible on the rebars. The rebars were extracted from the specimens and cleaned following the procedure stated in ASTM G1. The condition of the rebars after cleaning is illustrated in FIG. 43. After cleaning the rebars, the percentage weight losses were determined, as shown in Table 10. After one year of exposure, all of the mixtures showed minimal weight loss. The average weight loss was 2.532, 1.709, 1.329, 1.646, 0.633, and 0.570% for AAC mixtures 10CA, 20CA, 30CA, 10CS, 20CS, and 30CS, respectively. The steam-cured mixtures showed significant reduction in the weight loss due to chloride-induced reinforcement corrosion compared to their ambient-air cured counterparts.

The equivalent corrosion current density, $I_{corr}$ values, shown in Table 10, were calculated by substituting the measured value of the weight loss and other parameters to the Faraday's law, as given by Equation 23:

$$W = \frac{I_{corr} \cdot t \cdot M_W \cdot A}{n \cdot F} \qquad \text{Equation 23}$$

Where, W is the weight loss (g), $I_{corr}$ is the reinforcement corrosion current density (µA/cm²), t is the time(s), $M_w$ is the atomic weight of the steel rebar (g/mol), A is the surface area of the rebar (cm²), n is the number of electrons involved in the reaction, and F is the Faraday's constant=96500 Coulomb/mol. $A_w$ is assumed to be equal to that of Iron (atomic weight=55.85 g/mol) to ease the calculation, n is equal to 2 from the anodic half-cell reaction Fe→Fe$^{++}$+2e$^-$, and t is equal 31.104×10⁶ s (360 days).

TABLE 10

Gravimetric test results and the equivalent $I_{corr}$ (σ is the standard deviation)

| | Weight loss (%) | σ | Equivalent $I_{corr}$ (µA/cm²) |
|---|---|---|---|
| 10CA | 2.532 | 0.127 | 0.582 |
| 20CA | 1.709 | 0.063 | 0.393 |
| 30CA | 1.329 | 0.190 | 0.305 |
| 10CS | 1.646 | 0.127 | 0.378 |

TABLE 10-continued

Gravimetric test results and the equivalent $I_{corr}$ (σ is the standard deviation)

| | Weight loss (%) | σ | Equivalent $I_{corr}$ (μA/cm²) |
|---|---|---|---|
| 20CS | 0.633 | 0.127 | 0.145 |
| 30CS | 0.57 | 0.064 | 0.131 |

Figure 44:
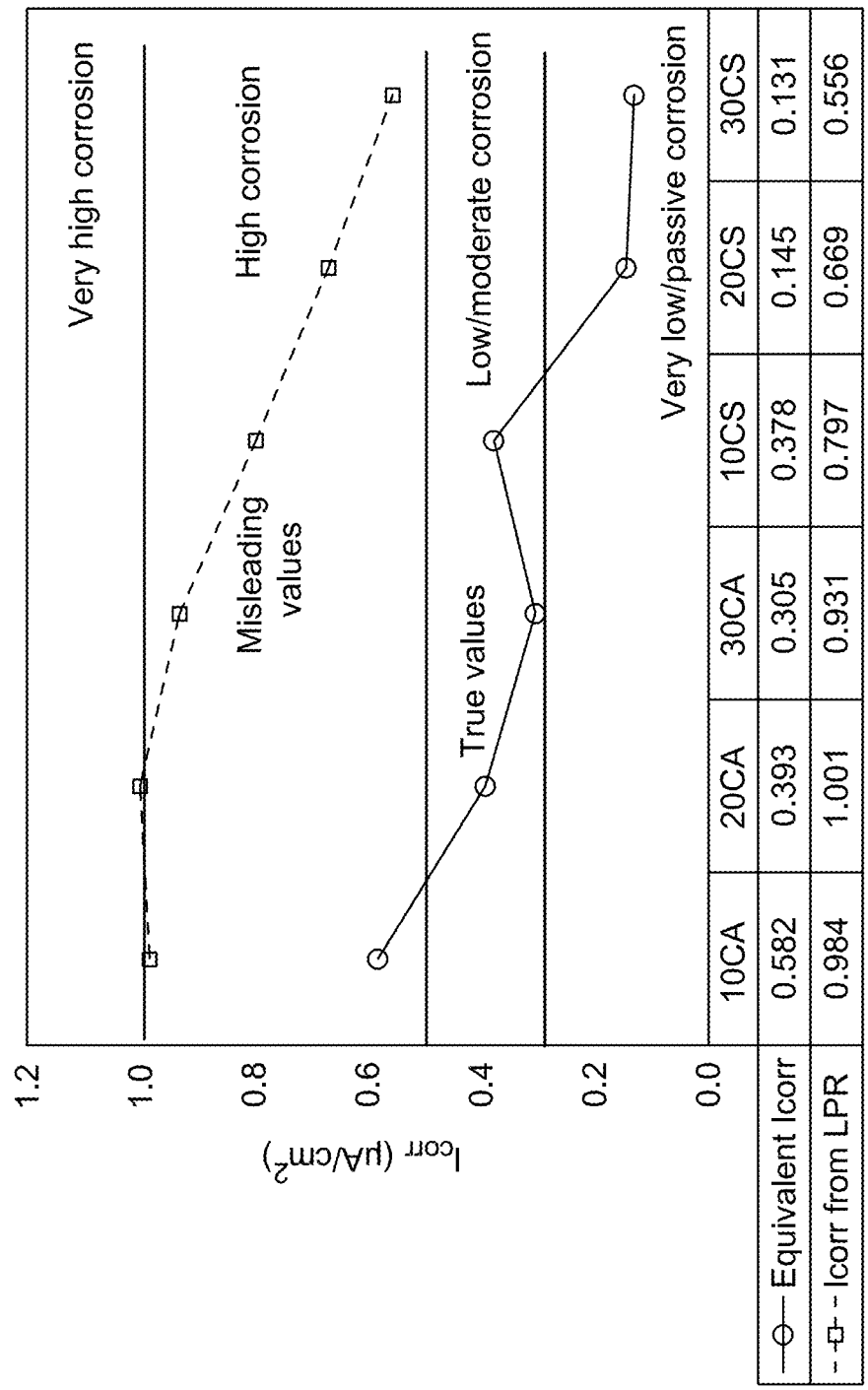
FIG. 44 shows a plot of $I_{corr}$ values after 360 days of exposure to 5% NaCl, according to certain embodiments, according to certain embodiments.

The values of equivalent $I_{corr}$, determined using gravimetric test results after one-year exposure to 5% NaCl (Table 10) could be considered as true representation of the status of reinforcement. FIG. 44 shows the plots of both $I_{corr}$ values measured using the LPR method and equivalent $I_{corr}$ values from the gravimetric test results. It can be observed from FIG. 44 that the status of reinforcement corrosion for all AAC mixtures (except 10CA) were in the range of 'very low/passive' to 'low/moderate', based on the curve obtained using equivalent $I_{corr}$ values that is in agreement with the status of reinforcement corrosion of rebars noticed through the visual observation of the rebars before conducting the gravimetric test. Therefore, it is confirmed that the electrochemical measurements (half-cell potential and LPR tests) yielded misleading values of $E_{corr}$ and $I_{corr}$. Hence it can be noted that the electrochemical tests cannot be reliably used to monitor corrosion of rebars embedded in AAC mixtures due to the previously mentioned reasons associated with the compositions of AACs.

Considering the gravimetric (i.e., actual) $I_{corr}$ plot shown in FIG. 41, the effect of the increase in the OPC content of precursor on resistance against reinforcement corrosion can be observed for both groups of the AAC mixtures. A decrease in $I_{corr}$ can be observed for both ambient-air cured as well as steam-cured AAC mixtures when the OPC content of the precursor increased from 10 to 20%. The resistance against reinforcement corrosion marginally increased for increase in the OPC content from 20 to 30%. Further, like other durability characteristics the performance of steam-cured AAC mixtures against reinforcement corrosion was better than that of the ambient-air cured AAC mixtures.

The physical and mechanical properties, drying shrinkage, durability, and microstructural analyses of alkali-activated concrete (AAC) mixtures containing LSP, NP, RM, and SMF with varying OPC content, as precursor materials, and different curing conditions were studied. Further, a detailed experimental investigation into the chloride transport properties and the chloride-induced reinforcement corrosion behavior of AACs made with industrial byproducts and mineral additives was undertaken. The durability tests such as the chloride permeability, chloride migration, and chloride diffusion were conducted. Furthermore, the chloride-induced reinforcement corrosion of rebars embedded in the AAC mixtures was studied by means of electrochemical methods that included monitoring of reinforcement corrosion potential and corrosion current density in addition to the gravimetric method.

The increased OPC content and steam curing led to the formation of more crystalline hydration/polymerization products such as CSH, CASH, NASH, Mn—SH, and KASH, which resulted in a denser and more resilient structure that produced better mechanical properties. Maximum compressive strength of 44.9 MPa and splitting-tensile strength of 3.3 MPa were achieved at 28 days by an AAC mixture containing 30% OPC and cured using steam (i.e., 30CS), which were higher than of the control mixture (conventional OPC concrete, i.e., 100C). These observations were validated by the microstructural investigation via XRD and SEM-EDS analyses. However, the modulus of elasticity of all AAC mixtures were lower than the control OPC mixture which can be attributed to the higher ductility of the polymerization products that have higher binding capacity but lower resistance against compressive strain.

AAC mixtures exhibited lower drying shrinkage than the control mixture at all ages except for mixture 10CA. Furthermore, the drying shrinkage was mostly unchanged after the first 28 days for the AAC mixtures. A maximum drying shrinkage of 399 microstrain for 30CA and 127 microstrain for 30CS was recorded at 180 days compared to the 700 microstrain observed for the control OPC mixture.

AAC mixtures with OPC content higher than 10% exhibited resistance against acid and sulfate attacks similar or better than the control OPC mixture in terms of weight loss and strength reduction.

Calcium sulfate dihydrate was mainly formed as a result of acid and sulfate exposures due to the disintegration and depolymerization of the calcium-carrying polymerization products, as evident by XRD spectroscopy and SEM-EDS imaging. In addition, calcite, dolomite and natrite were observed in XRD due to the carbonation of the calcium, magnesium and sodium ions liberated by the sulfuric acid and sulphate attacks. Furthermore, thaumasite formation, as radial needle-like crystals, was observed in SEM imaging in the case of the sulfate exposure due to the low temperature and high relative humidity in the exposure environment which favors the formation of thaumasite over rod-like crystals of ettringite.

The increase of the OPC content from 10 to 20% as a proportion of the precursor led to a significant improvement in all aspects of the concrete mixture performance that were able to surpass the control OPC mixture, irrespective of the curing regime, while the increase in OPC content beyond 20% resulted in marginal improvements.

AAC mixtures that were ambient-air cured exhibited a chloride permeability that classified them in the 'moderate' to 'low' chloride permeability classes while the steam-cured AAC mixtures exhibited RCPT values that classified them in the 'low' to 'very low' chloride permeability classes, compared to the OPC control mixture which was classified in the 'high' chloride permeability class. The non-steady state chloride migration coefficient ($D_{nssm}$) was in the range of 17.5 to $29.6 \times 10^{-12}$ m²/s for the AAC mixtures with the lowest being exhibited by steam-cured AAC mixture (30CS), compared to the control OPC mixture which had a $D_{nssm}$ value of $34.75 \times 10^{-12}$ m²/s. The apparent chloride diffusion coefficient (Da) ranged from $53 \times 10^{-12}$ to $27.6 \times 10^{-12}$ m²/s for the free chloride and from $35.1 \times 10^{-12}$ to $7.8 \times 10^{-12}$ m²/s for the total chloride. In both cases, the OPC control mixture showed the highest Da value followed by ambient-air cured mixtures and then the steam-cured mixtures. The chloride binding capacity of the AACs was found to be much higher than the OPC control mixture and varied from 0.014 to 0.248% by weight of concrete which can be owed to the higher alumina phases which react with the chloride and bind it to form complex chloride-alumina salts such as Friedel's salt.

Good correlations were observed between compressive strength and RCPT, and Dnssm and RCPT indicating the dependency of both strength and durability characteristics on the microstructure of the concrete mixtures.

The equivalent $I_{corr}$ (i.e., actual corrosion current density) values calculated using Faraday's law based on the weight loss due to chloride-induced reinforcement corrosion demonstrate a high resistance of AAC mixtures against reinforcement corrosion. After one year of 5% NaCl exposure, no significant corrosion was observed.

Strength as well as durability characteristics tests including corrosion current density indicate that there is an increase in the performance of the AAC mixtures when the OPC content of the precursor was increased from 10 to 20%, irrespective of the curing method.

Numerous modifications and variations of the present disclosure are possible in light of the above teachings. It is therefore to be understood that within the scope of the appended claims, the invention may be practiced otherwise than as specifically described herein.

The invention claimed is:

1. A cement composition, comprising:
a curable component in an amount of 10 to 25 wt. % based on a total weight of the cement composition;
wherein the curable component comprises a cementitious material, a limestone powder (LSP) material, a red mud (RM) material, a silicomanganese fume (SMF) material, and a natural pozzolan (NP) material;
a fine aggregate (FA) comprising sand in an amount of 20 to 40 wt. % based on the total weight of the cement composition;
a coarse aggregate (CA) comprising crushed limestone in an amount of 40 to 50 wt. % based on the total weight of the cement composition;
an alkaline component in an amount of 5 to 15 wt. %, based on the total weight of the cement composition;
wherein the alkaline component comprises an alkali metal hydroxide and an alkali silicate;
wherein the cementitious material has an average particle size ($D_{50}$) of 10 to 17 micrometers (μm);
wherein the LSP material has a $D_{50}$ of 13 to 19 μm;
wherein the RM material has a $D_{50}$ of 30 to 36 μm;
wherein the SMF material has a $D_{50}$ of 28 to 34 μm;
wherein the NP material has a $D_{50}$ of 13 to 19 μm;
wherein particles of the cementitious material, the LSP material, and the NP material have angular, irregular, and flake-like shapes; and
wherein particles of the RM material, and the SMF material have smooth surfaces and spherical shapes.

2. The cement composition of claim 1, wherein:
the cementitious material is present in the curable component at a concentration of 5 to 35 wt. %;
the LSP material is present in the curable component at a concentration of 5 to 15 wt. %;
the RM material is present in the curable component at a concentration of 5 to 25 wt. %;
the SMF material is present in the curable component at a concentration of 5 to 25 wt. %; and
the NP material is present in the curable component at a concentration of 25 to 55 wt. %, each wt. % based on a total weight of the cementitious material.

3. The cement composition of claim 1, wherein the cementitious material comprises at least one selected from the group consisting of portland cement, pozzolan cement, gypsum cement, aluminous cement, silica cement, and alkaline cement.

4. The cement composition of claim 1, wherein the cementitious material is type I ordinary portland cement (OPC).

5. The cement composition of claim 1, wherein the cementitious material comprises 81 to 88 wt. % CaO, 3 to 9 wt. % $SiO_2$, 0.5 to 2 wt. % $Al_2O_3$, 2.5 to 9 wt. % FeO, 0.1 to 0.3 wt. % $K_2O$, 0.2 to 0.8 wt. % MgO, each wt. % based on a total weight of the cementitious material.

6. The cement composition of claim 1, wherein the LSP material comprises 80 to 86 wt. % CaO, 8 to 15 wt. % $SiO_2$, 1 to 4 wt. % $Al_2O_3$, 0.5 to 2.5 wt. % FeO, each wt. % based on a total weight of the LSP material.

7. The cement composition of claim 1, wherein the NP material comprises 10 to 17 wt. % CaO, 33 to 40 wt. % $SiO_2$, 7 to 13 wt. % $Al_2O_3$, 25 to 33 wt. % FeO, 0.5 to 1.5 wt. % $K_2O$, 2 to 7 wt. % MgO, 1 to 3 wt. % $TiO_2$, each wt. % based on a total weight of the NP material.

8. The cement composition of claim 1, wherein the RM material comprises 2 to 7 wt. % CaO, 7 to 13 wt. % $SiO_2$, 11 to 17 wt. % $Al_2O_3$, 50 to 58 wt. % FeO, 8 to 16 wt. % $Na_2O$, 2 to 10 wt. % MgO, 1 to 7 wt. % $TiO_2$, each wt. % based on a total weight of the RM material.

9. The cement composition of claim 1, wherein the SMF material comprises 1 to 5 wt. % CaO, 10 to 18 wt. % $SiO_2$, 70 to 80 wt. % MnO, 1 to 7 wt. % FeO, 0.05 to 0.2 wt. % $K_2O$, 1 to 5 wt. % MgO, each wt. % based on a total weight of the SMF material.

10. The cement composition of claim 1, wherein the FA comprises sand having a specific gravity of 2.6 to 2.7, and wherein the CA comprises limestone having a specific gravity of 2.5 to 2.6.

11. The cement composition of claim 1, wherein the alkali metal hydroxide is sodium hydroxide (NaOH), and the alkali silicate is sodium silicate ($Na_2SiO_3$), and wherein a weight ratio of the NaOH to the $Na_2SiO_3$ is in a range of 1:1 to 1:4.

12. A method of producing a cured specimen, the method comprising:
mixing the cement composition of claim 1 with water to form a mortar composition;
casting the mortar composition in a mold to form a molded composition; and
curing the molded composition for 12 to 48 hours thereby forming the cured specimen;
wherein the curing is conducted under an ambient air condition or a steam condition.

13. The method of claim 12, wherein the cured specimen has a compressive strength of 10 to 50 MPa as determined by ASTM C39.

14. The method of claim 12, wherein the cured specimen has a modulus of elasticity of 5 to 20 GPa as determined by ASTM C469.

15. The method of claim 12, wherein the cured specimen has a split tensile strength of 1 to 4 MPa as determined by ASTM C496.

16. The method of claim 12, wherein the cured specimen has a drying shrinkage of 90 to 650 microstrains as determined by ASTM C596.

17. The method of claim 12, wherein the cured specimen has a residual strength of 10 to 35 MPa after an acid attack as determined by ASTM C1898.

18. The method of claim 12, wherein the cured specimen has a residual strength of 5 to 40 MPa after a sulfate attack as determined by ASTM C1012.

19. The method of claim 12, wherein the cured specimen has a non-steady state chloride migration coefficient ($D_{nssm}$) in a range of 17.5 to $29.6 \times 10^{-12}$ m$^2$/s as determined by ASTM C1202.

20. The method of claim 12, wherein the cured specimen has a chloride diffusion coefficient ($D_a$) in a range of $53 \times 10^{-12}$ to $17.6 \times 10^{-12}$ m$^2$/s for the free chloride and from $35.1 \times 10^{-12}$ to $7.8 \times 10^{-12}$ m$^2$/s for the total chloride as determined by ASTM C1152 and C1156.

* * * * *